United States Patent
Johnson et al.

(10) Patent No.: US 6,535,908 B1
(45) Date of Patent: Mar. 18, 2003

(54) SYSTEM AND METHOD FOR CALL RECORD SEARCH AND CALL RECORD VERIFICATION FOR NETWORK CERTIFICATION

(76) Inventors: William J. Johnson, 1704 Katherine Ct., Flower Mound, TX (US) 75022; Craig E. Newman, 3066 Blackfield Dr., Richardson, TX (US) 75082; Brian S. Badger, 5955 Nora Point #101, Colorado Springs, CO (US) 80919; Eugene E. Williams, 7026 Mazy La., Rowlett, TX (US) 75089

( * ) Notice: Subject to any disclaimer, the term of this patent is extended or adjusted under 35 U.S.C. 154(b) by 0 days.

(21) Appl. No.: 09/441,423

(22) Filed: Nov. 16, 1999

(51) Int. Cl.[7] ................................................. G06F 15/16

(52) U.S. Cl. ...................... 709/203; 709/217; 709/219; 709/246; 707/200; 707/104; 707/103; 714/21

(58) Field of Search ................................. 709/246, 203, 709/101, 314, 217, 219; 707/103, 104, 200, 3, 10; 714/4, 21

(56) References Cited

U.S. PATENT DOCUMENTS 5,918,005 A * 6/1999 Crawford et al. ........... 710/240
5,987,633 A * 11/1999 Newman et al. ............ 714/712

* cited by examiner

*Primary Examiner*—Mehmet B. Geckil

(57) ABSTRACT

A system searches for, and verifies, according to certain criteria, a database of records, typically call records generated during the testing of a telecommunications network after software or hardware updates have been applied to the system. Multiple instances of collecting and decoding processes embodied in stored programs running in a computer system act upon blocks of incoming data records to store both a raw image of the received data and a pre-parsed version of the data suitable for database searching and retrieval. Three-step partitioned processing comprises a set of collector processes for collecting data records, a set of decoder processes for decoding and parsing such records, and a set of loader processes for loading records into a database. A client can request certain call records or request verification of certain records. A rules mechanism embodied in stored templates operates to tie client requests to asynchronously received data.

12 Claims, 28 Drawing Sheets

SYSTEM AND METHOD FOR CALL RECORD SEARCH AND CALL RECORD VERIFICATION FOR NETWORK CERTIFICATION

BACKGROUND

This invention relates to telecommunications systems, and, in particular, a system and method for searching and verifying a database of records, typically call records, generated during the testing of a telecommunications network after software or hardware updates, or both, have been applied to the telecommunications system.

Typically, new services to be implemented in a telecommunications network are tested in a mock network testbed before implementation in a production network. Untested software or hardware updates to a functioning production telecommunications system could cause disastrous results if those updates contain software or hardware bugs. The network testbed is designed to emulate the production telecommunications network as closely as possible. During testing, the many heterogeneous devices in the network create call records which simulate the type and volume of call records which would be generated by the actual network. This stream of call records from the test network offers a valuable audit of network operation. It is necessary to collect these records, store them, and allow easy access to them so they may be analyzed for information about the state of the system. Realistic testing will generate a high volume and high-speed flow of call records. It is important that the verification system catch all incoming records.

Thus a system is required for receiving a high-speed stream of call records in a test network and efficiently organizing and storing the records for verification access. The present invention is designed and optimized for receiving and analyzing multiple data streams, such as call records, from a testbed telecommunications network. Although the preferred embodiment of the invention described below discloses a use of the invention for the processing of call records in a telecommunications system, it should be realized that the invention may be used to process incoming data streams other than call records.

SUMMARY

These and other features and advantages are accomplished in the system and method for call record search and verification disclosed in this application. In general, multiple instances of collecting and decoding processes embodied in stored programs running in a computer system act upon blocks of incoming data to store both a raw image of the received data and a pre-parsed version of the data suitable for database searching and retrieval. Three-step partitioned processing is disclosed comprising a set of collector processes for collecting data records, a set of decoder processes for decoding and parsing such records, and a set of loader processes for loading records into a database. A client can request certain call records or request verification of certain records. A rules mechanism embodied in stored templates operates to link client requests to asynchronously received data. The system provides data to a client in minimal time, regardless of when data becomes available.

In general, a computer software system for receiving, storing, analyzing and optionally filtering multiple data streams, and for retrieving and verifying data records from the data streams, comprises at least one processor executing a sequence of instructions embodied in a computer-readable medium. The system further comprises:

A service manager process executing asynchronously for starting and stopping all system processes; at least one collector process executing asynchronously for collecting data records from the data streams and placing the data records in a record queue; and, a store of one or more first pre-determined templates. The first pre-determined templates contain rules for filtering and parsing the data records. At least one decoder process asychronously parses data records in the record queue according to the first predetermined templates and stores such parsed records. At least one loader process asynchronously loads the stored parsed data records into a database. The system has at least one asynchronous client manager process for accepting verification requests for data records from a client, acknowledging such requests, and placing such requests in a request queue. A store of one or more second pre-determined templates is provided; the second templates contain rules for finding and verifying data records.

At least one verification request processing process asynchronously reads requests from the request queue, reads requested data records from the database according to the second pre-determined templates, stores the requested data records, and stores requests for which no data records are yet available. The system also has an asynchronous query refresh futures process which reads the stored requests for which no data records are yet available and places on the request queue those requests for data records which require a retry.

DETAILED DESCRIPTION

In this disclosure, we assume the preferred embodiment is implemented on a programmable computer system running some version of the UNIX operating system, although implementation on most other operating systems could be accomplished by persons skilled in the art, given the disclosure of the preferred embodiment in this application. Accordingly, the terms in this disclosure which describe functions of the preferred embodiment are terms commonly understood by users of the UNIX operating system, but their use should not be construed to limit the application of the invention to UNIX operating systems.

Figure 2:
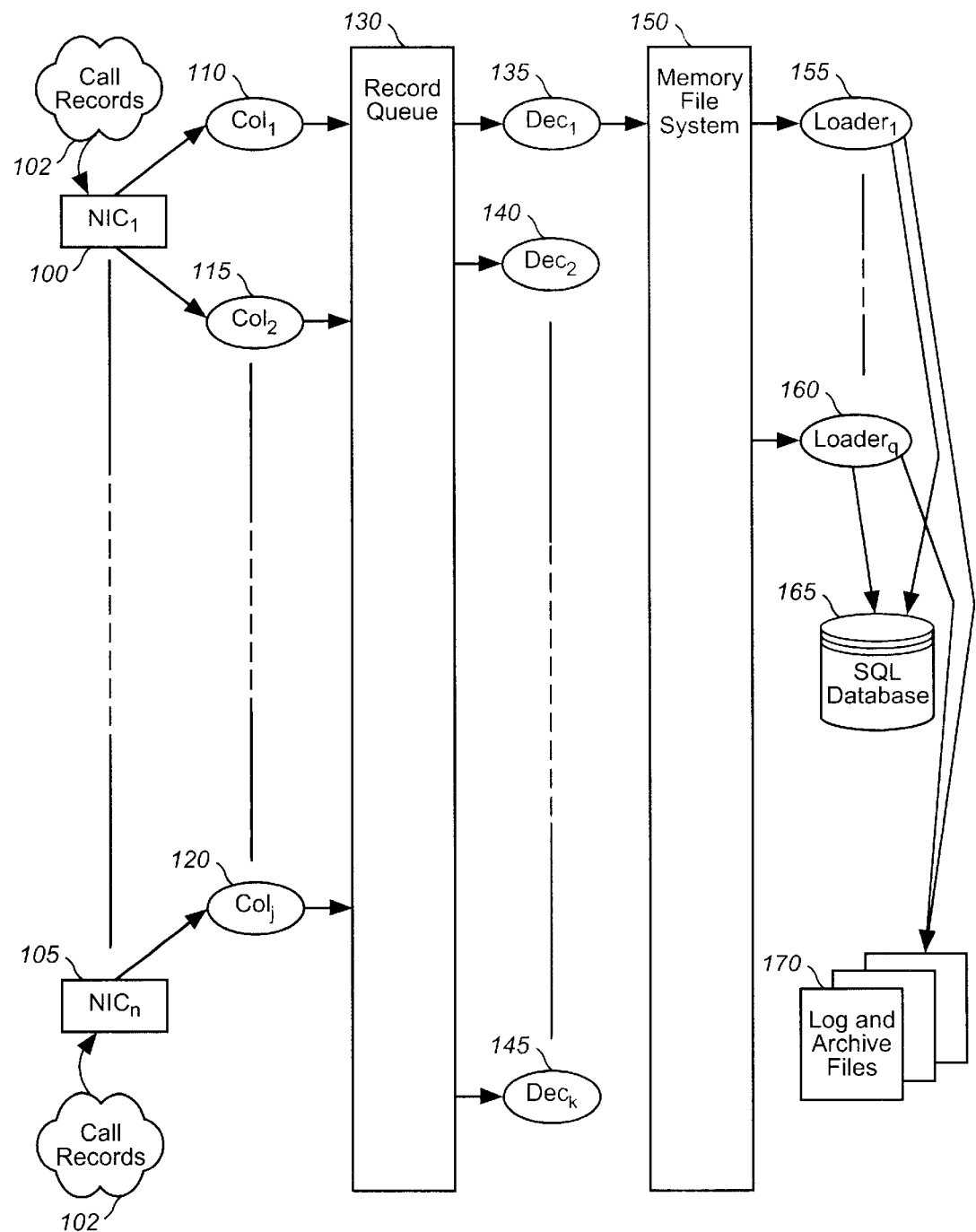
FIGS. 2 and 3 are schematic overviews of the preferred embodiment of the invention, depicting the activity of the processes which collect call records from a network information center and eventually place formatted records in a database.
Figure 3:
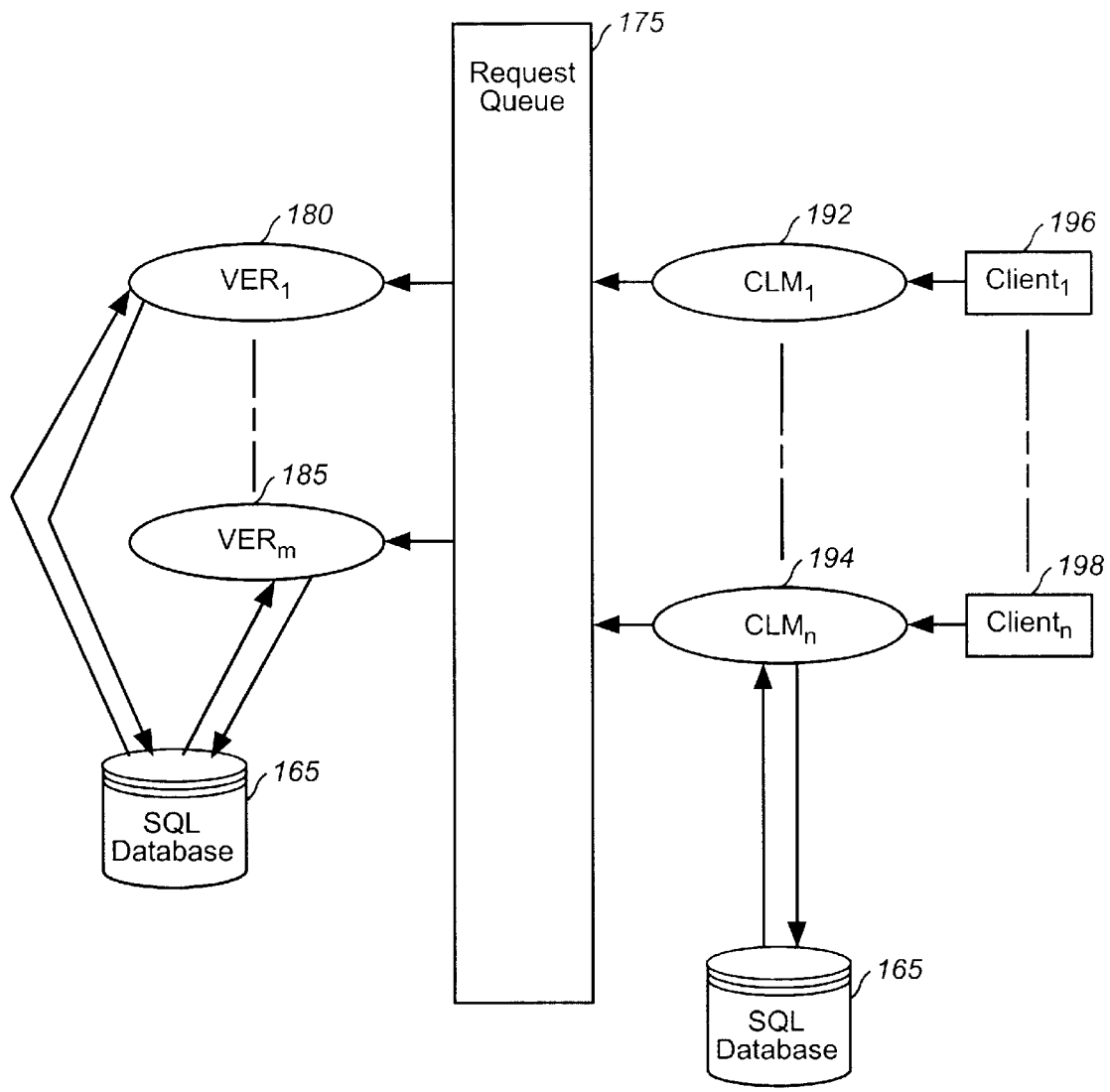
Figure 4:
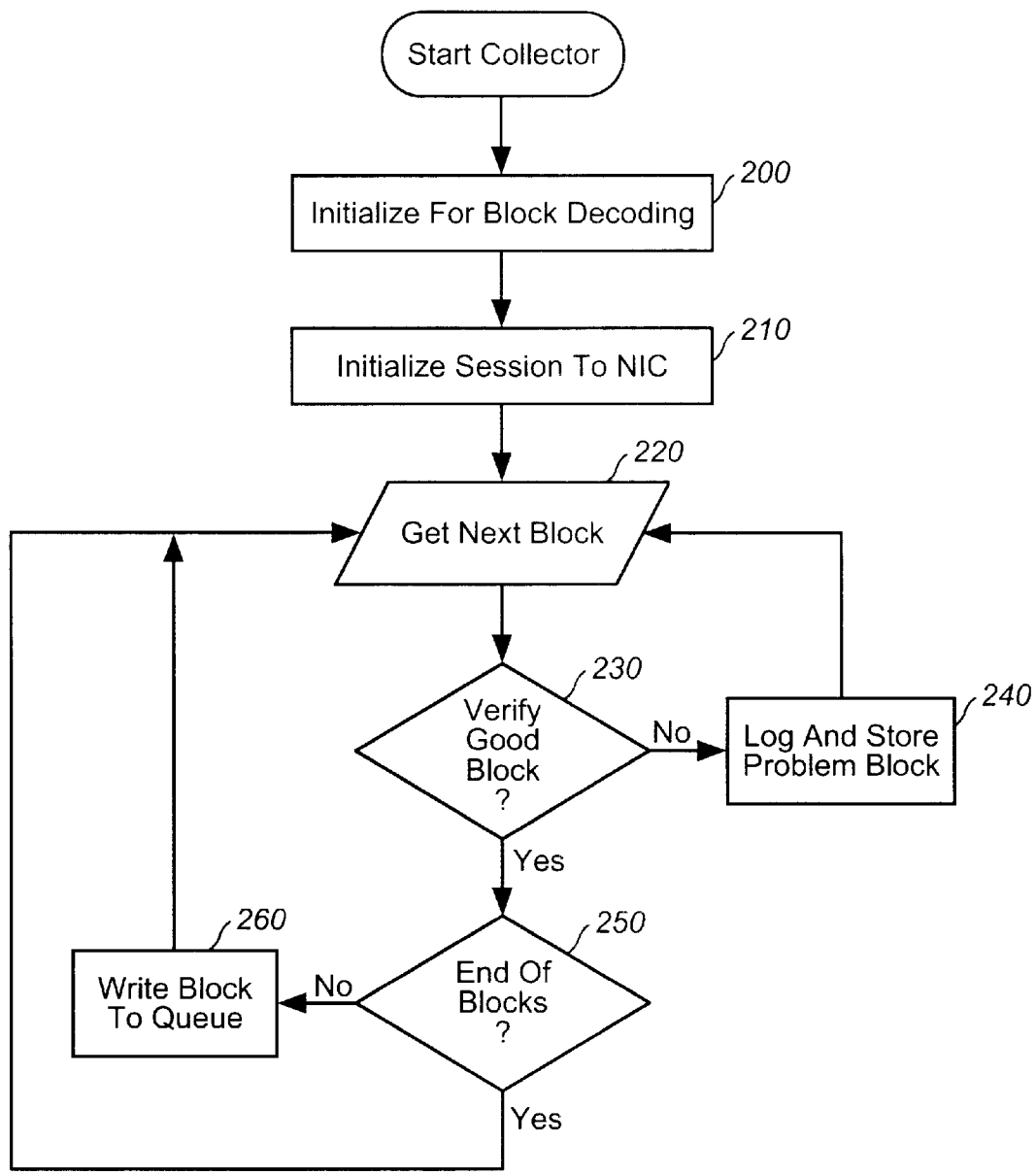
FIG. 4 is a flowchart depicting the call-record collector process in the call-record component of the preferred embodiment.
Figure 17:
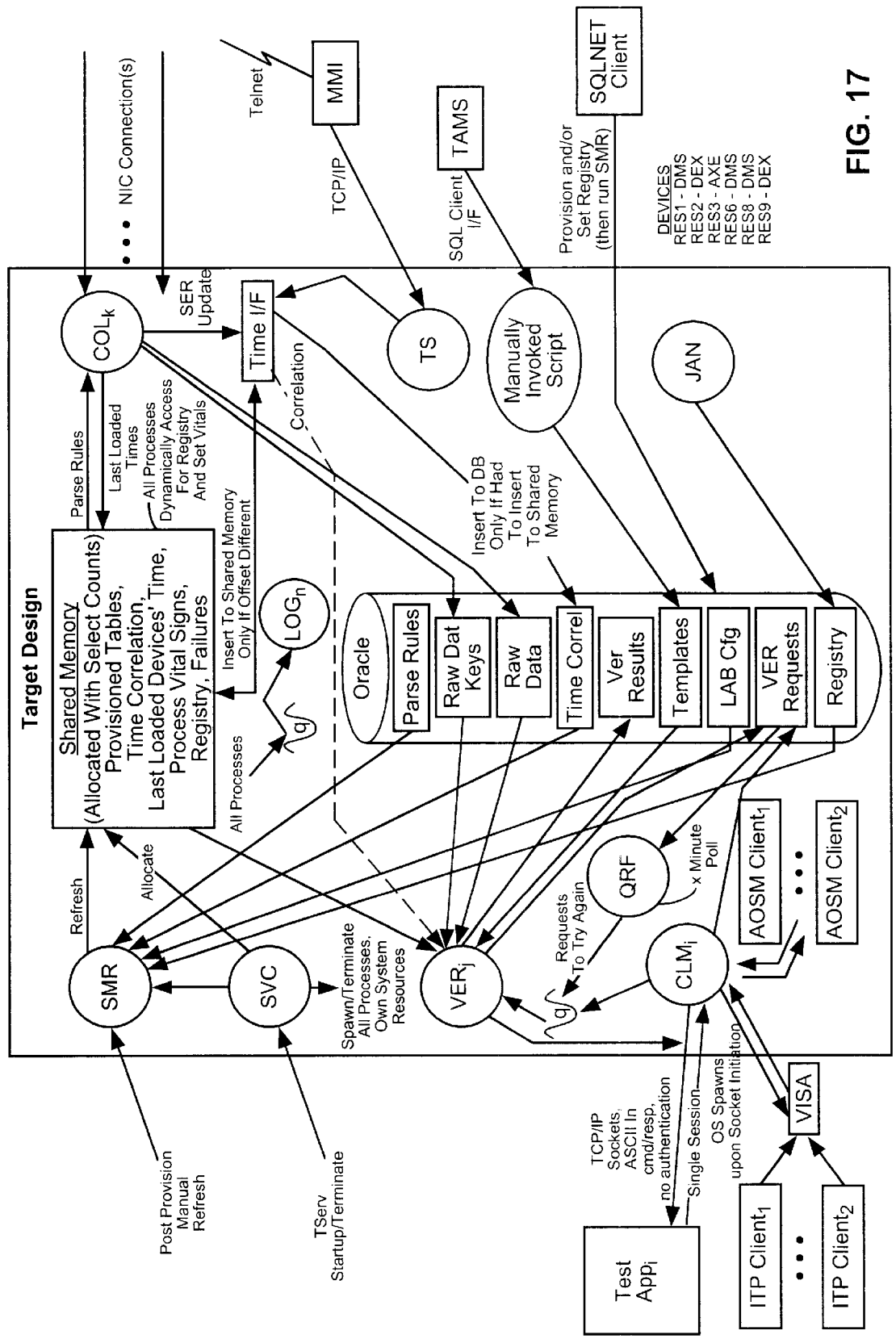
FIG. 17 illustrates a block diagram of a preferred embodiment of the present invention.
Figure 18:
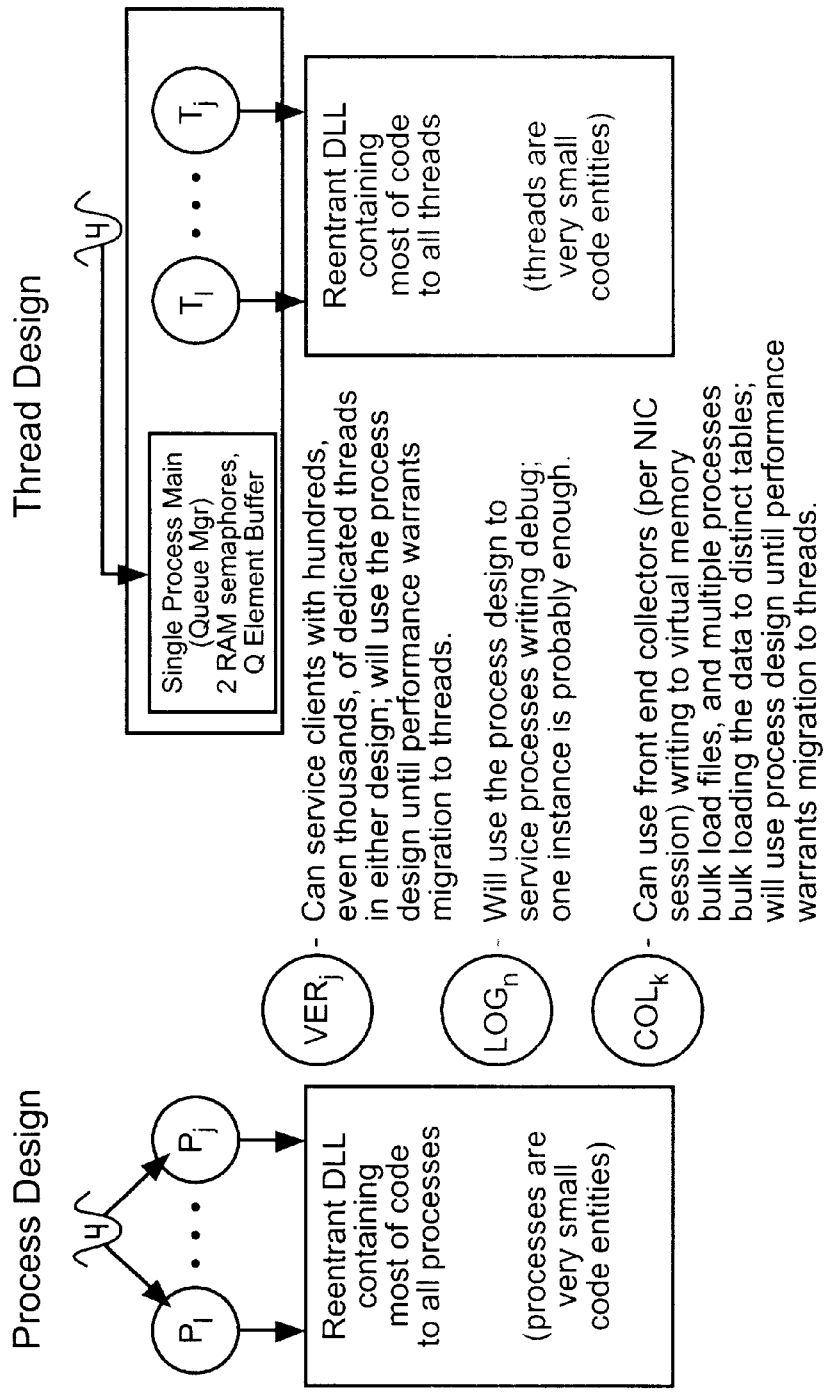
FIG. 18 illustrates an exemplary design for multiple instances of the VER,LOG and COL functions of FIG. 17.
Figure 19:
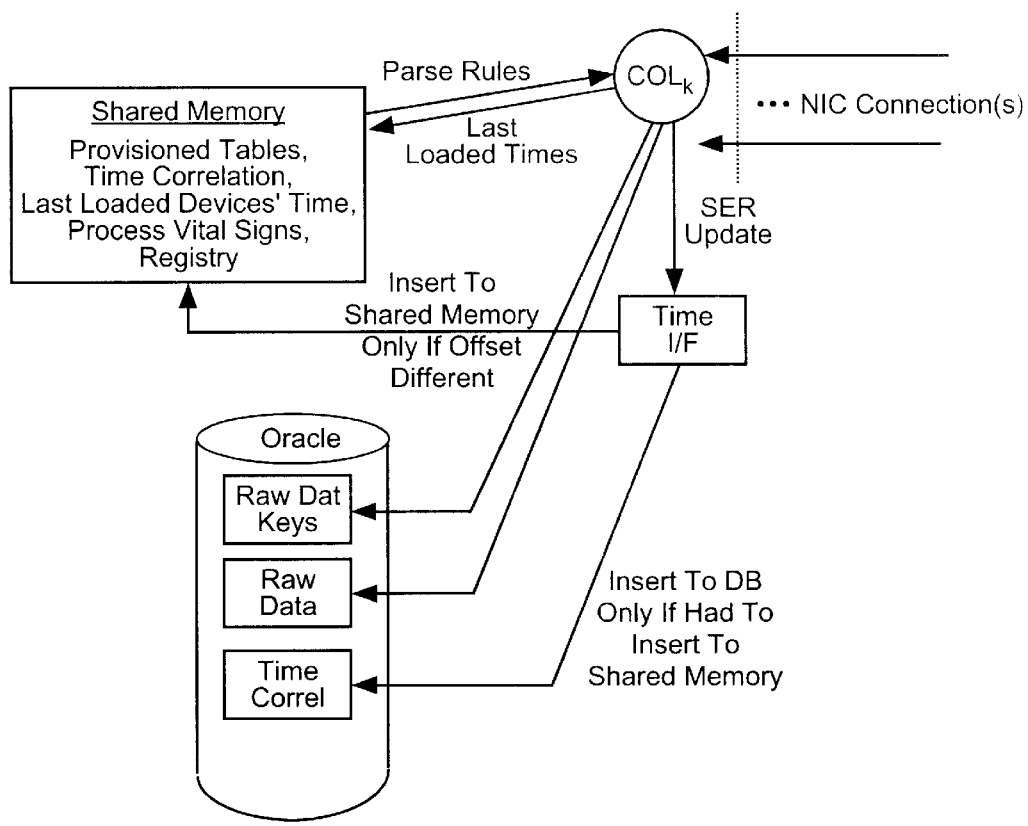
FIG. 19 is an exemplary high-level view of the Collector (COL) function, consistent with an embodiment of the present invention.
Figure 20:
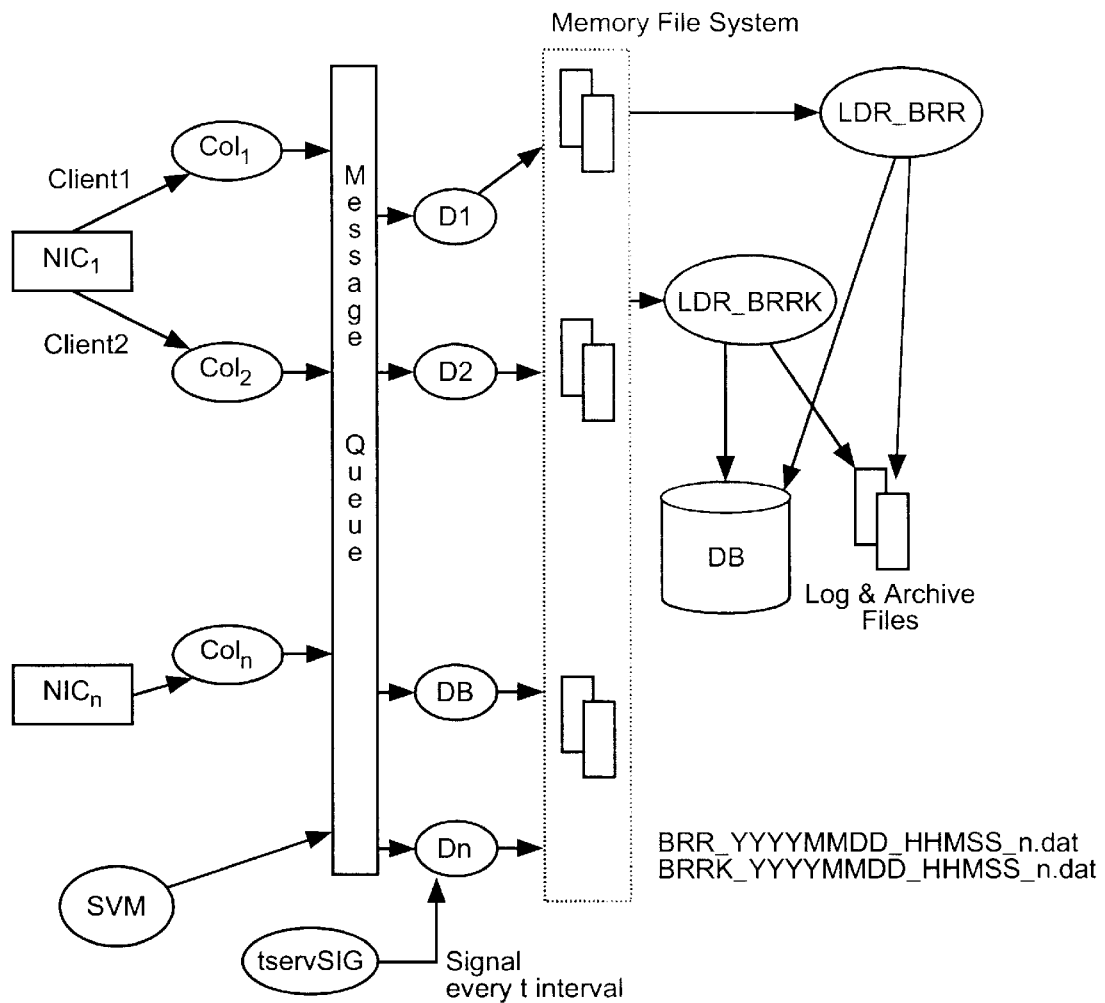
FIG. 20 illustrates an exemplary block diagram of message queuing consistent with an embodiment of the present invention.
Figure 21:
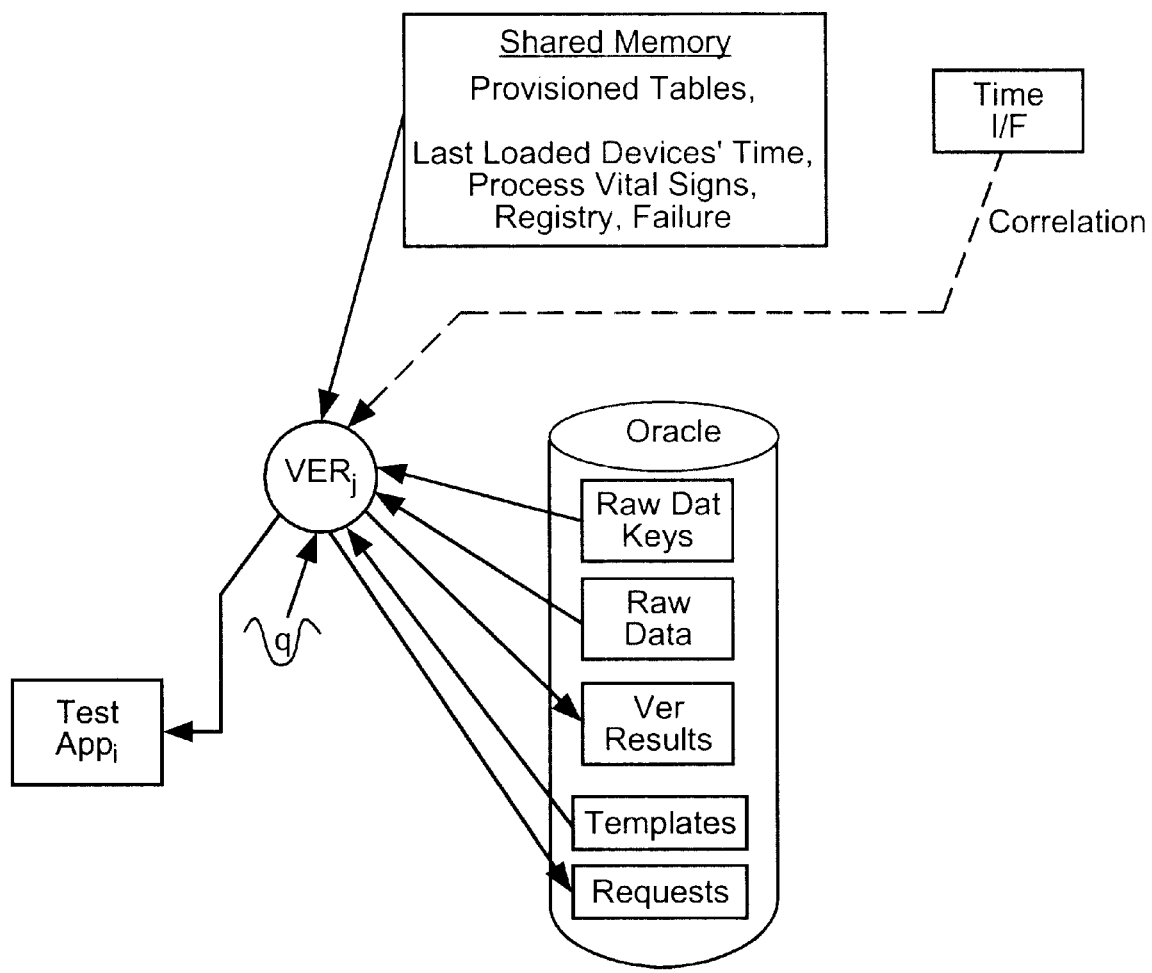
FIG. 21 is an exemplary high-level view of the Verification (VER) function, consistent with an embodiment of the present invention.
Figure 22:
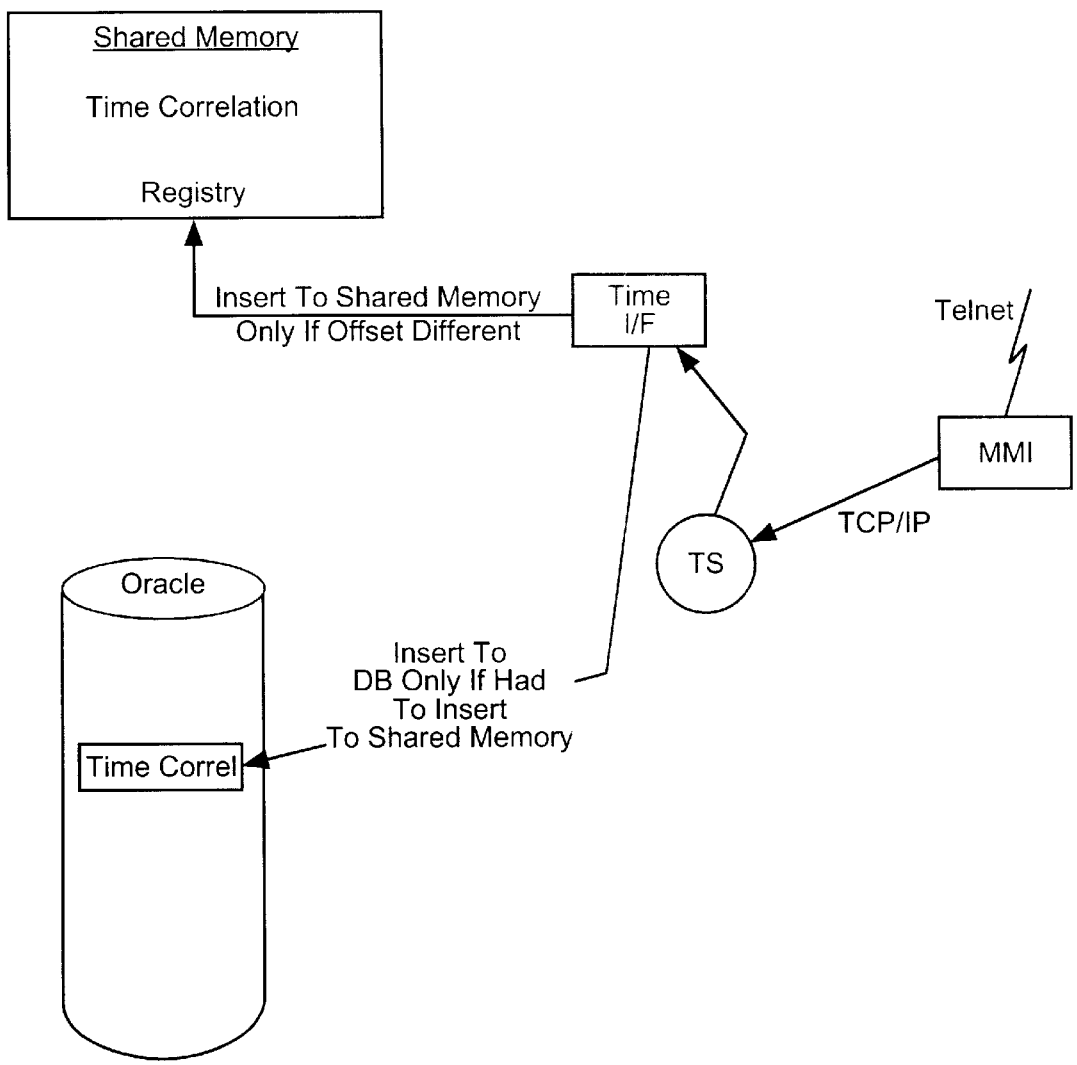
FIG. 22 is an exemplary block diagram of the Time Server (TS) function, consistent with an embodiment of the present invention.
Figure 23:
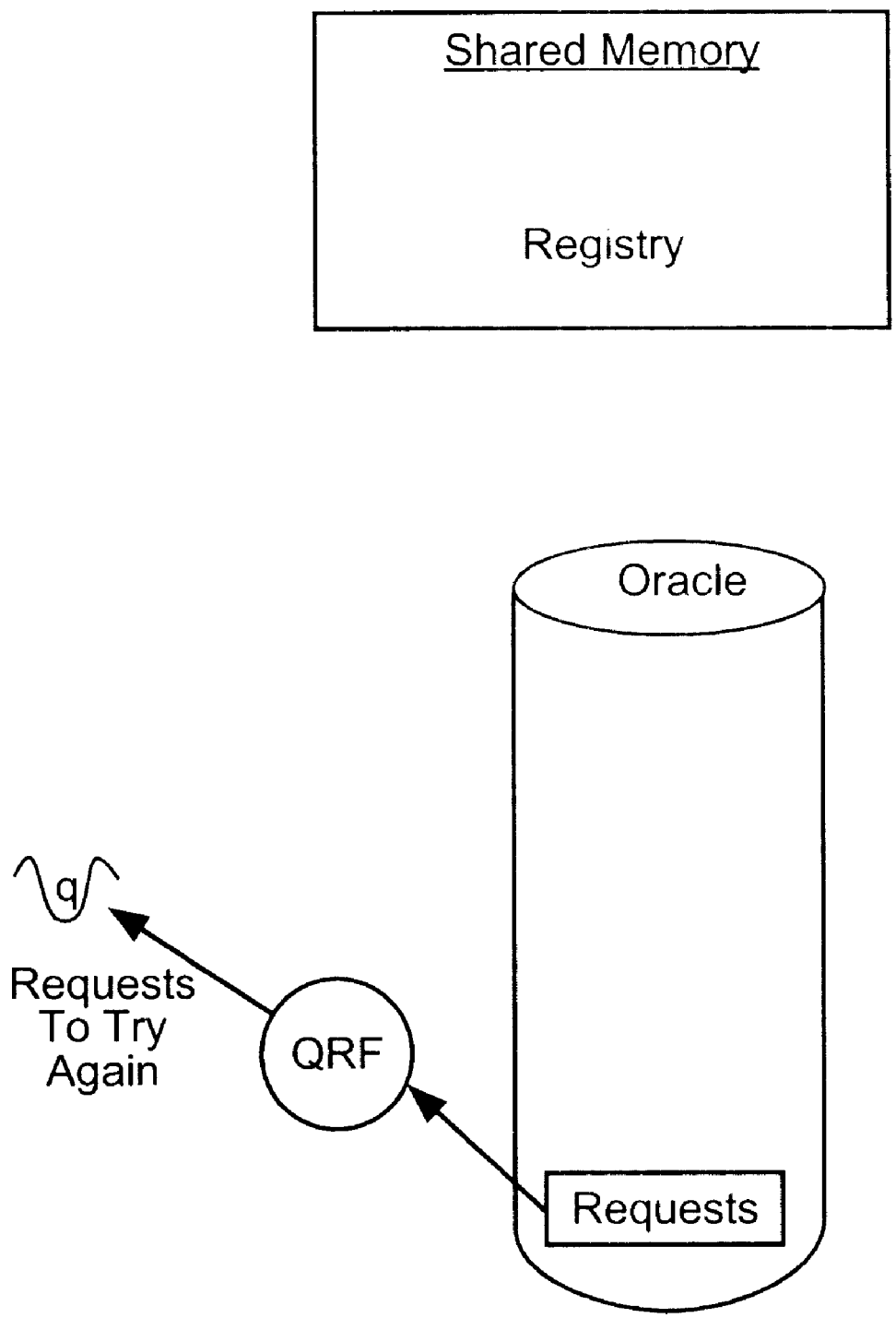
FIG. 23 is an exemplary block diagram of the Queue Refresh Futures (QRF) function, consistent with an embodiment of the present invention.
Figure 24:
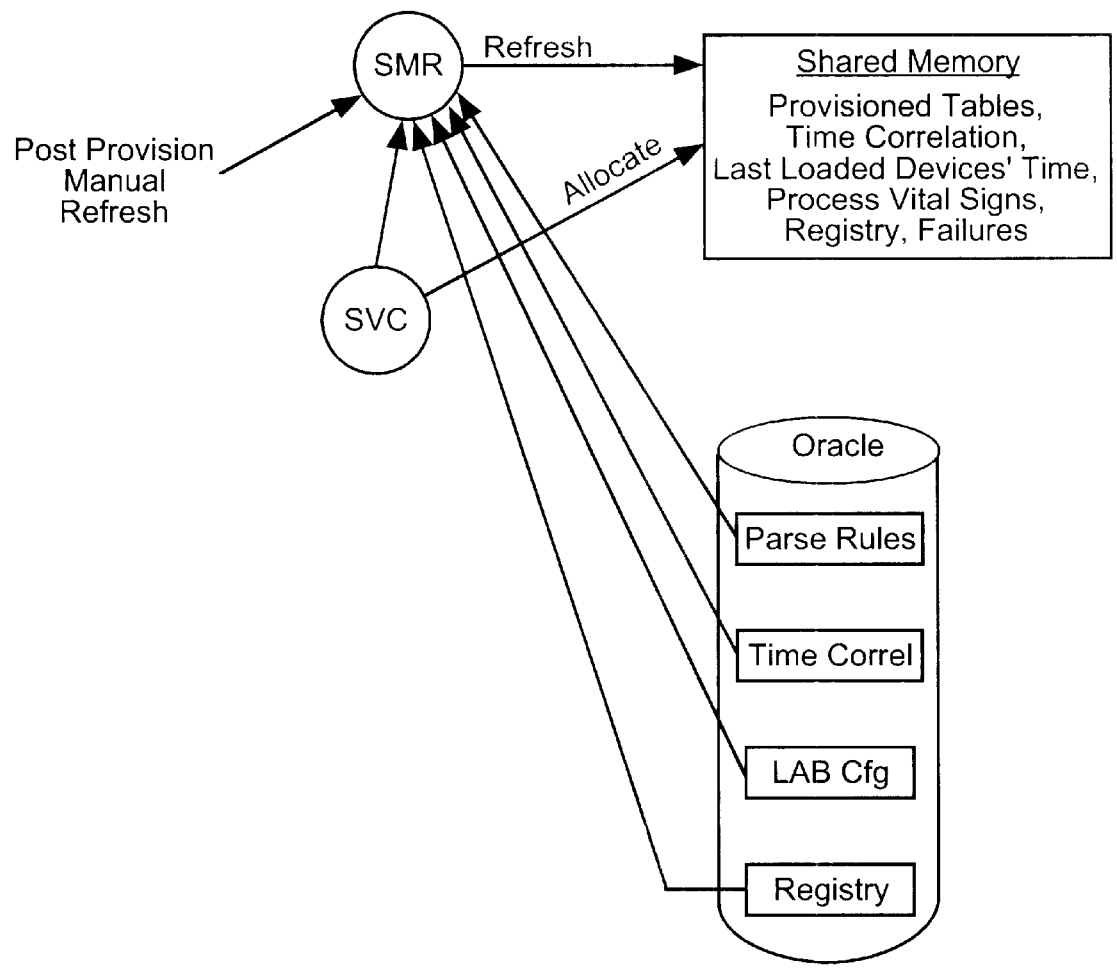
FIG. 24 is an exemplary block diagram of the Shared Memory Refresh (SMR) function, consistent with an embodiment of the present invention.
Figure 25:
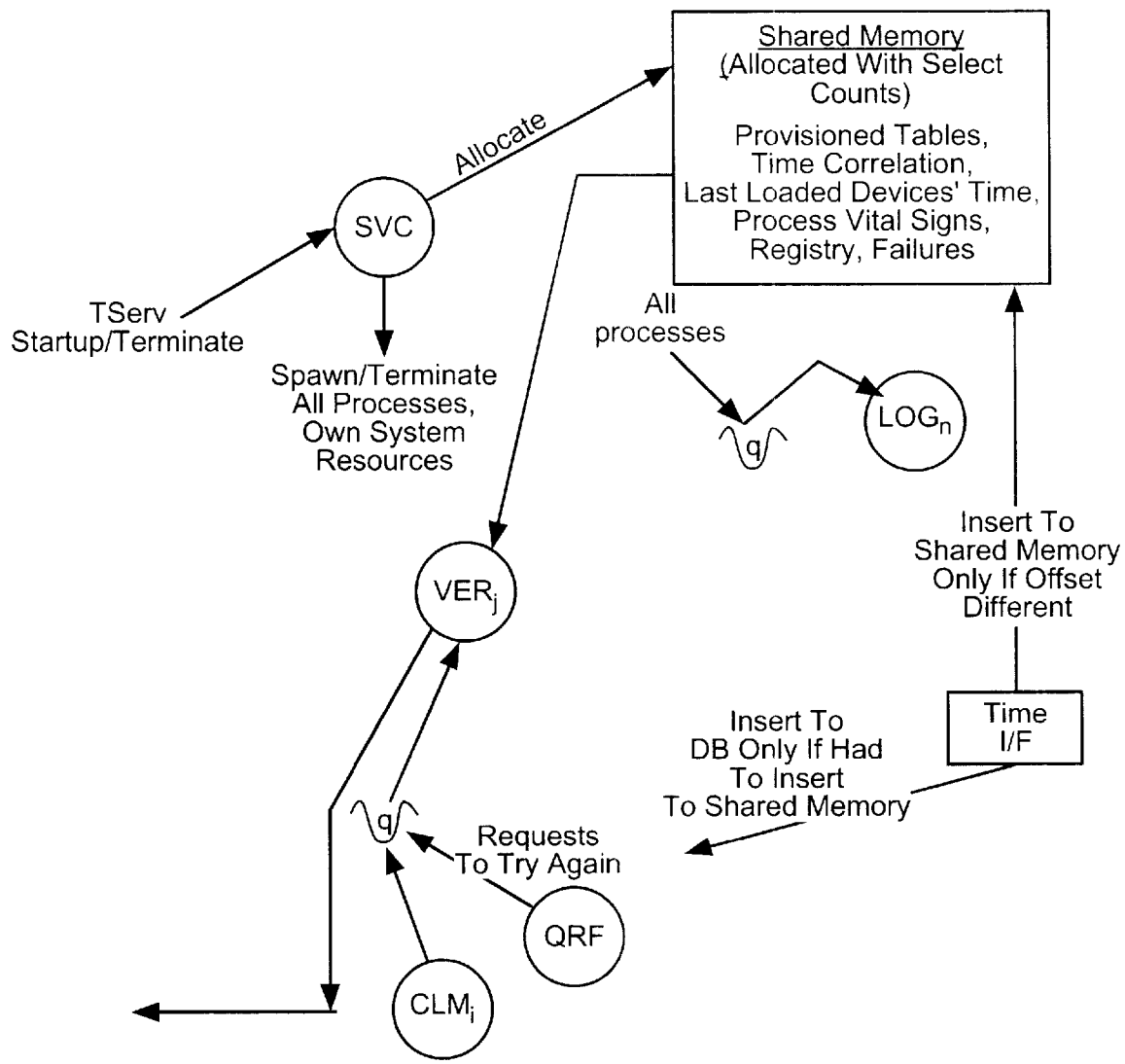
FIG. 25 is an exemplary block diagram of the interaction between the shared memory and other functions, consistent with an embodiment of the present invention.
Figure 26:
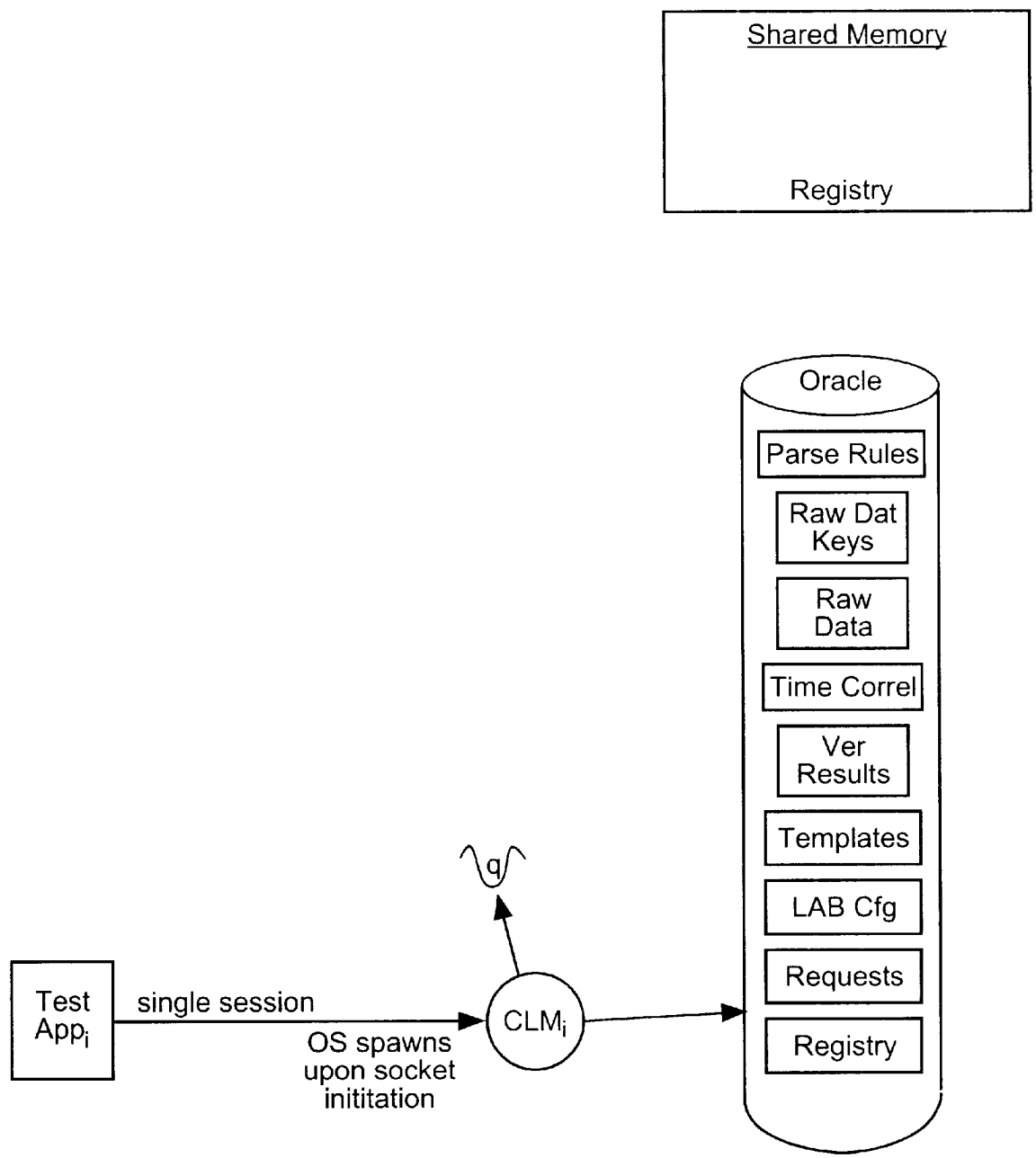
FIG. 26 is an exemplary block diagram of the Client Manager (CM) function, consistent with an embodiment of the present invention.
Figure 27:
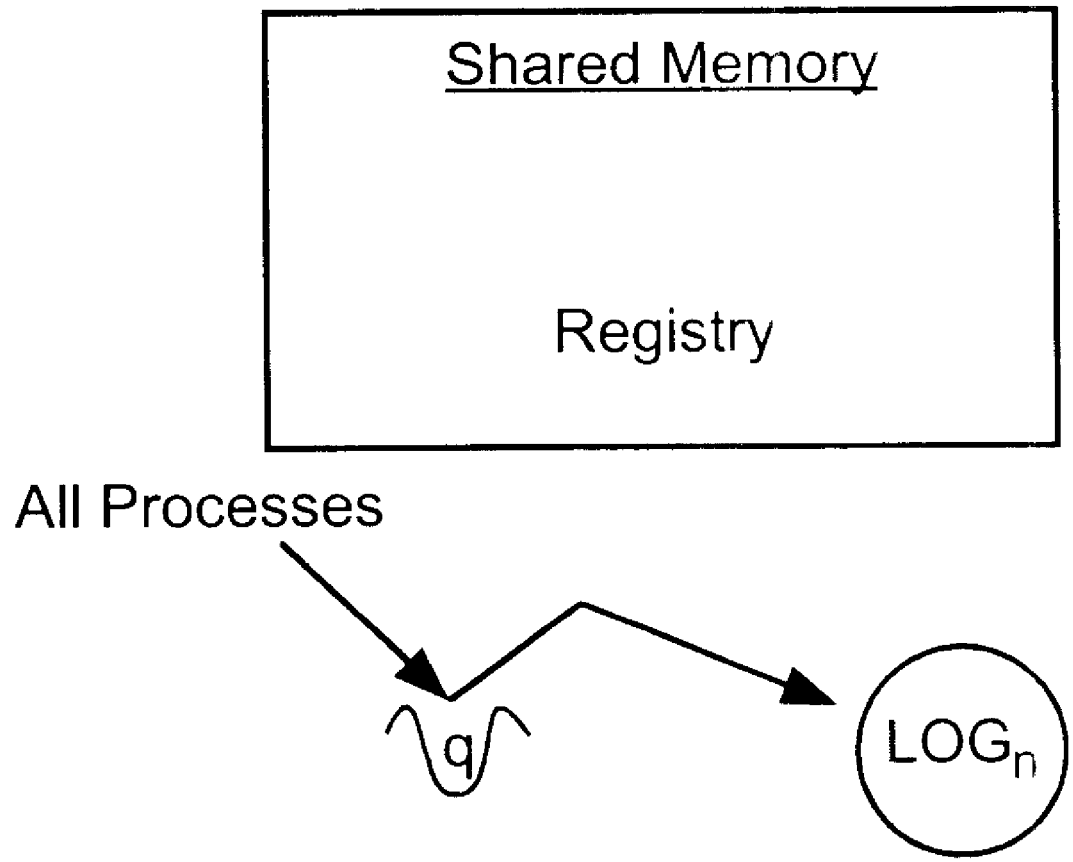
FIG. 27 is an exemplary block diagram of shared memory and logger (LOG) function, consistent with an embodiment of the present invention.
Figure 28:
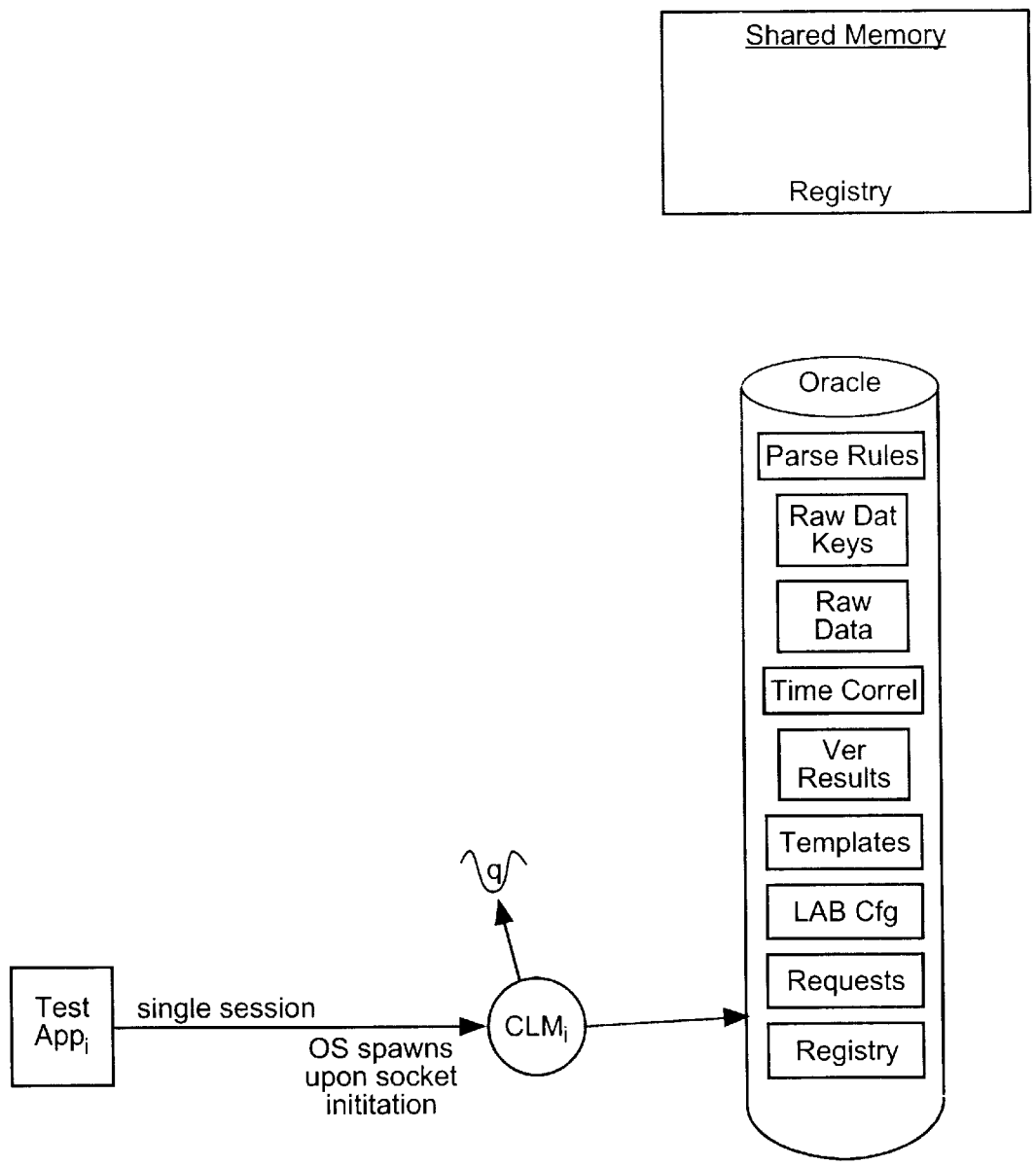
FIG. 28 is an exemplary block diagram of the Verification function, consistent with an embodiment of the present invention.

In the preferred embodiment, the invention is implemented on a programmable computer, or a network of such computers, as a set of asynchronous processes. FIG. 17 depicts the high-level design of the preferred embodiment. FIGS. 2 and 3 show a simplified block diagram of the preferred embodiment and its participating asynchronous processes. One or more network information concentrators (NIC's) 100, 105 provide call records 102 from telecommunications switches in a telecommunications network. In this disclosure the data records of interest are call records from telecommunications switches; however, other embodiments of the invention could generally process a stream of data records from other devices, using the claimed improvements. The service manager process 125 (discussed below and depicted in FIG. 1) spawns one or more collector processes 10, 115, 120, etc. (discussed below and depicted in FIG. 4), as well as all other processes of the preferred embodiment. Each collector process 110 writes blocks of call records to a common memory record queue 130. This, and other queues described in this disclosure, may also be written to disk storage, with a considerable loss of processing speed. In the preferred embodiment, the NIC 100 collects and feeds call records 102 in blocks of some convenient predetermined size, such as 32 call records. Decoder processes 135, 140, 145, etc. write decoded records to buffers in a memory file system 150. One advantage of having multiple decoder processes 135 is having more processes to handle the work load from the record queue 130. A disk file system could be used in place of the memory file system 150. The decoder process 135 is discussed below. Loader processes 155, 160, etc. take decoded records from the memory file system and mass load the records into a database 165. Preferably, the database 165 is a Structured-Query Language (SQL) database which accepts mass insertion of records and high performance query processing by other computer programs. The preferred embodiment of the invention comprises a shared memory scheme. Multiple processes can access data in shared memory, thus conserving system memory and also enhancing performance by not maintaining all data in the database 165. The loaders 155, 160 also write records and other information to log files and archive files 170. The archive files 170 contain an image of records in mass load form. As shown on FIG. 3, one or more clients 196, 198 connect to the system, preferably by a telnet connection to a known port, which in turn spawns a client manager process (CLM) 192, 194, etc. Each CLM 192, 194 communicates with the respective clients 196, 198 over TCP/IP, accepts requests from the respective clients 196, 198, and sends back responses. Each CLM 192, 194 writes requests to the database 165 and to a request memory queue 175. A configurable pool of verification request processing processes (VER's) 180, 185, etc. feed from the request memory queue 175. A given VER 180 stays blocked until a request is available form the queue. The goal is to give every request its own thread of processing as seen by the client 196. An instance of a VER 180 processes every type of request and returns the result to the client as quickly as possible. If the billing record of interest is not yet loaded from the switch the billing is sought from, then the request in the database 165 is updated for a future retry, and the VER 180 continues processing the next request, as explained below and in FIGS. 13–15. The requests of the request queue 175 are disposed of after they are processed. The image of the requests lives in the SQL database 165.

The preferred embodiment provides an ASCII text string interface for its clients. An ASCII interface is not necessary for practice of the invention, but it makes debugging easier. In the UNIX operating system configuration files /etc/inetd.conf and /etc/services (or corresponding files with different names on different versions of UNIX) are modified to provide automatic spawning of a client-manager process (CLM) 192 when a client telnets to a predetermined port on the system. When a CLM 192 is launched, it reads a configuration file which lists the supported commands and corresponding parameters. This permits convenient administration of CLM 192. The CLM 192 configuration file contains syntactical requirements of supported commands and corresponding parameters, and the semantical requirements of how to deal with parameters. For example, the type of the parameter can be defined for how to parse it, the type of SQL database column defined for how to convert and store it, and other special handling. The CLM 192 configuration file provides all intelligence in request processing. The CLM 192 processing is generic and behaves according to the configuration in the configuration file. As described in more detail below, a client could submit a string request containing a command prefix with individual parameters such as: VREQTC TCSECTION=800654 TCNUMBER=33 START_DT=19980512125603

END_DT=19980512125603 OSW_NAME=RES1 TSW_NAME=RES1

RES_NAME=RES1 NRETRY=0 MAXRETURN=5 TMPOVR=@=5;[=3;]=1;{=3}=1

PRI=HIGH

The parameter names indicate the type of parameter; for example, START_DT refers to a start date and time; TCNUMBER refers to a test case number; etc.

In the preferred embodiment, the system responds to a command string with a string that may consist of comments, errors and results. The comments and error codes returned can be flexibly written to test any of the many possible pathways and failure conditions as indicated by call records generated in a telecommunications system. For example, using the arbitrary convention that responses begin with a "+" and error codes with a "−", we could have as possible responses: "−10000 error: invalid tc section/number section:4 number:4" or "+1003 CompareResult: filedName= PD;expected value=2;operator===; reportedValue=5;failDescript=Passed with Problem Code; problem Code=276;When MCI05 is loaded with 3 digit CIC (as opposed to 4 dig CIC), the leading bit in the CN is now 0, not TBCD NULL"

Figure 11:
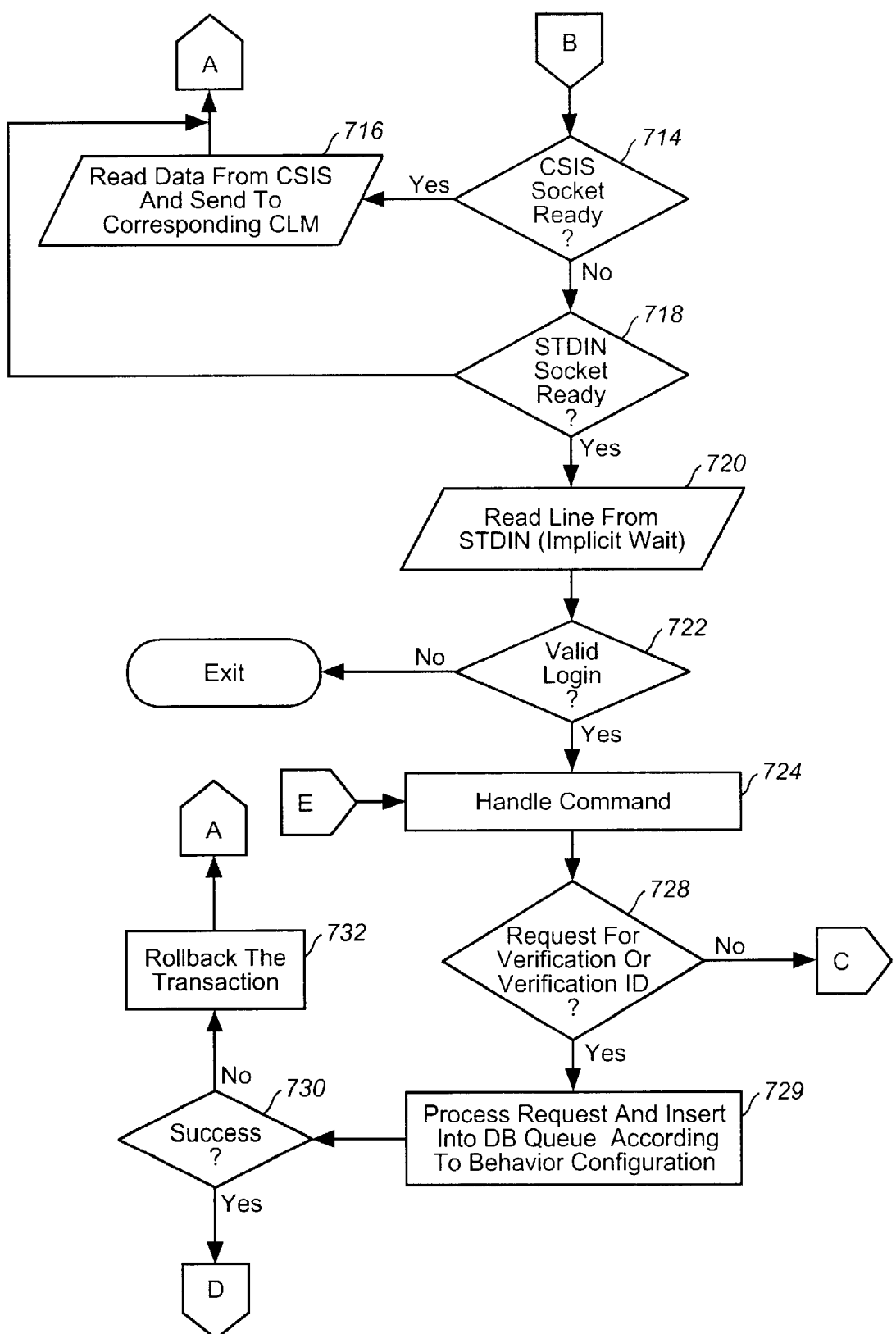
Figure 12:
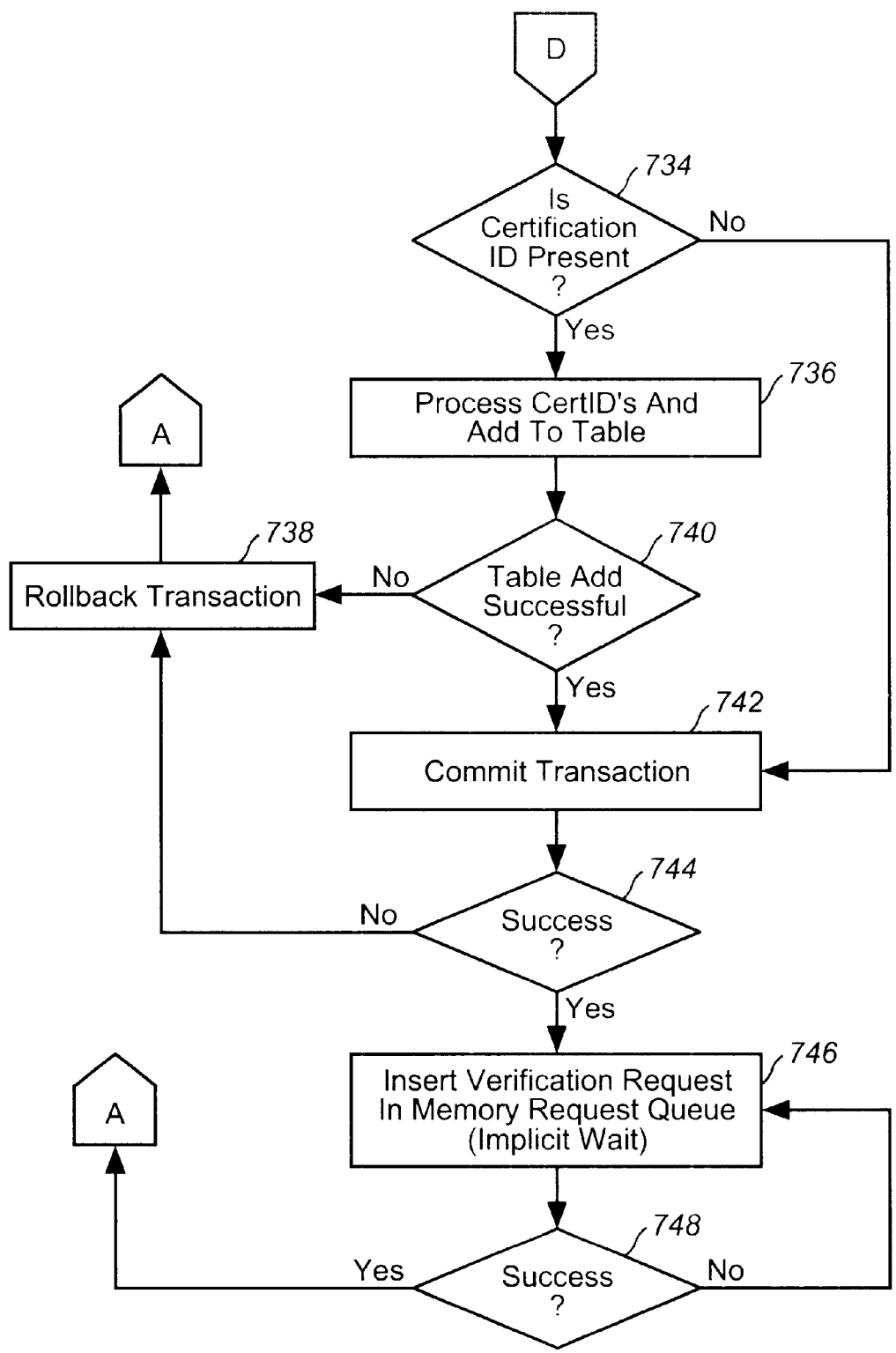

The reader should understand that the particular text strings used for commands, parameters, responses, comments, and error codes does not define the invention. These text strings may be crafted by designers of the system to display the system functions to operators in the most convenient way. Many other conventional command string and response formats could be used. The client manager process is described below and in FIGS. 10–12.

Figure 1:
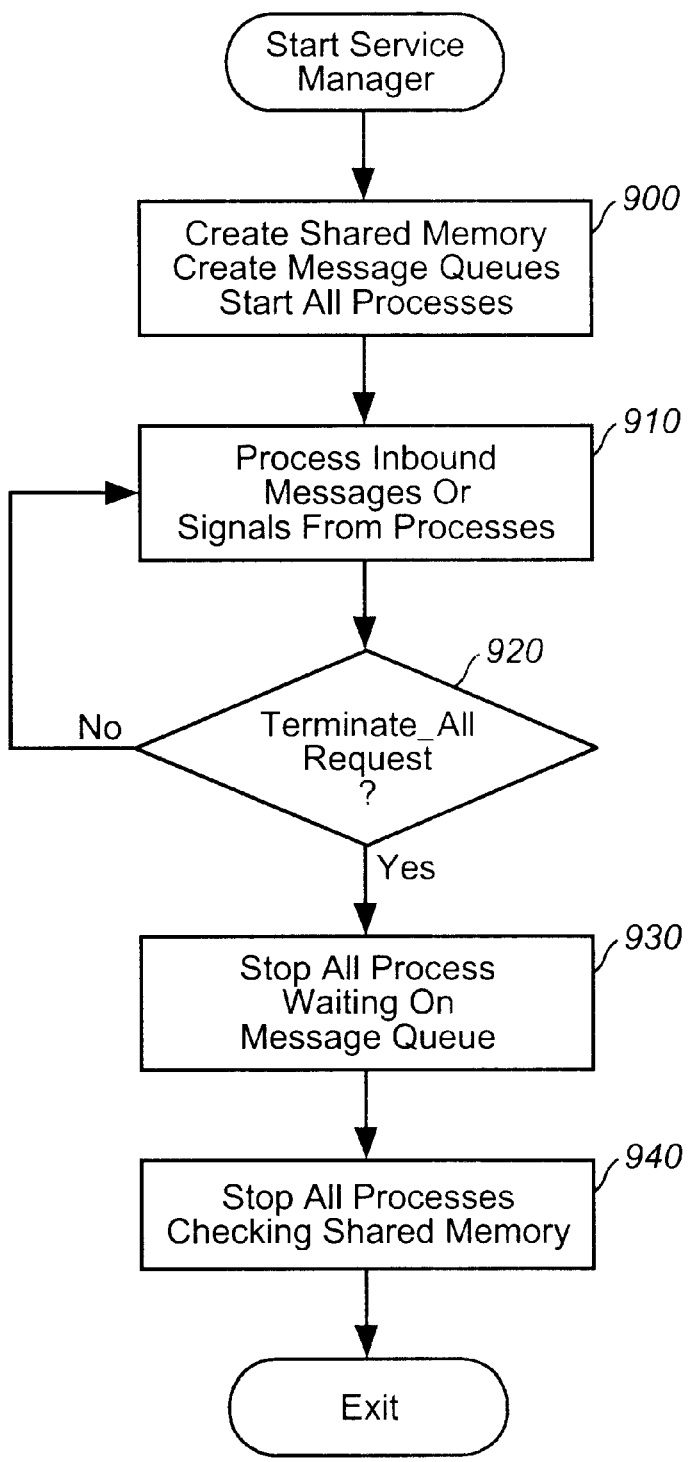
FIG. 1 is a flowchart depicting the service manager process in the preferred embodiment.

The service manager process 125 is depicted in FIG. 1. In step 900 the service manager 125 creates shared memory, creates memory queues, and starts all other processes. Steps 910 and 920 form the main processing loop for the system, as the service manager 125 processes all inbound messages or signals from processes. If a request is received to terminate all processes, the service manager, as shown in steps 930 and 940 stops all processes and exits.

Each collector process 110 is an asynchronous process started by the service manager 125. The flow chart of FIG. 4 describes the main steps in each instance of the collector process 110. In the first step 200 the collector 110 initializes its variables by reading from a registry file (not shown) for appropriate initialization. (The reader will understand that when this disclosure speaks of "the collector" or of an instance of any of the other asynchronous processes described in this disclosure, it is intended to refer to any number of similar processes which may be running.) In the next step 210 the collector 110 initializes its session to an NIC 100 by making a connection to the NIC 100 through the network and receiving confirmation from the NIC 100. In step 220, the collector 110 gets the next block of records from the NIC 100 and verifies that the block of records is good in step 230. If the block of records is not good, it is logged in step 240, and execution returns to step 220. If the block of records is good, the collector 110 checks for the end of available blocks of records in step 250. If blocks of records are available, the block of records is written to the queue 130, and execution returns to step 220 to get another block of records. If no more blocks of records are available from the NIC 100, the collector 110 stays blocked on I/O from the NIC. The end result of the collector 110 processing is the placement of valid blocks of call records onto the record queue 130.

Figure 5:
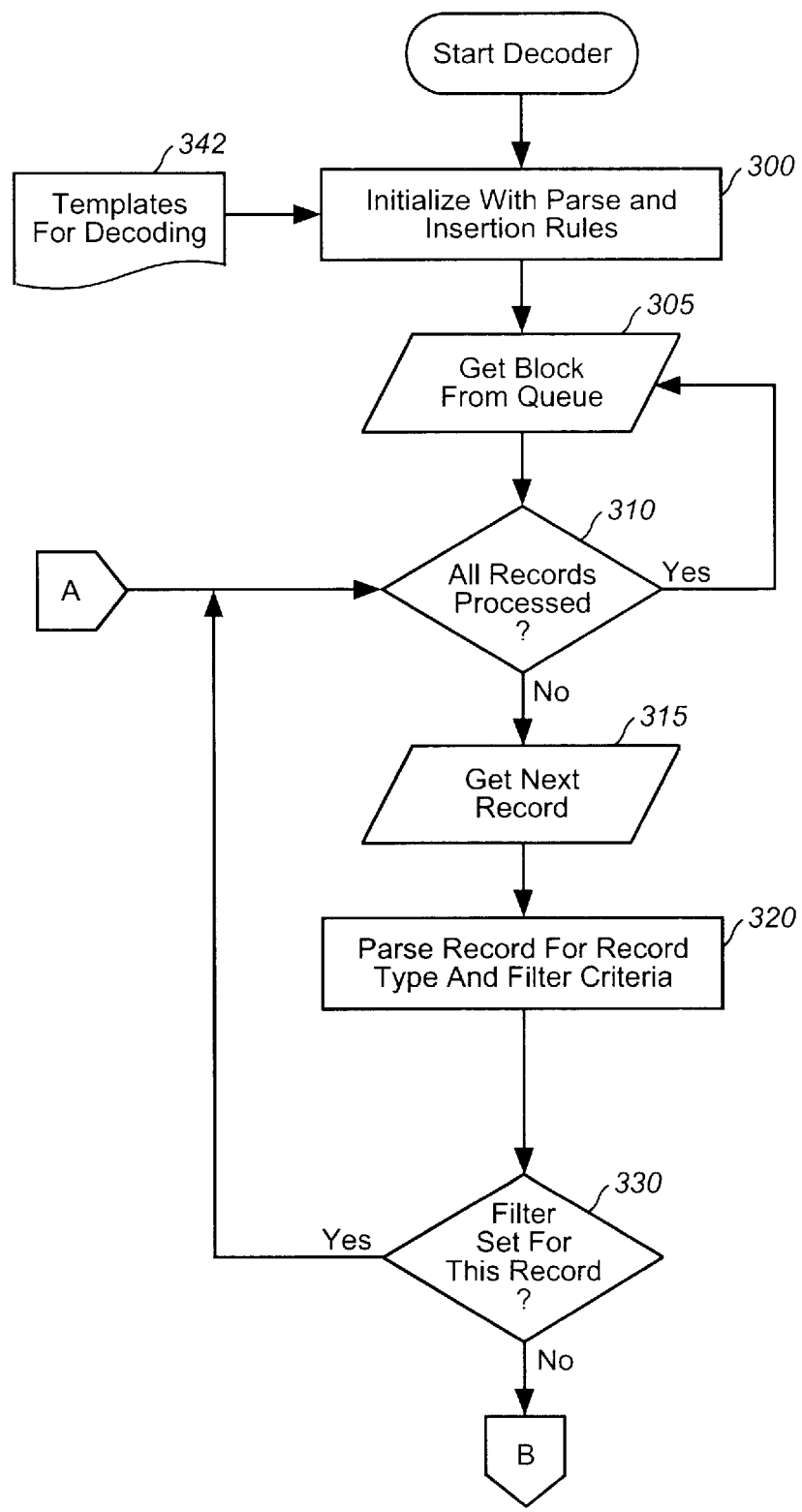
FIGS. 5 and 6 are flowcharts depicting the decoder process in the call-record component of the preferred embodiment.
Figure 6:
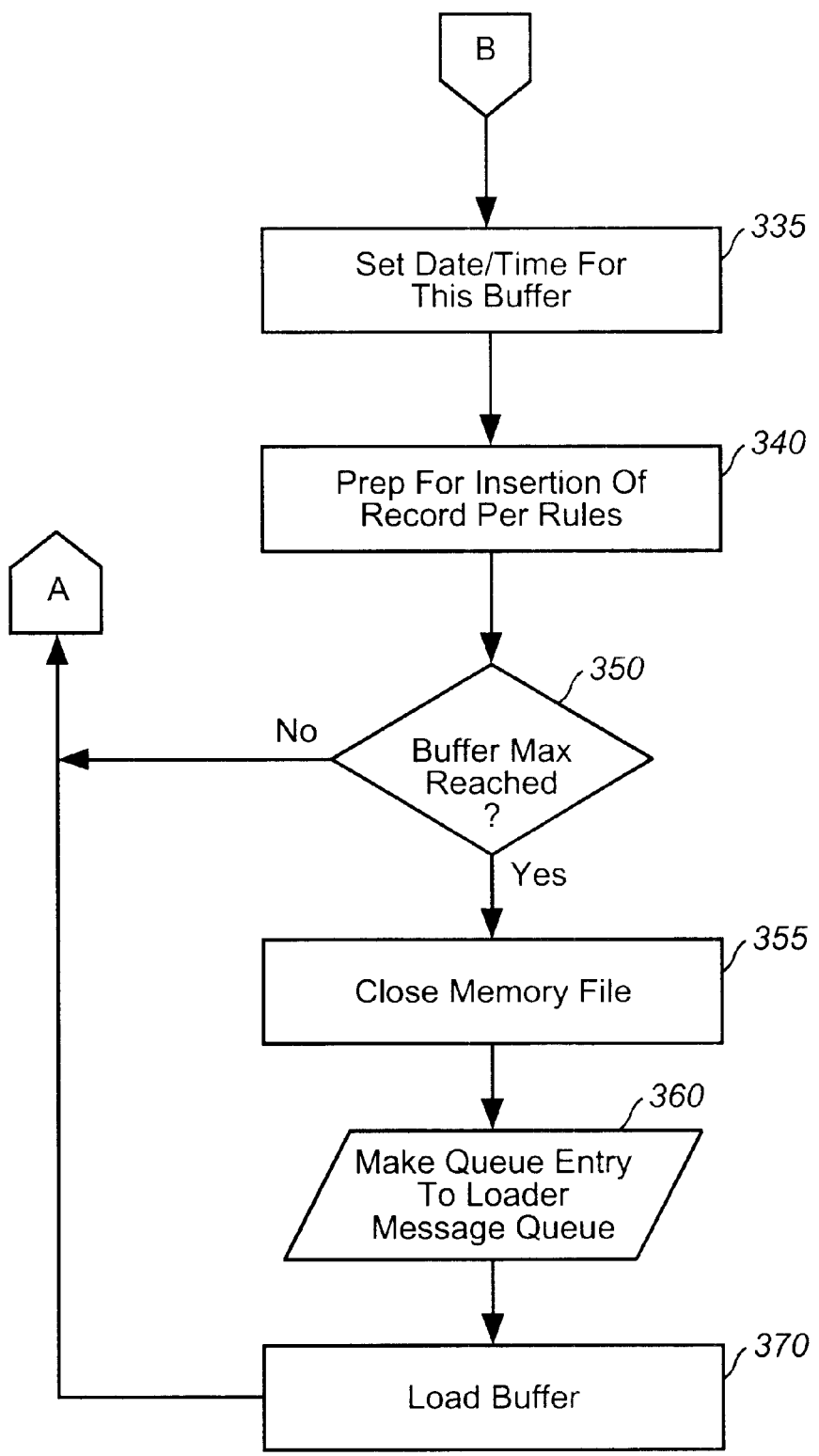

The service manager 125 starts a number of decoders 135, as shown in FIGS. 5 and 6. Each instance of a decoder 135 gets blocks of call records from the record queue 130 and processes each call record in the each block according to certain rules embodied in first predefined templates 342. These templates 342 generally comprise the rules for formatting of call records for insertion into the database 165, and the decision to load or not to load certain call records 102 according to filter rules. For example, blocks may be filtered by device, by record type, by particular fields within a record, or by characteristic of the data. In the preferred embodiment, the first templates support equality or inequality tests on values in the call records. In the preferred embodiment, a decoder retrieves its filter specifications by reading a table specified by a registry variable.

Referring to FIG. 5, the decoder 135 begins by initializing its parsing and filter rules in step 300, reading from templates 342 for the decoding process. It then gets a block from the memory queue 130. Step 310 tests if all records in the block are processed; if so, execution returns to step 305 to retrieve another block. If not, the next record is retrieved in step 315. The retrieved record is parsed to determine its record type and filter criteria in step 320; then a check is made to determine if a filter is set for the record in step 330. If, so, the record is skipped, and execution returns to step 310. If no filter is set, execution continues to step 335, continuation block B shown on FIG. 6. The date and time is set for the first record in the buffer in step 335. Then step 340 prepares the record for insertion into the database according to predetermined rules. Step 350 checks to see if the predetermined maximum buffer count is reached. If not, execution continues at step 305; if so, then the buffer must be written to a queue for a database loader process 155. Step 360 makes a queue entry in a loader queue. At step 370, the database loader process 155 is signaled to load the filtered and parsed records to the database, and execution continues at step 310.

Figure 7:
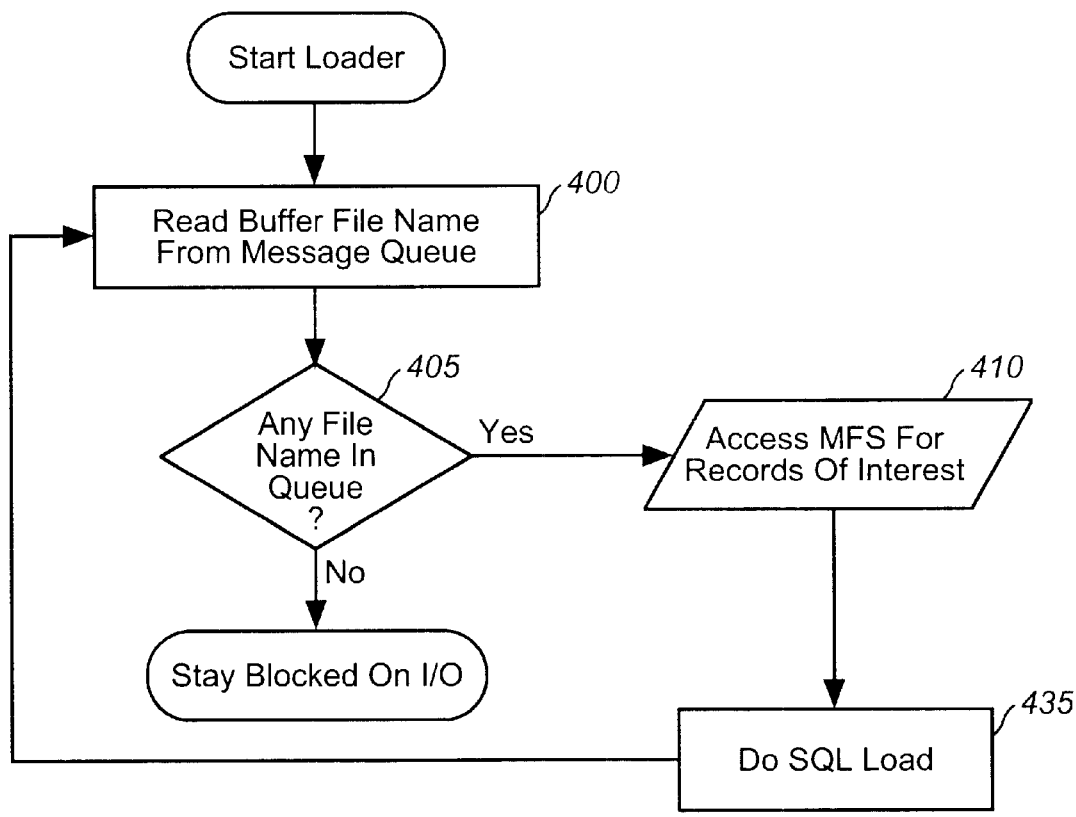
FIG. 7 is a flowchart depicting the processes used to accomplish a database load in the preferred embodiment.

The next component of interest in the preferred embodiment is the loader process 155, described in the flowchart of FIG. 7. When a decoder 135 signals the database loader to load in step 370, the signal is caught by the loader process 155. In steps 400 and 405 of the loader, the process checks the buffer of interest to see if it has been processed; that is if there are any old (unprocessed) records in the buffer, which will be evidenced by a file name in the queue. If not, the process exits. If old records exist, these are written to the database 165 in the following steps. At step 410, the set of records of interest is retrieved from the loader queue. At step 415, the actual set of records is retrieved from the memory file system (MFS), and at step 435, the set of records is loaded into the database 165. The buffer is reinitialized from its start at step 440, and the process stays blocked on I/O, awaiting its signal.

Figure 8:
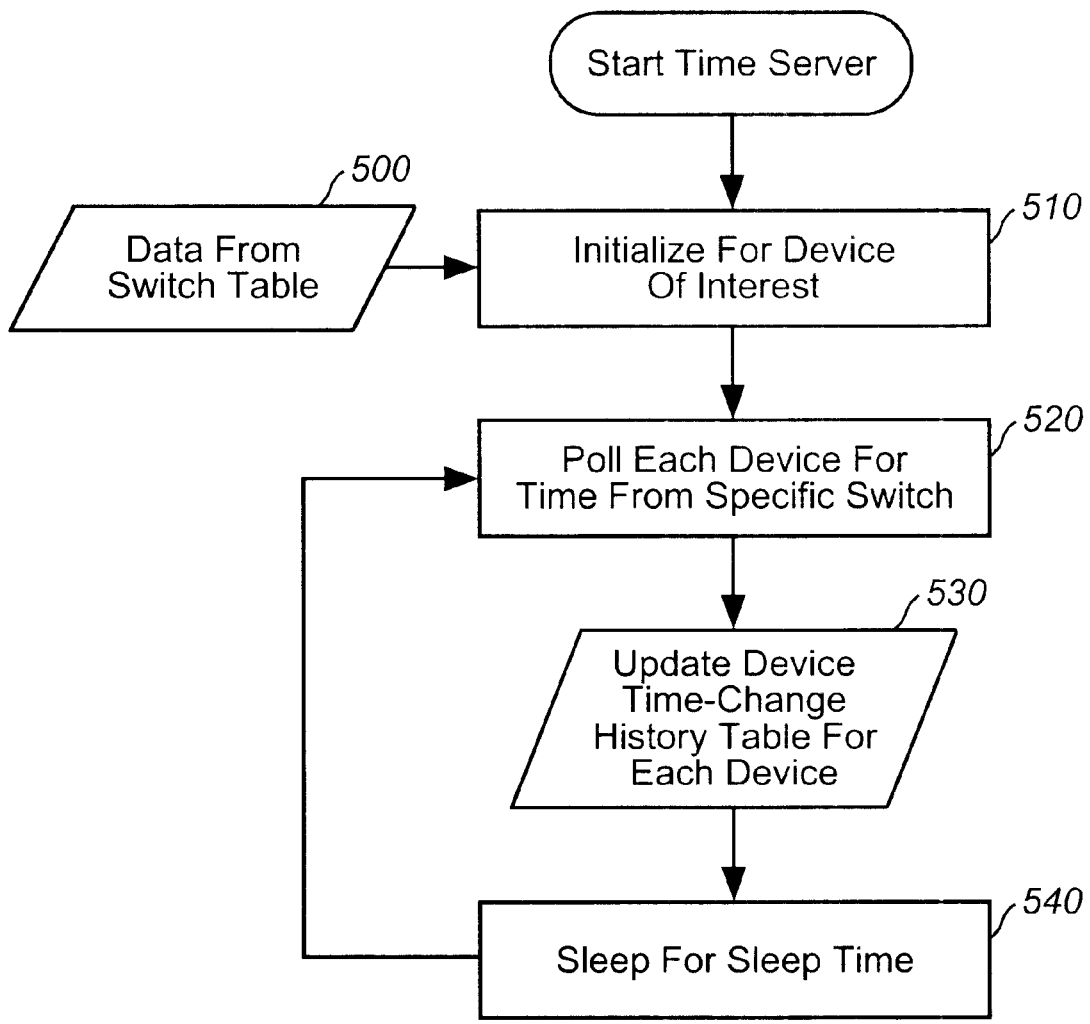
FIG. 8 is a flowchart depicting the time server process in the preferred embodiment.

A time server process, depicted in FIG. 8, deals with the problem of time correlation on the network. On the network, a conventional network time protocol (NTP) keeps devices on the network synchronized. However, devices sending data records may not use a network time protocol. It is thus necessary to correlate the time of such devices to the system time, so that the system processes see time that correlates to the call record switch times. The time server process accomplishes this by using the offset between the switch time and the system time to properly offset the request time parameters in the system to times in the call records from that particular switch. The time server process first initializes itself at step 510 for the devices of interest by reading, in step 500, from a table containing device data. This device data will include information about where the device address is located, how to log in (for example, a user name and password), any reply which is to be ignored, and the appropriate command to issue. The time server process polls, at step 520, each device for time. In the disclosed embodiment, these devices are telecommunications switches, but the scope of the invention is not limited to such switches. At step 530, the process updates the device time-change history table for each device. Finally, it sleeps for a predetermines time in step 540, and execution returns to step 520.

In general, telecommunications switches will have an administrative interface, which allows the switch time to be changed. The time server process of FIG. 8 handles time drift to account for varying clock speeds. The administration interface (not shown) ensures that a time change to a device is reflected with an appropriate update to the device time-change history table in a manner where polling depicted in FIG. 8 is properly synchronized to direct changes to the device time change history table. In the preferred embodiment, time changes are sent to the database 165, where a record is kept of device time changes. Data in the device time-change history table is guaranteed to reflect correct correlation of the preferred embodiment's system time with the device times of interest.

Figure 9:
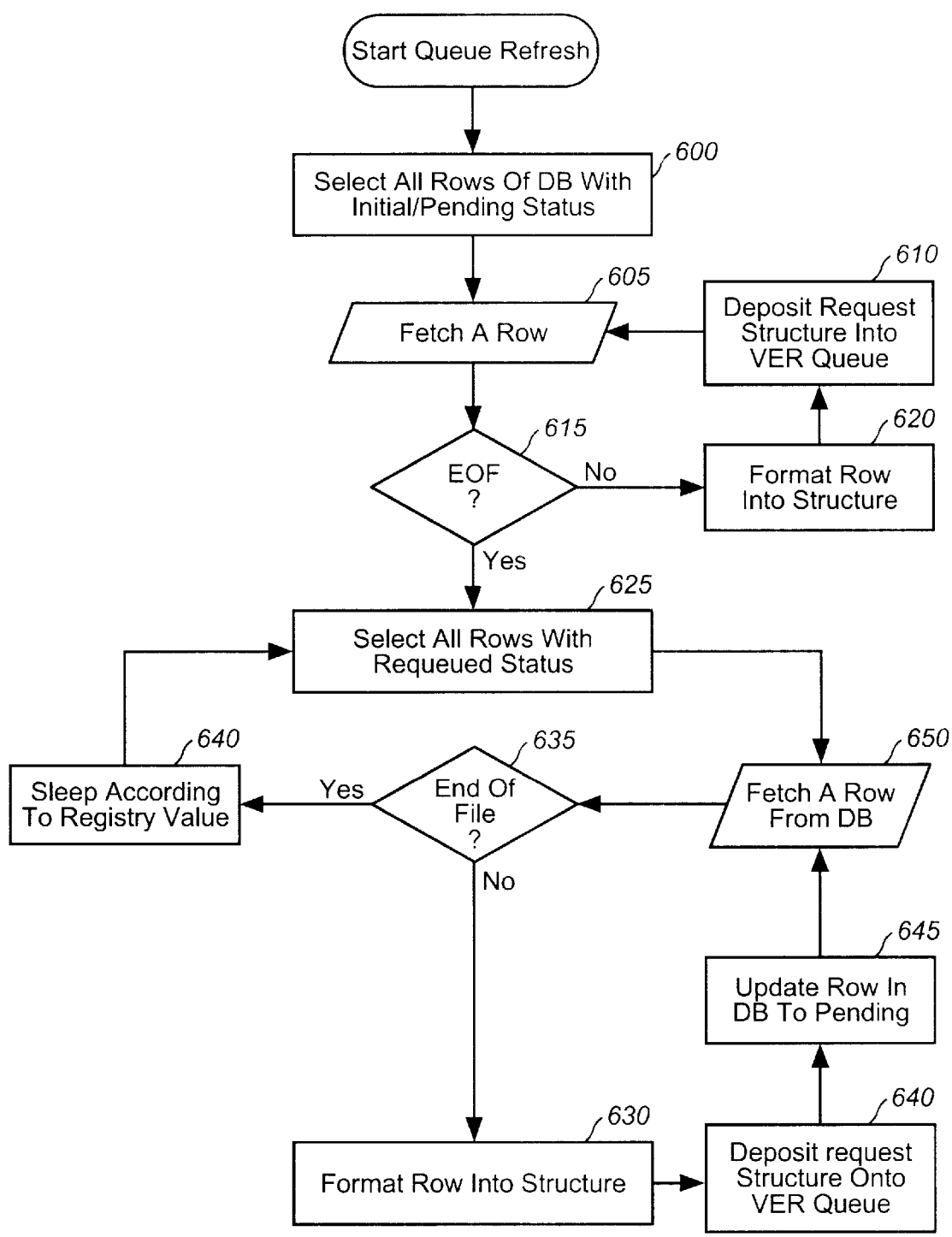
FIG. 9 is a flowchart depicting the queue refresh futures process in the preferred embodiment.

The verification processes 180 may request call records 102 which are not yet available. In this case, it is necessary to store such requests and periodically attempt to retrieve the records. In the preferred embodiment, this is handled by a query-refresh futures process (QRF), described in FIG. 9. The process begins at step 600 by selecting all rows of the database 165 with a status of initial or pending requests. At step 605, the process fetches a row and checks for and end-of-file condition (EOF) at step 615. If the end of file is not reached, the row is formatted into a structure in step 620 and this request structure is deposited into the VER queue in step 610. Execution then returns to step 605 to fetch another row from the database 165. Steps 600, 605, 615, 620, and 610 process requests that have not yet been seen by a verification process; for example, if the system was powered off or terminated prematurely.

If EOF was detected in step 615, the QRF process then selects all rows with a requeued status in step 625, and fetches such a row from the database 165 in step 650. If EOF is detected in step 635, the QRF process sleeps for a predetermined time in step 640, then returns to step 625. If EOF was not detected in step 635, the row is formatted into a request structure in step 630; the structure is deposited onto the VER queue in step 640, the corresponding row in the database 165 is updated to pending status in step 645, and execution returns to step 650 where another attempt is made to fetch a row having requeued status from the database 165. Steps 625, 635, 640, 645, and 650 process requests seen by a verification request that require a future retry.

It is convenient to next describe the client manager process (CLM) 192 of the preferred embodiment, before explaining the steps of the verification process (VER) 180. Each client 196 which connects to a well-known socket, causing a spawn of a corresponding CLM 192. The CLM 192 accepts requests from the client 196 and sends back responses. In the preferred embodiment, a client 196 receives a request identification (request ID) from the CLM 192 as an acknowledgment to its request. That request ID is the handle for receiving a later response. Typically, automated clients will bombard the system with many requests, often before billing arrives from the NIC's 100, 105, etc. Thus, we have a requirement to store requests for call records in the sought call record has not yet arrived. The CLM writes requests to the database 165 and to a request memory queue 175, as shown in FIG. 1B. The database 165 provides persistent storage for the requests.

Figure 10:
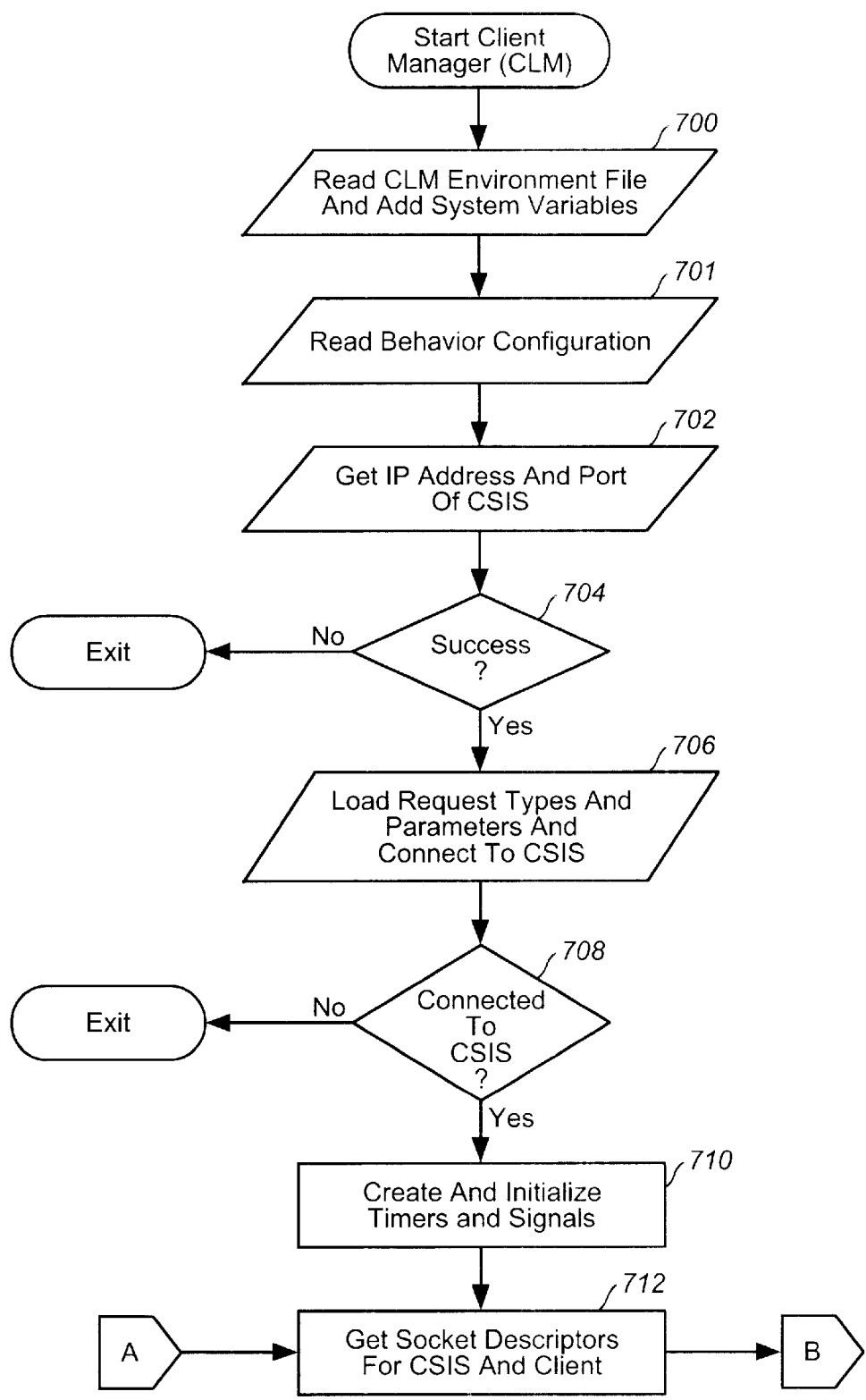
FIGS. 10 through 13 are flowcharts depicting the client manager process in the preferred embodiment.

As shown in FIG. 10, the CLM 192 begins at step 700 by reading its environment variables, and the its behavior configuration from a CLM 192 configuration file (step 701). The CLM 192 is spawned with appropriate login parameters. At step 702 it gets the IP address and port of a process providing communications between the verification process and clients 196. In this disclosure this process is called CSIS.

The CSIS process implements a conventional means to match the socket ID of a CLM 192 with the session ID and the STDOUT ID (standard output on UNIX systems), so that verification processes know where to send responses for routing back to a client. Step 704 verifies login parameters, and if these are invalid, the CLM 192 exits. Additionally, the communications link access in step 702 is checked in step 704, and if it was not successful, the CLM 192 exits. If step 702 was successful, then in step 706 the process loads its request types and parameters from the CLM 192 configuration file and attempts to connect to CSIS. Connection to CSIS is checked in step 708. If not successful, the CLM 192 exits. If access was successful the CLM creates and initializes its various timers and signals in step 710, and gets socket descriptors for CSIS and the client 196. Execution continues as depicted on FIG. 10 through continuation block B. We check in step 714 if the CSIS socket is ready, with response data from a verification process to return to the client. If it is, step 716 reads data from the socket and sends it to the client that is connected to this CLM 192. Execution then continues at step 712, as shown by continuation block A. If the CSIS socket is not ready with response data, we check for any STDFN (standard input device on UNIX systems) data ready in step 718. When ready, the CLM 192 reads from STDIN in step 720 until a terminator is detected, and checks for a valid login by the client in step 722. The read from STDIN implies a wait for input. If has been no valid login, the CLM 192 exits. If the client has made a previous valid login, the CLM 192 begins to handle commands from the client 196 in step 724 and following steps. It should be noted that step 712 implicitly waits for the system to indicate availability of STDIN (request data from a client), STDOUT (response data to send back to the client, or a signal from the service manager. Thus step 712 waits for one of these events.

First, the CLM 192 checks in step 728 for a request for verification or a verification ID. If either request is received, the request is processed and inserted into the request queue in step 729. Successful processing of the request is checked in step 730. If the request could not be processed, the transaction is rolled back in step 732 and execution continues at step 712, depicted in FIG. 10. If request processing for the verification request is successful, execution continues at step 734 depicted on FIG. 12, through continuation block D. Step 734 checks to see if a certification ID is present. A "certification ID" in the preferred embodiment is an identifier of a list of test cases to be verified. This allows tagging of a group of test cases to a batch ID. A test case may belong to a plurality of certification batches. Such certification ID's are stored in step 736 with the request. If no certification is present, execution flows to step 742, where the record is committed to the database 165. Step 740 checks for a successful add to the request's certification table; if the add was not successful, the transaction is rolled back in step 738, and execution returns to step 712. If step 744 determines the transaction was not successfully committed to the database 165 in step 742, then the transaction is rolled back in step 738 and execution proceeds to step 712. If the transaction was successfully committed, then the verification request is inserted in the memory request queue in step 746. If step 748 determines this insertion was successful, then execution returns to step 712; if not, execution returns to step 712. Steps 746 and 748 wait until the memory queue is available for insertion (queue full condition). This situation rarely occurs because verification processes handle requests quickly.

Figure 13:
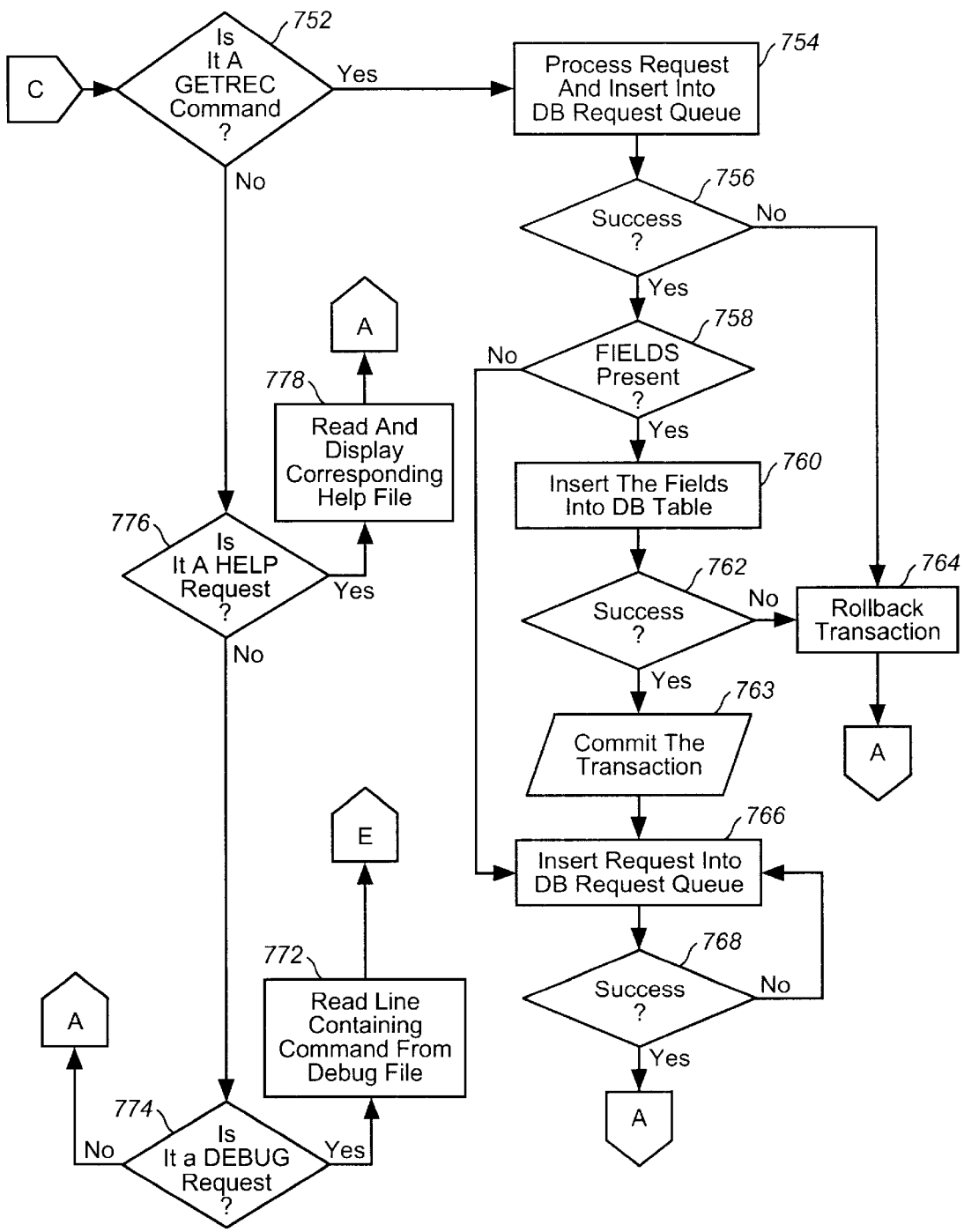

If, at step 728, the system determines that the request is not for verification, execution proceeds to step 752, depicted on FIG. 13, through continuation block C. A test is made at step 752 to see if the request is a request to get a record from the database 165. If not, a test is made at step 776 to see if the request is for help. If so, the corresponding help file is read and displayed at step 778, and execution returns to step 712. If the request was not for help, a test is made at step 774 to see if the request is for debugging. If so, at step 772, the line containing the command is read from the debug file maintained for records generating error messages, and execution proceeds to the command handler at step 724 on FIG. 10, through continuation block E. The reader should understand that procedures for implementing help and debugging features are well-known in the art and do not define the invention.

If the test at step 752 found a request to get a record (i.e., perform a search), execution proceeds to step 754, where the request is inserted into the request queue. A test is made for success at step 756. If the insertion was not successful, the transaction is rolled back at step 764 and execution proceeds to step 712. If the insertion was successful, the request is tested at step 758 to determine if a request for particular fields of the call record requested is present. If so, the fields are inserted into the a database table at step 760. If the insertion was not a success, the transaction is rolled back at step 764, and execution returns to step 712. Otherwise, the request is committed to the database in step 763 and inserted into the database request queue at step 766. If the insert request for the queue tests successfully at step 768, execution proceeds to step 712; otherwise execution continues step to 766.

Figure 14:
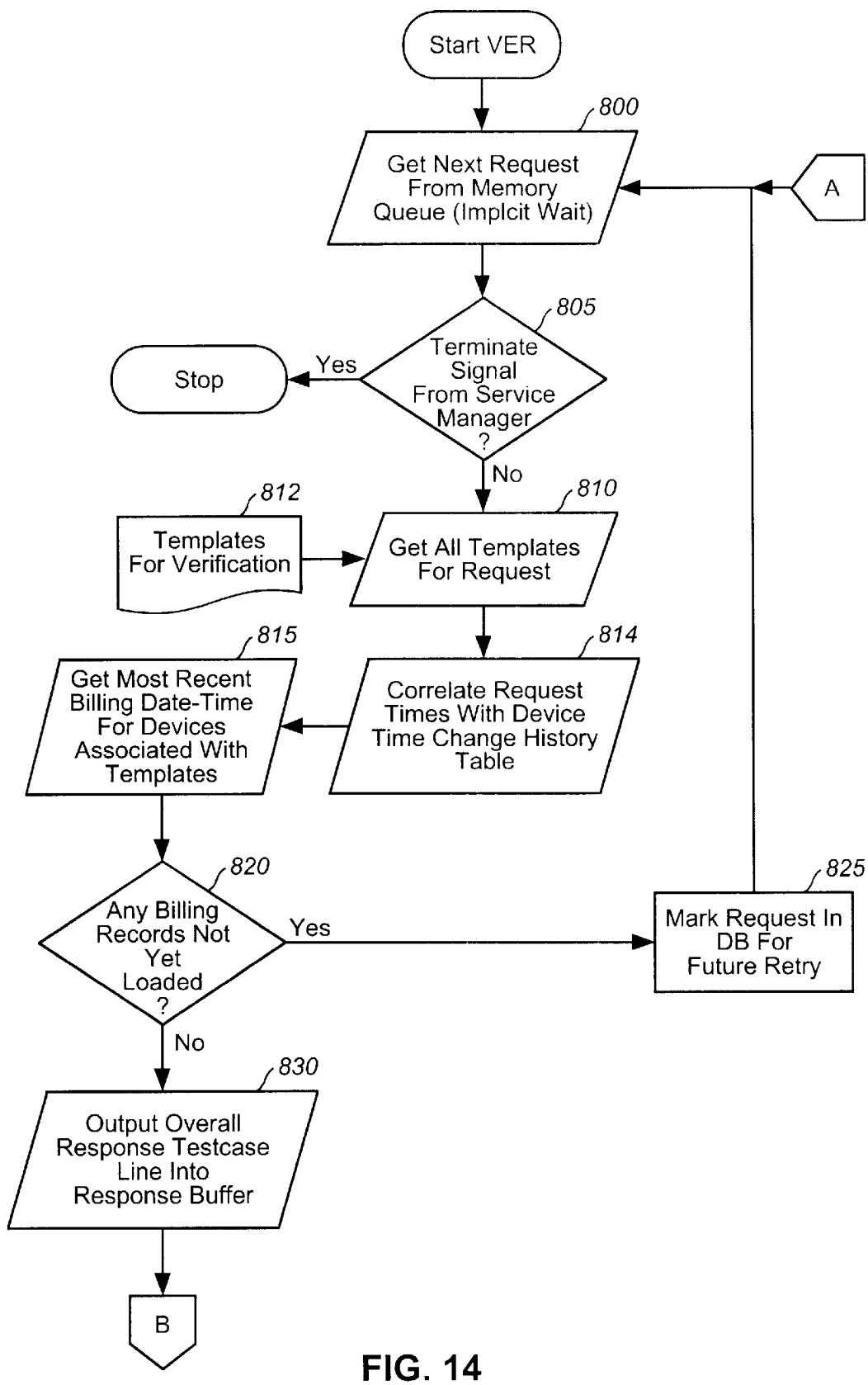
FIGS. 14 through 16 are flowcharts depicting the request-processing and request-verification process in the preferred embodiment.
Figure 15:
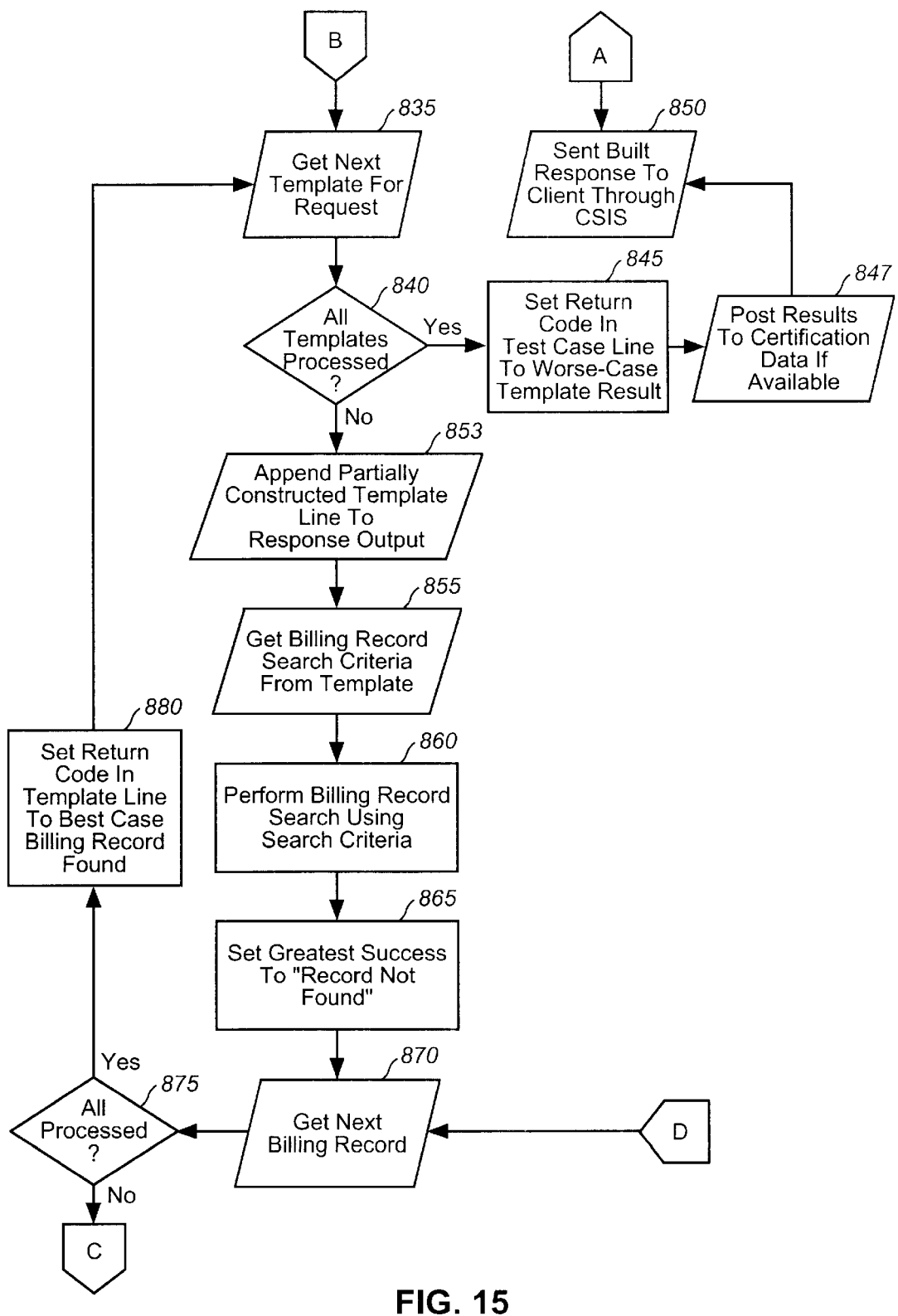

We now turn to a description of call record verification request processing in the preferred embodiment. FIG. 14 depicts the beginning of a verification (VER) process 180. A pseudocode listing of the VER process 180 of the preferred embodiment may be found at pages 35 through 37 of the Appendix. The VER 180 gets the next request for record verification from the appropriate memory queue in step 800, with an implicit wait. Next, the process checks at step 805 if a signal has been received from the service manager 125 to terminate, that being the reason for the exit from step 800. If such a signal is received, the VER process 180 terminates, otherwise, execution flows to step 810 to get all templates for the request from a store of second predefined templates 812. The templates retrieved from second predefined templates 812 contain information for how to seek for a call record associated with a testcase (i.e. a call made into the test network) from the SQL database 165, including the device that should generate the record, and how to verify the record after it is found in the SQL database 165. Then, step 814 correlates system time of the preferred embodiment (i.e., client request time parameters) with device times in templates, so a proper search query is built to find the call record in the SQL database 165. In step 815 the VER 180 gets the most recent billing date-time for devices associated with the second templates. Step 820 checks to see if all billing records should have been loaded yet for the second templates; if not, such requests are marked in the database for retry in step 825, and execution returns to step 800. There are provided database triggers in the SQL database 165 that update the most recently received date/time stamp for call records received by devices. Step 820 accesses the values for devices of the second predefined templates 812 to see if all records of the test case are indeed loaded yet. Time correlations from step 814 are used to compute the date/time stamp of the most recent device call record date/time stamps. Not until all call records should be present as determined by step 820, will step 830 continue processing. If all billing records should be loaded, the VER 180 outputs a partially constructed overall response testcase line into the response buffer at step 830. In the preferred embodiment, the output of the VER 180 is built on the fly and response lines are collected in a buffer (not shown). Execution continues through continuation block B to FIG. 15. Step 835 gets the next template 812 for the request. If all testcase templates 812 are processed, step 840 sends execution to step 845, where the return code in the test-case line is set to the worst-case template result. Then step 847 puts the testcase results to a certifications data if one or more certification ID's were associated with the testcase. The results posted allow a certification interface to access results from the SQL database 165. Thereafter, the built response is then sent to the client through the CSIS process in step 850. If all templates 812 are not processed, execution proceeds to step 835 where a partially-constructed template result line is appended to response output. Then, step 855 reads billing record search criteria from the template 812. Step 860 performs billing record search using the search criteria just obtained. Step 865 initializes the greatest success to "record not found," and passes execution to step 870 to get the next billing record found. Step 875 checks whether all billing records are processed. If so, step 880 sets a return code in the response template line to the best case of verification results of the billing record found, and passes execution to step 835 to get the next template 812 for the request.

Figure 16:
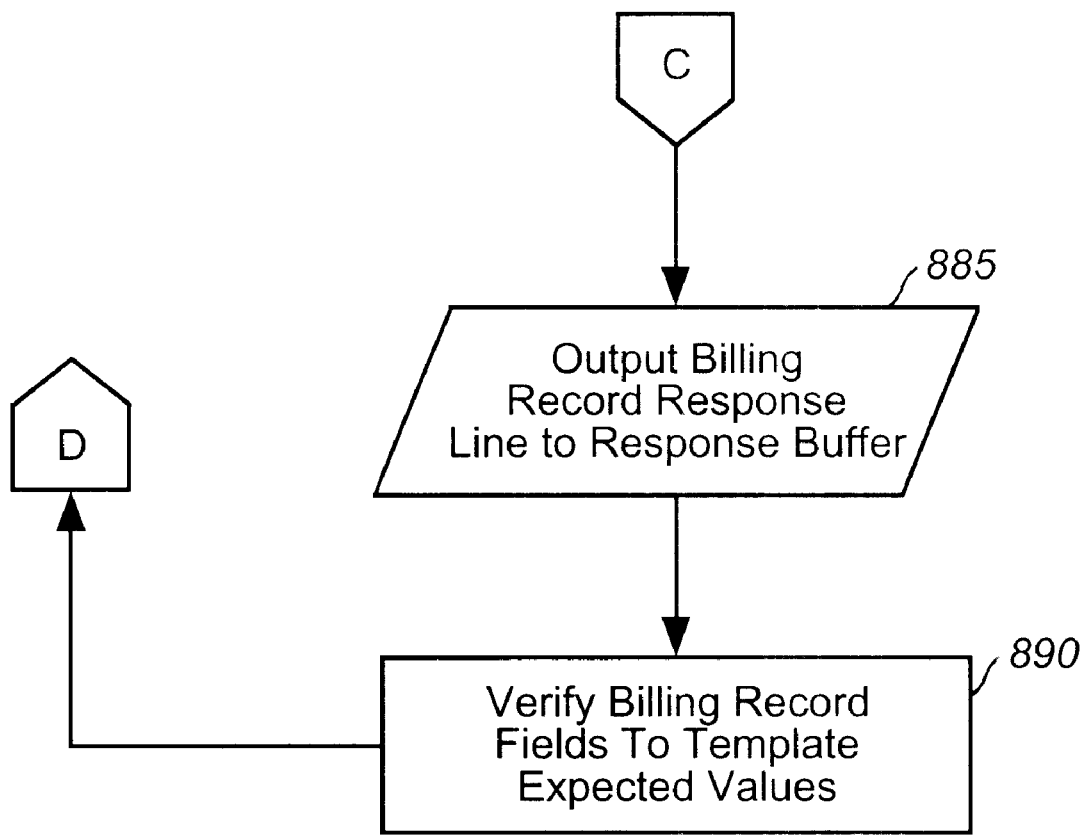

If all billing records are not processed, execution proceeds through continuation block C to step 885 on FIG. 16. At step 885, a partially constructed billing record response line is appended to the response buffer. Execution then passes to step 890 to verify billing record fields to template expected values of second predefined templates 812. Step 890 appends billing record field results to the partially constructed response output buffer and updates the status of the line output at step 885. The worst case result of a field comparison during verification is set in the billing record line of step 885. After step 890, execution returns to step 870 through continuation block D to get the next billing record.

The reader will understand that many different call record verification requests may be conceived. The preferred embodiment provides a flexible and scaleable system for generating different test cases to fully test a telecommunications network, and for storing the results of applying such test cases to call records.

As described in more detail below, a preferred embodiment may include conventional logger and janitor processes. FIGS. 17–28 illustrate additional exemplary embodiments of the present invention described above.

Database
TServ schema is qualified by the group name TSERV.

Database Schema; Base Tables
Base tables can be organized per the high level diagram above. An asterisk (*) indicates the base table is an administrator provisioned table and there are four additional columns in the table (created_by, creation_date, modified_by, modified_date). An at-symbol (@) indicates there are two additional columns in the table (created_by, creation_date). A bang (!) indicates the base table is populated by the TAMS to TEAMS import utility. A question-mark (?) indicates the base table has not been populated in TEAMS and has questionable existence. A squiggle (~) indicates this is new since the 5/1/98 CS to Richardson handoff.

Parse Tables
Support 11 record types that are provisioned for parsing as received from the NIC. The ITP application places calls that cause origination of CDR, ECDR, PNR, and EPNR billing records. The AOSM application places calls that originate OSR, EOSR, POSR, EPOSR, and BDR billing records. Toll ticket CDRs are also provisioned for international. Switches may also generate SER records for date/time changes which the COL must use to populate time correlation.

Provisioned

| * DB_LOAD_DIRECTOR | * RECORD_TYPES | * FIELD_TYPES |
|---|---|---|
| record_type_id | record_type_id | field_type |
| sequence | record_type | |
| field_name_id | description | |
| db_table_name | | |
| db_column_name | | |

Provisioned and Used by IMPORT Utility

| | * RECORD_TYPE_FIELD_NAME |
|---|---|
| * FIELDS | record_type_id |
| field_name_id | sequence |
| field_name | field_name_id |
| field_type | field_len_override |
| bit_or_byte | extractor |
| field_length | fill_char |
| description | bit_pos_override |

Collection (COL) Filtering

| * FILTER | * FILTER_SPECIFICATION |
|---|---|
| filter_id | filter_id |
| filter_name | sequence_number |
| description | ~( remove record_type_id) |
| | selection_criteria |
| | description |

Raw Data

There is currently a scheme for rolling over into a plurality of billing tables to ease system administration of the very large billing tables. Billing is loaded to correct table by call record timestamp. The VER will select out of the correct table.

BRR_TABLE_DETAILS
slot_number
begin_date
end_date
current_flag

BILLING_RECS_RECEIVED_KEYS01..05
billing_record_id  device_id
record_type_id  device_time_a
device_time_b  insert_time
nbsn  cli  auth_code  dest_addr
dialed_digits  cdid  otg  ttg
entry_code  bdr_seq_nbr  call_type
bill_type  originating_nbr
terminating_nbr

BILLING_RECS_RECEIVED01..05
device_time_a
billing_record_id
record_image

Time Correlation

DEVICE_TIME_CHANGE_HISTORY
device_id
device_time
teams_time

Requests

~REQUEST_QUEUE, (was VERIFICATION_REQUEST_QUEUE)
~req_id (was vreq_id)  status
~req_type (was brfonly)
~maxreturn (was maxbrltoreturn)
testcase_section  testcase_number  requestor_id
selection_criteria  override_vars  request_recvd_dt
request_compl_dt  request_priority
execution_start_dt  execution_end_dt  session_id
orig_switch_id  term_switch_id  resource_id
orig_switch_load_id  term_switch_load_id
resource_load_id  ~job_id (remove)  num_retries
search_start_dt  max_retries
~NEW: vrqst (CHAR(1)), recid (VARCHAR(N)),
resp_type (CHAR(1))

~CERTIFICATION_REQUESTS
vreq_id
certs_id

~GETREC_FIELDS
req_id
field_name

**~* STATUS_TYPES**
status
description

**~* REQUEST_PRIORITY**
priority
queue_value

Verification Results

VREQ_X_BILLING_X_TEMPLATE
vreq_id
template_id
billing_record_id
result_type
~result_string (remove)

VERIFICATION_DATA
vreq_id
field_name_id
field_value
failure_id
problem_id
template_id
~billing_record_id

**\* FAILURES**
failure_id
description

Verification Archives (same time populated in *_yr, *_mo for same request)

~ REQUEST_HIST (was VERIFICATION_HISTORY)
all cols of REQUEST_QUEUE,
purge_yr
purge_mo

VREQ_X_BILLING_X_TEMPLATE_HIST
all cols of VREQ_X_BILLING_X_TEMPLATE_HIST,
~purge_yr
~purge_mo

~TEMPLATE_HIST (new)
all cols of TEMPLATE,
copy_yr
copy_mo

~ CERTIFICATION_REQUESTS_HIST
all cols of CERTIFICATION_REQUESTS,
purge_yr
purge_mo

~ VERIFICATION_DATA_HISTORY
all cols of verification_data,
purge_yr
purge_mo

~ TEMPLATE_EXPECTED_VAL_HIST (new)
all cols of TEMPLATE_EXPECTED_VALUES,
copy_yr
copy_mo

~ BILLING_KEYS_ARCHIVED (new name)
all cols of billing_recs_received_keys,
copy_yr
copy_mo

~ BILLING_ARCHIVED (new name)
all columns of billing_recs_received,
copy_yr
copy_mo

~ DEV_TIME_CHG_HIST_HIST (new)
all cols of DEVICE_TIME_CHANGE_HISTORY,
copy_yr
copy_mo

Verification Jobs (not implemented)

? JOBS
job_id
description
testcase_list_id

**\* TESTCASE_LIST_ENTRIES**
testcase_list_id
testcase_section
testcase_number

?LIST_X_VREQ
vreq_id
testcase_list_id

**\* TESTCASE_LIST_HEADER**
testcase_list_id
testcase_list_type_id
testcase_list_name
description

**\* TESTCASE_LIST_TYPES**
testcase_list_type_id
testcase_list_type
retention_days

Testcases, Templates, and Problem Codes

! TESTCASE
testcase_section testcase_number
date_created appl_user oracle_id
responsible_user purpose
execution_platform feature
sub_feature special_information
viper_type testcase_id

?EXECUTION_HEADER
testcase_section testcase_number
version sw_load comments
revises_version date_created
appl_user oracle_id locked
auto_or_manual orig_switch_type
orig_trunk_group orig_signal_type
term_switch_type term_trunk_group
term_signal_type disconnect_party
expect_answer wait_time ccit_intl
tp1_confidence tp4_confidence
tp5_confidence tp6_confidence
tp7_confidence

!@ TESTCASE_X_TEMPLATE
testcase_section testcase_number
testcase_template template_version
spec_id device_id resource_type_id
platform_id software_load_id
template_id revises_version
comments testcase_id

COMPARE_OPERATORS
compare_operator

**~\*! PROBLEM_CODE**
problem_code_id
problem_code_name
description

!@ TEMPLATE
template_id
record_type_id
search_expression

**~\*! PROBLEM_CODE_X_FIELD**
problem_code_field_id
problem_code_id
field_id

**~\*! PROBLEM_CODE_X_TEMPLATE_VALUE**
problem_code_template_value_id
problem_code_field_id value template_id

! TEMPLATE_EXPECTED_VALUES
template_id
field_name_id
field_value
compare_operator

**~\*! PROBLEM_CODE_X_SOFTWARE_LOAD**
problem_code_software_load_id problem_code_id
start_load_id end_load_id comments

Lab Configuration

**\* DEVICES**
device_id
device_name
platform_id
description
engineering_id
finance_id
~last_update

**\* BILLING_SPEC_X_RECORD_TYPES**
record_type_id
spec_id

**\* LOAD_X_DEVICE**
device_id
effective_time
not_effective_time
software_load_id
description
comments

**~\* SPECID_X_LOAD (REMOVED)**
software_load_id
spec_id

**\* SOFTWARE_LOAD_RANKING**
software_load_id  software_load
platform_id  ranking  spec_id
production_status  coments

**\* PLATFORM**
platform_id
platform_name
equipment_type  vendor
contact  effective_time
description

**\* RESOURCES**
resource_id
resource_type_id
resource_desc
device_id

**\* PLATFORM_RANKING**
platform_id  ranking
template_platform_id

**\* BILLING_SPECIFICATION**
spec_id
billing_spec_name
description

**\* RESOURCE_TYPES**
resource_type_id
resource_type
literal

**\* EQUIPMENT_TYPES**
equipment_type
short_name
description

Security Client

Security Client tables are currently unused by Tserv.

USER_INFO
user_id  logon_name
first_name  password
phone_number  pager_number
location  department
cube_number  email_address
group_id  creation_date
end_date

GROUP_INFO
group_id
group_name
manager_id

SYSTEM_PRIVS
system
privilege
description
owner

USER_SYSTEM
user_id
system
privilege

Registry

REGISTRY
path
type
vtype
entry_vaue

Miscellaneous

? SESSION_HISTORY
user_id
logon_time
logout_time

? EXCEPTIONS
row_id
owner
table_name
constraint;
*track table constraints*

**\* CALL_RECORD_TYPES**
crid,
record_type_id
description

PLAN_TABLE
Oracle uses
via Explain tool

**TEMP_X_SW_TEMPLATE,
TEMP_PROBLEM_CODE**
Praveen's stored procedures
refrerence these

EST_SIZE
istats on Tserv
tables

TREE_TRUC
info only?

Database Schema; Views

<u>TSERV.GETxxx</u>
    Views for union of live and archived for getrec calls... to be defined...

<u>TSERV.BILLING_RECS_RECEIVED</u>
    Union view of five Billing_Recs_Received01..5 Tables.

<u>TSERV.BILLING_RECS_RECEIVED_KEYS</u>
    Union view of five Billing_Recs_Received_keys01..05 Tables.

<u>TSERV.CALL_REC_VIEW</u>
select

```
        Call_record_types.CRID
        billing_spec_x_record_types.SPEC_ID
        billing_spec_x_record_types.RECORD_TYPE_ID
where Call_record_types.record_type_id = billing_spec_x_record_types.record_type_id TSERV.DATA_DEF_VIEW
select
        RECORD_TYPES.RECORD_TYPE_ID, RECORD_TYPES.DESCRIPTION RECORD_TYPES_DESC,
        CALL_RECORD_TYPES.CRID, CALL_RECORD_TYPES.DESCRIPTION CALL_RECORD_TYPES_DESC,
        BILLING_SPECIFICATION.BILLING_SPEC_NAME, RECORD_TYPE_FIELD_NAME.SEQUENCE,
        FIELDS.FIELD_NAME, FIELDS.FIELD_LENGTH, FIELDS.DESCRIPTION FIELDS_DESC
from    RECORD_TYPES, CALL_RECORD_TYPES, BILLING_SPEC_X_RECORD_TYPES,
        RECORD_TYPE_FIELD_NAME, FIELDS, FIELD_TYPES, BILLING_SPECIFICATION
where   RECORD_TYPES.RECORD_TYPE_ID     = CALL_RECORD_TYPES.RECORD_TYPE_ID            and
        RECORD_TYPES.RECORD_TYPE_ID     = BILLING_SPEC_X_RECORD_TYPES.RECORD_TYPE_ID  and
        RECORD_TYPES.RECORD_TYPE_ID     = RECORD_TYPE_FIELD_NAME.RECORD_TYPE_ID       and
        RECORD_TYPE_FIELD_NAME.FIELD_NAME_ID = FIELDS.FIELD_NAME_ID                   and
        BILLING_SPEC_X_RECORD_TYPES.SPEC_ID = BILLING_SPECIFICATION.SPEC_ID TSERV.DEVICE_LOAD_VIEW
select  DEVICES.DEVICE_NAME, DEVICES.DEVICE_ID, LOAD_X_DEVICE.EFFECTIVE_TIME,
        RESOURCE_TYPE_ID,TEMPLATE_PLATFORM_ID, LOAD_X_DEVICE.NOT_EFFECTIVE_TIME,
        LOAD_X_DEVICE.SOFTWARE_LOAD_ID, SOFTWARE_LOAD_RANKING.RANKING SOFTWARE_LOAD_RANK,
        DEVICES.PLATFORM_ID, PLATFORM_RANKING.RANKING PLATFORM_RANK, RESOURCES.RESOURCE_ID
from    DEVICES, LOAD_X_DEVICE, SOFTWARE_LOAD_RANKING, RESOURCES, PLATFORM_RANKING
with    CHECK OPTION TSERV.LIST_VER_BILLING_VIEW
select LIST_X_VREQ.TESTCASE_LIST_ID, VERIFICATION_HISTORY.VREQ_ID,
       VREQ_X_BILLING_X_TEMPLATE_HIST.ARCHIVE_ID,
       VREQ_X_BILLING_X_TEMPLATE_HIST.TEMPLATE_ID,
       VERIFICATION_HISTORY.TESTCASE_SECTION,VERIFICATION_HISTORY.TESTCASE_NUMBER,
       VERIFICATION_HISTORY.STATUS
from   VERIFICATION_HISTORY, VREQ_X_BILLING_X_TEMPLATE_HIST, LIST_X_VREQ
where  VERIFICATION_HISTORY.VREQ_ID = VREQ_X_BILLING_X_TEMPLATE_HIST.VREQ_ID and
       VERIFICATION_HISTORY.VREQ_ID = LIST_X_VREQ.VREQ_ID TSERV.PARSER_VIEW
select RECORD_TYPES.RECORD_TYPE_ID,
       RECORD_TYPES.RECORD_TYPE,
       RECORD_TYPES.REC_BASE_DATE,
       RECORD_TYPE_FIELD_NAME.SEQUENCE,
       FIELDS.FIELD_NAME,
       FIELD_TYPES.FIELD_TYPE,
       FIELDS.FIELD_LENGTH,
       RECORD_TYPE_FIELD_NAME.FIELD_LEN_OVERRIDE,
       FIELDS.BIT_OR_BYTE,
       RECORD_TYPE_FIELD_NAME.FILL_CHAR,
       RECORD_TYPE_FIELD_NAME.BIT_POS_OVERRIDE,
       RECORD_TYPE_FIELD_NAME.EXTRACTOR,
       RECORD_TYPES.DESCRIPTION REC_TYPE_DESC,
       FIELDS.DESCRIPTION FIELD_DESC,
       RECORD_TYPE_FIELD_NAME.FIELD_NAME_ID
from   RECORD_TYPES, FIELD_TYPES, FIELDS, RECORD_TYPE_FIELD_NAME
where  FIELD_TYPES.FIELD_TYPE    = FIELDS.FIELD_TYPE                        AND
       FIELDS.FIELD_NAME_ID      = RECORD_TYPE_FIELD_NAME.FIELD_NAME_ID     AND
       RECORD_TYPES.RECORD_TYPE_ID = RECORD_TYPE_FIELD_NAME.RECORD_TYPE_ID TSERV.RECORD_PARSER_VIEW
select RECORD_TYPES.RECORD_TYPE_ID, RECORD_TYPES.RECORD_TYPE,
       RECORD_TYPES.DESCRIPTION RECORD_TYPES_DESC, RECORD_TYPE_FIELD_NAME.SEQUENCE,
       FIELDS.FIELD_NAME_ID, FIELDS.FIELD_NAME, FIELD_TYPES.FIELD_TYPE,
       FIELDS.DESCRIPTION FIELDS_DESC, FIELDS.FIELD_LENGTH
```

```
from   FIELD_TYPES, FIELDS, RECORD_TYPE_FIELD_NAME, RECORD_TYPES
where  RECORD_TYPE_FIELD_NAME.RECORD_TYPE_ID = RECORD_TYPES.RECORD_TYPE_ID          and
       RECORD_TYPES.RECORD_TYPE_ID           = RECORD_TYPE_FIELD_NAME.RECORD_TYPE_ID and
       FIELDS.FIELD_NAME_ID                  = RECORD_TYPE_FIELD_NAME.FIELD_NAME_ID
```

TSERV.SPEC_PLATFORM_VIEW
```
select specid_x_load.software_load_id, specid_x_load.spec_id,
       software_load_ranking.platform_id, software_load_ranking.ranking
from   specid_x_load, software_load_ranking
where  specid_x_load.software_load_id = software_load_ranking.software_load_id
```

TSERV.TEMPLATE_VIEW
```
select TESTCASE_X_TEMPLATE.TESTCASE_SECTION,
       TESTCASE_X_TEMPLATE.TESTCASE_NUMBER,
       TESTCASE_X_TEMPLATE.TESTCASE_TEMPLATE,
       TESTCASE_X_TEMPLATE.RESOURCE_TYPE_ID,
       TESTCASE_X_TEMPLATE.PLATFORM_ID,
       TESTCASE_X_TEMPLATE.SOFTWARE_LOAD_ID,
       TESTCASE_X_TEMPLATE.TEMPLATE_VERSION,
       TESTCASE_X_TEMPLATE.TEMPLATE_ID TESTCASE_X_TEMPLATE_ID,
       TEMPLATE.TEMPLATE_ID TEMPLATE_ID,
       TEMPLATE.RECORD_TYPE_ID,
       TEMPLATE.SEARCH_EXPRESSION,
       FIELDS.FIELD_NAME_ID,
       FIELDS.FIELD_NAME,
       FIELDS.FIELD_LENGTH,
       TEMPLATE_EXPECTED_VALUES.FIELD_VALUE,
       TEMPLATE_EXPECTED_VALUES.COMPARE_OPERATOR,
       TESTCASE_X_TEMPLATE.DEVICE_ID,
       RESOURCE_TYPES.LITERAL
from   TEMPLATE,
       TESTCASE_X_TEMPLATE,
       TEMPLATE_EXPECTED_VALUES,
       FIELDS d, RESOURCE_TYPES,
       record_type_field_name
where
 TEMPLATE.template_id              = TESTCASE_X_TEMPLATE.template_id(+)       and
 TEMPLATE.template_id              = TEMPLATE_EXPECTED_VALUES.template_id(+)  and
 TEMPLATE.record_type_id           = record_type_field_name.record_type_id    and
 record_type_field_name.field_name_id = FIELDS.field_name_id                  and
 TESTCASE_X_TEMPLATE.resource_type_id = RESOURCE_TYPES.resource_type_id
```

TSERV.TESTCASE_LIST_VIEW
```
select
       testcase_list_types.TESTCASE_LIST_TYPE_ID,
       testcase_list_types.TESTCASE_LIST_TYPE,
       testcase_list_types.RETENTION_DAYS,
       testcase_list_header.TESTCASE_LIST_ID,
       testcase_list_header.TESTCASE_LIST_NAME,
       testcase_list_header.DESCRIPTION
from
    testcase_list_types,
    testcase_list_header
where
    testcase_list_types.testcase_list_type_id=testcase_list_header.testcase_list_type_id
```

TSERV.TSERV_TABS
```
Select  "OWNER","OBJECT_NAME","OBJECT_ID","OBJECT_TYPE","CREATED","LAST_DDL_TIME",
        "TIMESTAMP","STATUS"
from    all_objects
where owner ='TSERV'
```

TSERV.USER_VIEW
select  logon_name,password,system,privilege
from    user_info,user_system
where   user_info.user_id=user_system.user_id

SQL Stored Procedures

PROCEDURES
----------
TSERV.BDR_SLOT_MAINTENANCE

To address the problem of fragmentation with the Billing_Recs_Received table,
it was broken up into five Billing_Recs_Received tables (1 .. 5). Every fifth
day the table gets truncated (cleared). TSERV reads the BRR_Table_Details table
to see which is the current table to insert into. Date restrictions determine
which table to insert into. This procedure (BDR_SLOT_MAINTENANCE) updates dates in the
BRR_Table_Details table. This procedure is automatically invoked by a UNIX CRON job to
update dates in BRR_table_details. It also truncates the next Billing_Recs_Received and
Billing_Records_Received_Keys tables (clears them).

TSERV.DBREPORT
(Not used by TSERV)

TSERV.INDEX_PROC
(Not used by TSERV)

TSERV.PK_FK_RELATION
(Not used by TSERV)

TSERV.PROBLEM_CODE_PROC
When a verification comes back, TSERV assigns it a status. This procedure selects
problem codes based on status = 1.

TSERV.SPACEREP
(Not used by TSERV)

FUNCTIONS
---------
TSERV.HEXTONUM
Converts hex to decimal, based on hex (character) input. Returns decimal in numerical
form.

TSERV.L_LENGTH
Returns length, based on table name, column name and row ID.
(Not used by TSERV)

TSERV.MAXIMUM_EXTENTS
(Not used by TSERV)

TSERV.OPTIMAL_EXTENTS
(Not used by TSERV)

TSERV.VREQ
Changes status from 2 (waiting) to 3 (successful verification).

PACKAGES
--------
TSERV.BILLING_SPECIFICATION$RP
Contains procs for rep_delete(), rep_update() and rep_insert() for table maintenance.
(Not valid)

```
TSERV.BILLING_SPECIFICATION$RR
All the functions return FALSE!

TSERV.BILLING_SPEC_X_RECORD_TYPE$RP
(Not valid)

TSERV.BILLING_SPEC_X_RECORD_TYPE$RR
All the functions return FALSE!

TSERV.CALL_RECORD_TYPE$RP
(Not valid)

TSERV.CALL_RECORD_TYPE$RR
All the functions return FALSE!

TSERV.DEL_PACK
(Used by TServ db_CVRQ.CXX)

TSERV.EST_PACK
(Not used)

TSERV.INTEGRITYPACKAGE
Changes NestLevel from null to 0.

TSERV.JANITOR
There are three tables that Janitor cleans up:  Device_Time_Change_History,
Verification_Request_Queue and Verification_History.  Rows are deleted by date according
to a configurable number of days.  Janitor reads the number of days from the Registry
file, e.g. it may keep 7 days worth of data.  Janitor is kicked off by a CRON job.

TSERV.MAS_DET_REL
(Not used by TSERV.)

TSERV.SEQ_PACK
TSERV calls this package to get a new sequence value.  The sequence values are unique
table IDs.
```

Triggers

LAST_UPDATE in DEVICES table is maintained with a trigger....

Table Indexes

DB_LOAD_DIRECTOR
    (RECORD_TYPE_ID,SEQUENCE,FIELD_NAME_ID) primary & unique

RECORD_TYPES
    (RECORD_TYPE_ID) primary & unique

FIELD_TYPES
    (FIELD_TYPE) primary & unique

FIELDS
    (FIELD_NAME_ID) primary & unique
    (FIELD_NAME) non-unique

RECORD_TYPE_FIELD_NAME
    (RECORD_TYPE_ID,SEQUENCE,FIELD_NAME_ID) primary & unique FILTER
    (FILTER_ID) primary & unique FILTER_SPECIFICATION
    (FILTER_ID,SEQUENCE_NUMBER) primary & unique BRR_TABLE_DETAILS
    -- no indexes --

BILLING_RECS_RECEIVED_KEYS_xx
    (BILLING_RECORD_ID) primary & unique
    (DEVICE_ID,RECORD_TYPE_ID,DEVICE_TIME_A,DEVICE_TIME_B) not unique BILLING_RECS_RECEIVED_xx
    (BILLING_RECORD_ID) primary & unique DEVICE_TIME_CHANGE_HISTORY
    (DEVICE_ID,DEVICE_TIME,TEAMS_TIME) primary & unique REQUEST_QUEUE
    (REQ_ID) primary & unique
    (SEARCH_START_DT,PRIORITY) not unique CERTIFICATION_REQUESTS
    (VREQ_ID,CERTS_ID) primary & unique GETREC_FIELDS
    (REQ_ID,FIELD_NAME) not unique STATUS_TYPES
    (STATUS) primary & unique REQUEST_PRIORITY
    (PRIORITY) primary & unique VREQ_X_BILLING_X_TEMPLATE
    (VREQ_ID) not unique VERIFICATION_DATA
    (VREQ_ID,TEMPLATE_ID,BILLING_RECORD_ID,FIELD_NAME_ID) primary & unique FAILURES
    (FAILURE_ID) primary & unique REQUEST_HIST
 (REQ_ID) primary & unique CERTIFICATION_REQUESTS_HIST
 (VREQ_ID,CERTS_ID) primary & unique VREQ_X_BILLING_X_TEMPLATE_HIST
 (VREQ_ID) not unique VERIFICATION_DATA_HISTORY
 (VREQ_ID,TEMPLATE_ID,BILLING_RECORD_ID,FIELD_NAME_ID) primary & unique BILLING_KEYS_ARCHIVED
 (BILLING_RECORD_ID) primary & unique
 (DEVICE_ID,RECORD_TYPE_ID,DEVICE_TIME_A,DEVICE_TIME_B) not unique BILLING_ARCHIVED
 (BILLING_RECORD_ID) primary & unique DEV_TIME_CHG_HIST_HIST
 (DEVICE_ID,DEVICE_TIME,TEAMS_TIME) primary & unique TEMPLATE_HIST
 (TEMPLATE_ID) primary & unique TEMPLATE_EXPECTED_VAL_HIST
 (TEMPLATE_ID,FIELD_NAME_ID) primary & unique TESTCASE_X_TEMPLATE
 (TESTCASE_ID,TESTCASE_TEMPLATE,TESTCASE_VERSION) primary & unique TEMPLATE
 (TEMPLATE_ID) primary & unique, foreign key to same in TESTCASE_X_TEMPLATE TEMPLATE_EXPECTED_VALUES
 (TEMPLATE_ID,FIELD_NAME_ID) primary & unique
 TEMPLATE_ID foreign key to TESTCASE_X_TEMPLATE TEMPLATE_HIST
 (TEMPLATE_ID) primary & unique COMPARE_OPERATORS
 (COMPARE_OPERATOR) primary & unique

NEW PROBLEM CODE TABLES NEED TO BE DEFINED

DEVICES
    (DEVICE_ID) primary & unique
    (DEVICE_NAME) not unique

LOAD_X_DEVICE
    (DEVICE_ID,EFFECTIVE_TIME) primary & unique
    DEVICE_ID foreign key to same in DEVICES SOFTWARE_LOAD_RANKING
    (SOFTWARE_LOAD_ID,DEVICE_ID) primary & unique
    SOFTWARE_LOAD_ID foreign key to same in PLATFORM RESOURCES
    (RESOURCE_ID) primary & unique RESOURCE_TYPES
    (RESOURCE_TYPE_ID) primary & unique PLATFORM
    (PLATFORM_ID) primary & unique
    (EQUIPMENT_TYPE) not unique PLATFORM_RANKING
    (PLATFORM_ID,RANKING,TEMPLATE_PLATFORM_ID) primary & unique
    SOFTWARE_LOAD_ID foreign key to same in PLATFORM EQUIPMENT_TYPES
    (EQUIPMENT_TYPE) primary & unique BILLING_SPEC_X_RECORD_TYPES
    (RECORD_TYPE_ID,SPEC_ID) primary & unique BILLING_SPECIFICATION
    (SPEC_ID) primary & unique REGISTRY
    (PATH) primary & unique Component Design COL (Collector)

Requirements
- No Roguewave dbtools
- Handle SERs for real-time time correlation (fix polling problem)

- Incorporate memory interface between collecting/parsing/loading
- Provide means for isolating test of each process type as a single threaded stand-alone component
- Develop for cloning to multiple COLs (one each NIC session)
- Blocked receive interface (fix live looping)
- Gracefully handle bad NIC blocks
- Configurable mechanism for conveniently skipping unknown record types
- Minimal time between receiving block and inserting records
- Inserting to BILLING_RECS_RECEIVED_* shall be the only I/O; migrate to sql_loader block loading of billing
- In the short term, maintain last loaded billing in LAST_UPDATE of the DEVICES table (same single commit of billing insert unit of work); eventually will access semaphore to update DEVICES table in shared memory on commits only...
- Configurably large bulk load size between commits; assure all recs committed
- Remove DEVICE_TIME_A column from BILLING_RECS_RECEIVED_xx tables
- Replace the LONG RAW in BILLING_RECS_RECEIVED_xx tables if better option
- Define a single COL to a dedicated processor in the short-term...
- Achieve maximum performance with a single process type instance before working multiple instances
-

Registry Variables

```
/COL/NUMBEROFCOL,ITEM,ASCII,n
/COL/NUMBEROFLDR,ITEM,ASCII,n1

/COL/COLNAME1,ITEM,ASCII,t4col1
/COL/COLNAME2,ITEM,ASCII,t4col2
/COL/COLNAME3,ITEM,ASCII,t4col3
/COL/COLNAME1/CONNNIC,ITEM,ASCII,MITENIC1
/COL/COLNAME2/CONNNIC,ITEM,ASCII,MITENIC1
/COL/COLNAME3/CONNIC,ITEM,ASCII,MITENIC2
/COL/NICIP/MITENIC1,ITEM,ASCII,166.34.94.153
/COL/NICIP/MITENIC2,ITEM,ASCII,166.34.94.152
/COL/COLNAME1/CONNCLIENT,ITEM,ASCII,T2000
/COL/COLNAME2/CONNCLIENT,ITEM,ASCII,FMS
/COL/COLNAME3/CONNCLIENT,ITEM,ASCII,FMS
/COL/NICPORTS/FMS,ITEM,ASCII,4102
/COL/NICPORTS/T2000,ITEM,ASCII,4100
/COL/COLNAME1/LOGLEVEL,ITEM,ASCII,3
/COL/COLNAME2/LOGLEVEL,ITEM,ASCII,3
/COL/COLNAME3/LOGLEVEL,ITEM,ASCII,0

/COL/FILTER,ITEM,ASCII,3
/COL/CONNECTRETRY,ITEM,ASCII,3
/COL/NUMBEROVERRIDES,ITEM,ASCII,2
/COL/OVERRIDE1,ITEM,ASCII,RES1
/COL/OVERRIDE2,ITEM,ASCII,RES8
/COL/RES1,ITEM,ASCII,99
/COL/RES8,ITEM,ASCII,99
/STF/LOCATION,ITEM,ASCII,/tmp/test_mfs
/STF/TIMEINTERVAL,ITEM,ASCII,180
/LDR/PROCESSREC,ITEM,ASCII,1000

/DB/FILTERSPECTBLNAME,ITEM,ASCII,FILTER_SPECIFICATION
/DB/FILTERTBLNAME,ITEM,ASCII,FILTER
/DB/LOGLEVEL,ITEM,ASCII,0
```

COL Design

Collector Process

```
tservCol:
Number of collectors (/COL/NUMBEROFCOL )gets started by SVM.
      Col <dbNet> <dbUser> <dbPasswd> <n>

Initialize program. Read Registry variables -
      /COL/COLNAME<n>
      /COL/COLNAME<n>/CONNCLIENT
      /COL/NICIP/<COLNAMEn>
      /COL/NICPORT/<CONNCLIENT>
      /COL/COLNAME<n>/FILTER
      /COL/COLNAME<n>/LOGLEVEL
Initialize NIC common header, NIC registry Message according to NIC interface spec.
Make NIC Connection.
Register connection to NIC.
Receive confirmation from NIC.
Write to Memory Queue (created by SVC).

LOOP
      Read NIC Block.
      Write nic block to Queue
ENDLOOP
```

Worst Case Load Timer

```
tservSgl:
Service Manager starts tservSgl process.
This process is needed to signal processes after every time interval specified in
Registry.  The signal is handled by Col and ignored by rest of the processes. This is
needed to rollover data files written by decoder for processing by sqlldr if time
interval specified in Registry elapses before the max record count specified in registry.
This process can be made use of in later release to provide timer functionality to any
process if needed.

LOOP
   Sleep for time interval in specified in Registry (/STF/TIMEINTERVAL)
   Send User defined Signal to all processes.
ENDLOOP
```

Decoder Process

```
Decoder n:   Service Manager starts number of Decoder
             Processes(/COL/NUMBEROFLDR)

Get fields and record layout information from db into memory.
      Initialize filter if filter is set.
LOOP
      Read NIC block from Queue.
      Process and prepare data for loading.
      If filter is present skip records that match the criteria.

Write Billing_Recs_Received_Keys data to col_YYYYMMDDHHMISS_n.tmp1
      Write Billing_Recs_Received data to col_YYYYMMDDHHMISS_n.tmp2

The location of the file is taken from the Registry variable (/STF/LOCATION).

If number of records > specified record count in Registry
                        (/LDR/PROCESSREC)
                        OR
```

```
            timeinterval > specified timeinterval in Registry
                            (/STF/TIMEINTERVAL)

Copy files to BRR_YYYYMMDD_HHMISS_nN.dat
                    BRRK_YYYYMMDD_HHMISS_nN.dat
         CONTINUE
ENDLOOP SignalHandler: signal received from tservSIG && Decoder waiting on Queue
            Rollover files to BRR_YYYYMMDD_HHMISS_nN.dat
                              BRRK_YYYYMMDD_HHMISS_nN.dat Note:
Release 2 will handle dynamic specification change, dynamic filtering and SER 3
```

*Filters*

Filter Specification Language (FSL) is a subset of Selection Criteria Language (SCL). It is used to specify the filter that causes TServ to not load certain billing records.

Requirements

- Filter by device(s)
- Filter by record type(s)
- Filter by field(s)
- Filter by combinations of above
- Support equality/inequality on set of values
- Support ranges
- Expression terms (name strings) are from FIELDS, DEVICES, and RECORD_TYPES tables (no ids)

Tables

| * FILTER | * FILTER_SPECIFICATION |
|---|---|
| filter_id | filter_id |
| filter_name | sequence_number |
| description | ~( remove record_type_id) |
|  | selection_criteria |
|  | description |

Pseudo Code

System Initialization

```
filter = no_filter
retrieve the filter name(s) from registry variable /COL/FILTER
      // may contain one or more filter names; names are comma delimited
if registry variable found then
   retrieve from FILTER table the filter ids for the valid filter names (if any)
   if one or more valid names/ids then
      retrieve all FILTER_SPECIFICATION rows and order by (registry name order,
                                                           sequence_number)
      combine together (in the order of SEQUENCE_NUMBER) in a complete
            filter criteria specification
            //   selection_criteria1 OR selection_criteria1 OR …
      if valid then
         filter = the combined expressions as an elaborated internal representation
            for compare to the billing record
            // && conjunctions permitted within each selection criteria as an internal
      endif
   endif
endif
```

Parsing the Record

.
.
.
```
cast pointer to the memory area of a billing record
filter_record = FALSE
for i = 1 to number selection criteria
        if internal representation selection_criteria i true then
                filter_record = TRUE
                break for-loop
        endif
endfor
```
.
.
.

Examples

*Filter on device*

```
FILTER_ID   SEQUENCE_NUMBER   SELECTION_CRITERIA
---------------------------------------------------
1           1                 DEVICE_NAME = RES1
---------------------------------------------------
1           2                 DEVICE_NAME = ISN
```

This FSL specification filters out all the records that come from RES1 and ISN.

*Filter on fields within record type within device*

```
FILTER_ID   SEQUENCE_NUMBER   SELECTION_CRITERIA
---------------------------------------------------
3           1                 DEVICE_NAME=RES1 &&
                              RECORD_TYPE!=CDR_98 &&
                              OTG=0203 && TP1<19980603104000
---------------------------------------------------
3           2                 DEVICE_NAME=RES1 &&
                              RECORD_TYPE!=CDR_98 &&
                              OTG=0203 && TP1>19980603105000
```

- Names are used from the FIELDS, RECORD_TYPES, DEVICES tables
- time_value: Format 'YYYYMMDDHH24MISS'
- Operators supported in selection criteria include <, > <=, >=, =, !=
- Leading zeros are significant only for numeric (i.e. INTEGER) field types
- Relational operator && permitted between conditions of a selection criteria
- Field type INTEGER in table FIELD_TYPES means unsigned integer and negative integer is not supported
- Ranges supported as compound conditions TP1 > 19980611124522 && TP1 < 19980611134522

SQL Loader

*The current polling design will soon be replaced with a blocked interface between the Decoders and Loaders. File names of "ready" files (2 mtypes) will be placed onto a msg queue. Loaders (per mtype) will feed from the queue.*

There will be two SQL loader processes, one each for Billing_Recs_Received and Billing_Recs_Received_Keys.

Pick the mfs directory path from Registry.
Check if the loader process is not running.

```
LOOP
        Look for data file in mfs.    If no data
            Sleep 20.
        else
            Prepend the control file to datafile.
            Bulk load data into the table. <datafilename>.log and <datafilename>.bad are creted under log directory.
            Move data file to archive directory.
        endif
ENDLOOP TRIGGERS:
Insert trigger on table Billing_Recs_Received_0n.

If record exists in Billing_recs_Received_Keys_0n table
                Get device_id.
                Update devices.last_update to device_time_a in the record for the device_id.

Insert trigger on table Billing_Recs_Received_Keys_0n

If record exists in Billing_recs_Received_0n table.
                Update devices.last_update to device_time_a in the record for the device_id.
```

Verification (VER)

Requirements

- No Roguewave
- Design according to process/thread design above
- Isolate template selection algorithm and synch up with TDMA
- Provide means for isolating test of a single threaded VER as a single stand-alone component
- Develop for cloning to a configurable pool of VERs (SVC MGR)
- Multiple template verifications, multiple billing record per template verification
- Support expected values special chars (override variables (e.g. {,},[,],@,TPi), wildcard (%), nulls (-))
- Handle leading zeroes (use field type); significant for strings, not for numbers...
- NTP all AOSM clients, ITP, TEAMS, and TServ
- No total table copies in server thread
- Blocked receive request interface (fix live looping); comes with the queue...
- Extend design of partitioned billing tables so VER selects out of one rather than union...
- Achieve maximum performance with a single VER process before testing the multiple instance design
- TSERV will support time point verifications with the override variable design. TServ does not care if the expected value fields contain EVAL(TPi) or EVAL(TPi,n). This allows knowledge of tolerances to be defined by the application at run time, or by the template creator. The selected form is the TPi form with an Lk variation for multiple legs of a call. The application(s) will provide TP parameters in the form: TP2=i12,n12;TP3=i13,n13;... TP7=i17,n17;L2TP2=i22,n22;L2TP3=i23,n23;......LkTP2=ik2,nk2;... LkTP7=ik7,nk7; The first leg of a call will use the TP1..TP7 overrides. Other legs will use the Lk qualifier: 2 for second, 3 for third, etc. Complementary overrides can be included in the template expected value fields (e.g. EVAL(TPi) or EVAL(LkTPi)). A tolerance of −1 indicates to the VER to not compare the expected value field.
-

Registry Variables
Old/Existing:
```
/VER/DB/LOGLEVEL,ITEM,ASCII,0
/VER/INITRETRYDELAY,ITEM,ASCII,60
/VER/LOGLEVEL,ITEM,ASCII,0
/VER/MAXNUMRETRIES,ITEM,ASCII,63
/VER/MAXRETRYDELAY,ITEM,ASCII,1920
/VER/RETRIESBEFOREDOUBLE,ITEM,ASCII,10
```

```
/VER/SAPHOST,ITEM,ASCII,166.34.94.155
/VER/SAPPORT,ITEM,ASCII,11011
/VER/SEARCHINTERVAL,ITEM,ASCII,240

/BRF/DB/LOGLEVEL,ITEM,ASCII,0
/BRF/LogLevel,ITEM,ASCII,0
/BRF/NoLdr,ITEM,ASCII,0
```

Design
- High performance philosophies:
    1) allocate worst case memory once and fill without validation
    2) no internalized form maintained, build response on the fly
    3) minimal database I/O (use joins!)
- May want to distinguish between error in scl of request
  versus in template on vreq/getrectemp
- Enforce worst case MAXRETURN to control worst case memory allocation
- Obvious error handling is omitted in order to focus on key design
- Awaiting E-mail from EW for additional VER work required for CERTS...
- Appropriate trace levels must be employed (assume a run-time registry
  variable access for dynamic trace enable/disable)
- SVC MGR creates queue and client response semaphore
- Design currently assumes template scl references only keys columns,
  can do additional when becomes a requirement
- Collapse SPECID_X_LOAD table into SOFTWARE_LOAD_RANKING table

```
VER main
========
loop
| get next highest priority entry from memory request queue
|     // blocks until entry present
| if (request == svc mgr terminate) then
|     exit(0)
| endif
| process_request(&request) // reentrant
endloop Reentrant DLL function interface
================================
// all functions invoked herefrom are also reentrant (no non-threadable
// C/C++/system interfaces to be used, no non-read only statics, no
// globals, no externs); ... all variables on stack ...

function process_request(request_ptr)
    case (request command type) of // break after each case code...
    | vreqtcid:
    | vreqtemp:
    |     reply_with_error(session_id,req_id,CMDNOTSUPPORTED)
$   |     rc = CMDNOTSUPPORTED
    | vreqtc:
    |     rc = vreq(request_ptr)
    | getrecvid:
    | getrecid:
    | getrectemp:
    | getrecscl:
    |     rc = getrec(request_ptr)
    | otherwise:
    |     reply_with_error(session_id,req_id,INVALIDCMD)
$   |     rc = INVALIDCMD
    endcase
```

```
$  set_request_disposition(rc,request_ptr)
$  do a DB COMMIT for calling thread
endfunction function reply_with_error(session_id,req_id,error_code)
   declare worst case err_out_buf on stack
   set err_out_buf string appropriately for error_code to +1000 line
   concat +1010 line to err_out_buf string
   respond2client(session_id,err_out_buf)
endfunction function respond2client(session_id,string_ptr)
  get exclusive access to client response semaphore
  write *string_ptr to CSIS interface
  release access to client response semaphore
endfunction
function set_request_disposition(rc,request_ptr)
    if (rc == RECNOTREADY) then
$   |   // max_retries == -1 is translated to a max_retries by the CLM
    |   add 1 to num_retries
$   |   if (request_ptr->num_retries <= request_ptr->max_retries)) then
    |   |   calculate number of seconds in future to retry using
    |   |         /VER/INITRETRYDELAY,RETRIESBEFOREDOUBLE,MAXRETRYDELAY
$   |   |         // see section 2.5
    |   |   get system date/time
    |   |   future_time = add calculation to system date/time
    |   |   SQL UPDATE REQUEST QUEUE
    |   |         SET NUM_RETRIES       = :num_retries // after the increment...
    |   |             SEARCH_START_DT   = :future_time
    |   |             STATUS            = REQUEUED
    |   |         WHERE REQ_ID = :req_id
    |   else
    |   |   reply_with_error(session_id,req_id,RECNOTREADY)
    |   |   SQL UPDATE REQUEST QUEUE
$   |   |         SET STATUS            = RECNOTREADY
$   |   |             REQUEST_COMPL_DT  = current date/time
    |   |         WHERE REQ_ID = :req_id
    |   endif
    else
$   |   // rc = status to update (e.g. complete_with_pass/found,
    |   //     complete_with_failure/not_found)
    |   // response already sent to client...
    |   SQL UPDATE REQUEST QUEUE
    |         SET STATUS            = :rc
$   |             REQUEST_COMPL_DT  = current date/time
    |         WHERE REQ_ID = :req_id
    endif
endfunction function rec_not_ready(request_ptr,res_id): boolean
// This fcn will eventually access shared memory (currently a lower
// priority)

$  if ((request_ptr->start_dt == constant NULL_YYYYMMDDHHMMSS /* = 00010101010101 */)  &&
$      (request_ptr->end_dt == constant...)) then // i.e. no params for these
       return(FALSE)
   endif
$  did = appropriate time // use single populated one OR latest time of two
   if (res_id != -1) then
   |   SQL SELECT INTO :last_update
   |                  LAST_UPDATE
   |       FROM DEVICES
   |       WHERE DEVICE_ID = :res_id
```

```
   |  if (last_update > did) then
   |      return(FALSE)
   |  endif
   else // check for any
   |  SELECT max(LAST_UPDATE) FROM DEVICES INTO :last_update
   |  if (last_update > did) then
          return(FALSE)
       endif
$  endif
   return(TRUE)
endfunction function complete_response(caller,buf,N,request_ptr,
                           overallResult,numItems)
   if (caller == GETREC) then
$     concat +2010 line to buf string
$     prepare +2000 line /* "numRecords:" substring */ based on fcn params...
$     right justify +2000 response line up to &(buf[N])
$         and determine actual starting char k in buf
$  else // caller = VREQ
$     concat +1010 line to buf string
$     prepare +1000 line /* "templatesFound:" substring */ based on fcn params...
$     right justify +1000 response line up to &(buf[N])
$         and determine actual starting char k in buf
$  endif
   respond2client(session_id,&(buf[k]))
   free(buf)
endfunction.

$ !! HANDLE_EXPECTED_VALUES functionality is to be placed into SCL_TO_WHERE()... !!
$
$function handle_expected_values(template_id,request_ptr,
$                                scl_string,fixed_scl_ptr,
$                                count_ptr,expected_val_buf)
$// Cursor...
$   DECLARE CURSOR GETEXPV FOR
$   SELECT FIELD_NAME_ID, FIELD_VALUE, COMPARE_OPERATOR
$      FROM TEMPLATE_EXPECTED_VALUES, TEMPLATE
$      WHERE TEMPLATE.TEMPLATE_ID            = :id1 AND
$            TEMPLATE_EXPECTED_VALUES.TEMPLATE_ID =
$                     TEMPLATE.TEMPLATE_ID
$
$   set sql id1 to template_id
$   *count_ptr = 0
$   open cursor GETEXPV
$   loop
$   |  fetch per cursor into :exp_value_fields...
$   |  if (eof) then
$   |      close cursor GETEXPV
$   |      break loop
$   |  endif
$      place row into expected_val_buf // array of expected value row(s)
$   |  (*count_ptr)++
$   endloop
$   make override variable replacements from request override
$        variables to expected value fields
$   dynamically allocate worst case *fixed_scl_ptr
$   update any "_name" occurrenc(es) in scl with expected value fields
$       when building fixed string at *fixed_scl_ptr
```

34

```
$endfunction function adjust_any_times(request_ptr,device_id,start_dt_addr,end_dt_addr)
    // will eventually access shared memory (currently a lower priority)
$   if (request_ptr->start_dt != constant NULL_YYYYMMDDHHMMSS /* = 00010101010101 */) then
    |   sdt = request_ptr->start_dt param
    |   SQL SELECT MAX(DEVICE_TIME) INTO :dev_time, :teams_time
    |                   DEVICE_TIME, TEAMS_TIME
    |       FROM DEVICE_TIME_CHANGE_HISTORY
    |       WHERE DEVICE_ID  = :device_id AND
    |             TEAMS_TIME <= :sdt
    |   calculate :dev_time, :teams_time difference
    |   *start_dt_addr = adjusted sdt
    endif
    if (request_ptr->end_dt param specified) then
    |   edt = request_ptr->end_dt param
    |   SQL SELECT MAX(DEVICE_TIME) INTO :dev_time, :teams_time
    |                   DEVICE_TIME, TEAMS_TIME
    |       FROM DEVICE_TIME_CHANGE_HISTORY
    |       WHERE DEVICE_ID  = :device_id AND
    |             TEAMS_TIME <= :edt
    |   calculate :dev_time, :teams_time difference
    |   *end_dt_addr = adjusted edt
    endif
endfunction function getrec(request_ptr)
    // Cursors declared with host variables ON STACK
    DECLARE CURSOR GETRVID FOR
$   SELECT RECORD_TYPE, RECORD_IMAGE, BILLING_RECORD_ID
        FROM  VREQ_X_BILLING_X_TEMPLATE_VIEW,BILLING_RECS_RECEIVED_VIEW,
$             BILLING_RECS_RECEIVED_KEYS_VIEW,RECORD_TYPES
                    // views for lives union archives
        WHERE VREQ_X_BILLING_X_TEMPLATE_VIEW.VREQ_ID = :vid AND
                                                        // VID parameter..
              VREQ_X_BILLING_X_TEMPLATE_VIEW.BILLING_RECORD_ID =
                        BILLING_RECS_RECEIVED.BILLING_RECORD_ID AND
              VREQ_X_BILLING_X_TEMPLATE_VIEW.BILLING_RECORD_ID =
                        BILLING_RECS_RECEIVED_KEYS.BILLING_RECORD_ID AND
$             RECORD_TYPES.RECORD_TYPE_ID =
$                          BILLING_RECS_RECEIVED_KEYS_VIEW.RECORD_TYPE_ID DECLARE CURSOR GETRTEMP FOR
    SELECT * // use explicit field list...
        FROM TEMPLATE
        WHERE TEMPLATE_ID = :id1 OR  // testcase_number in request
              TEMPLATE_ID = :id2 OR  // orig_switch_load_id
              TEMPLATE_ID = :id3 OR  // term_switch_load_id
              TEMPLATE_ID = :id4 OR  // resource_id
              TEMPLATE_ID = :id5     // resource_load_id
                                     // -1 populated if less than 5...

DECLARE CURSOR GETRID FOR
$   SELECT RECORD_TYPE, RECORD_IMAGE
        FROM BILLING_RECS_RECEIVED_VIEW,BILLING_RECS_RECEIVED_KEYS_VIEW,
$            RECORD_TYPES
                    // views for lives union archives
        WHERE (BILLING_RECORD_ID = :id1 OR  // recid column list...
               BILLING_RECORD_ID = :id2 OR  //
               BILLING_RECORD_ID = :id3 OR  //
               BILLING_RECORD_ID = :id4 OR  //
               BILLING_RECORD_ID = :id5)    //
                                     // -1 populated if less than 5...
```

```
$                      AND
$       BILLING_RECS_RECEIVED_KEYS_VIEW.RECORD_TYPE_ID = RECORD_TYPES.RECORD_TYPE_ID overallResult = RECNOTFOUND
    case (request command type) of // break after each case...

getrecvid:
            dynamically allocate worst case out_buf per response
                including maxreturn, fields, response, and vrqst
                parameters
            initialize 0..N of out_buf with printable chars // e.g. X
                thereby keeping worst case room for front of response
            set sql vid = request testcase_number
            numRecords = 0
            open cursor GETRVID
            loop
            |   fetch per cursor into :record_type_id, :billing_rec
            |   if (eof) then
            |       close cursor GETRVID
            |       break loop
            |   endif
            |   numRecords++
            |   overallResult = FOUND
            |   concat +2001 line to out_buf
            |   RAW2OUTPUT(request_ptr,    // contains fields and response params...
            |              record_type_id,
            |              :billing_rec,   // addr of billing rec data
            |              &(out_buf[N]))  // out buf addr to concat to
            |                              // N= worst case room for beginning
            |       // raw2output() handles +2002, +2003, and +2007 lines...
            |   if (max_return parameter met) then
            |       close cursor GETRVID
            |       break loop
            |   endif
            endloop
            if (vrqst param applicable) then
            |   SQL SELECT INTO ... :request_fields...
            |       FROM REQUEST_QUEUE_VIEW
            |       WHERE REQ_ID = :vid // VID parameter...
            |   if (found) then
            |       concat requested +2009 line to out_buf string
            |   endif
            endif
            complete_response(GETREC,out_buf,N,request_ptr,overallResult,
                            numRecords)
            return(overallResult)

getrectemp:
            if (rec_not_ready(request_ptr,request_orig_switch_id
                              /* -1 if not populated */)) then
                return(RECNOTREADY)
            endif
            dynamically allocate worst case out_buf per response
                including maxreturn, fields, and response parameters
            initialize 0..N of out_buf with printable chars // e.g. X
                thereby keeping worst case room for front of response
            set sql id1 through id5 = request testcase_number,
                    orig_switch_load_id,term_switch_load_id,
                    resource_id, and resource_load_id
            numRecords = 0
            open cursor GETRTEMP
            loop
            |   fetch per cursor into :template_rec_fields...
```

```
            | if (eof) then
            |     close cursor GETRTEMP
            |     break loop
            | endif
            | concat +2004 line to out_buf
$           | if (rc = prep_qry_and_expected_vals(GETREC,out_buf,N,numRecords,
$           |         request_ptr->orig_switch_id,template.template_id,
$           |         template.scl,template.record_type_id,&where_clause,request_ptr,
$           |         &expected_val_buf,&evcount)) then
$           |     close cursor GETRTEMP
$           |     return(rc)
            | endif
            | set up SQLDA
            | dynamically
            |    SQL SELECT RECORD_TYPE_ID, RECORD_IMAGE
            |          FROM BILLING_RECS_RECEIVED_VIEW,
            |               BILLING_RECS_RECEIVED_KEYS_VIEW
            |                    // views for lives union archives
            |          WHERE BILLING_RECS_RECEIVED_VIEW.BILLING_RECORD_ID=
            |                BILLING_RECS_RECEIVED_KEYS_VIEW.BILLING_RECORD_ID
            |                                           AND
 $          |                "where clause built at where_clause" USING SQLDA
 $          | free(where_clause)     // use better name if for entire
            |                        // dynamic sql
            | if (SQL error) then
            |     complete_response(GETREC,out_buf,N,request_ptr,
            |                       SQLERROR,numRecords)
            |     close cursor GETRTEMP
            |     return(SQLERROR)
            | endif
            | open cursor for dynamic select
            | loop
            | |  fetch per cursor into :sqlda.record_type_id, :sqlda.billing_rec
            | |  if (eof) then
            | |      close cursor for dynamic select
            | |      break loop
            | |  endif
            | |  numRecords++
            | |  overallResult = FOUND
            | |  concat +2001 line to out_buf
            | |  RAW2OUTPUT(request_ptr,       // contains fields and response params...
$           | |             :sqlda.record_type_id,
$           | |             :sqlda.billing_rec,  // addr of billing rec data
            | |             &(out_buf[N])      // out buf addr to concat to
            | |                                // N= worst case room for beginning
            | |  // raw2output() handles +2002, +2003, and +2007 lines...
            | |  if (max return parameter met) then
            | |      close cursor GETRTEMP
            | |      close cursor for dynamic select
            | |      break both loops
            | |  endif
            | endloop
            endloop
            complete_response(GETREC,out_buf,N,request_ptr,overallResult,
                              numRecords)
            return(overallResult)

getrecid:
            dynamically allocate worst case out_buf per response
               of 5 billing records, fields, and response parameters
            initialize 0..N of out_buf with printable chars // e.g. X
               thereby keeping worst case room for front of response
            set sql id1 through id5 = recid list // -1 where not used
```

```
        numRecords = 0
        open cursor GETRID
        loop
        | fetch per cursor into :record_type_id,:billing_rec
        | if (eof) then
        |     close cursor GETRID
        |     break loop
        | endif
        | numRecords++
        | overallResult = FOUND
        | concat +2001 line to out_buf
        | RAW2OUTPUT(request_ptr,    // contains fields and response params...
        |            :record_type_id,
        |            :billing_rec,    // addr of billing rec data
        |            &(out_buf[N]))   // out buf addr to concat to
        |                             // N= worst case room for beginning
        |     // raw2output() handles +2002, +2003, and +2007 lines...
        | if (max_return parameter met) then
        |     close cursor GETRID
        |     break loop
        | endif
        endloop
        complete_response(GETREC,out_buf,N,request_ptr,overallResult,
                          numRecords)
        return(overallResult)

getrecscl:
$       if (rec_not_ready(request_ptr,request_ptr->orig_switch_id
                                    /* -1 if not populated */)) then
            return(RECNOTREADY)
        endif
        dynamically allocate worst case out_buf per response
            including maxreturn, fields, and response parameters
        initialize 0..N of out_buf with printable chars // e.g. X
            thereby keeping worst case room for front of response
$       if (request_ptr->orig_switch_id != NULL_DEVICE_ID /* -1 */) then
            adjust_any_times(request_ptr,orig_switch_id,
                             &start_dt,&end_dt)
        endif
        build dynamic query where clause from
$           parameters DEV_NAME device id if not -1, start_dt and/or end_dt if present,
$                                          and SCL
        set up SQLDA
        dynamically
            SQL SELECT RECORD_TYPE_ID, RECORD_IMAGE
                   FROM BILLING_RECS_RECEIVED_VIEW,
                        BILLING_RECS_RECEIVED_KEYS_VIEW
                            // views are lives union archives
                   WHERE BILLING_RECS_RECEIVED_VIEW.BILLING_RECORD_ID=
                        BILLING_RECS_RECEIVED_KEYS_VIEW.BILLING_RECORD_ID
                                                    AND
$                       "where clause built above..." USING SQLDA
        if (SQL error) then
            complete_response(GETREC,out_buf,N,request_ptr,
                              SQLERROR,numRecords)
            close dynamic sql cursor
            return(SQLERROR)
        endif
        numRecords = 0
        open cursor for dynamic select
        loop
        | fetch per cursor into :sqlda.record_type_id,:sqlda.billing_rec
        | if (eof) then
```

```
             |      close cursor for dynamic select
             |      break loop
             |   endif
             |   numRecords++
             |   overallResult = FOUND
             |   concat +2001 line to out_buf
             |   RAW2OUTPUT(request_ptr,          // contains fields and response params…
$            |              :sqlda.record_type_id,
$            |              :sqlda.billing_rec,   // addr of billing rec data
             |              &(out_buf[N]))        // out buf addr to concat to
             |                                    // N= worst case room for beginning
             |   // raw2output() handles +2002, +2003, and +2007 lines...
             |   if (max_return parameter met) then
             |      close cursor for dynamic select
             |      break loop
             |   endif
             endloop
             complete_response(GETREC,out_buf,N,request_ptr,overallResult,
                               numRecords)
          return(overallResult)
       endcase
   endfunction function vreq(request_ptr)
      case (request cmd type) of
         getrectc:
$  //
$  // Currently only support VREQTC
$  //
         overallResult = PASS
         dynamically allocate worst case out_buf per response
                  including maxreturn, fields, and response parameters
                      // 1 Meg probably good starter…
         initialize 0..N of out_buf with printable chars // e.g. X
$                 thereby keeping worst case room for +1000 line front of response
         rc = GET_TEMPLATES4TC(request_ptr,testcase_section,testcase_number,
                               &template_ct,
                               &(temp_structs) /* local var = max 10 */)
$        // each temp struct contains 3 fields from the TESTCASE_X_TEMPLATE
$        //    table: template_id, resource_id, device_id
         //  templates are to be returned in TESTCASE_TEMPLATE order
$        if (rc) then
$           // rc may be TEMPLNOTFOUND (i.e. template_ct = 0) or TEMPLATERR (too_many)
$           complete_response(VREQ,out_buf,N,request_ptr,rc,0)
$           return(rc)
$        endif
$        if (request_ptr->recid param specified) then
             place into brec_id array /* max=5 */ of billing record ids
             brecct = how many of 'em
         endif
         for i = 0 to (template_ct-1) do
$           dev_id = get_query_switch_id(request_ptr,temp_structs[i].resource_id,
$                                        temp_structs[i].device_id)
$           if (rec_not_ready(request_ptr,dev_id)) then
                free(out_buf)
                return(RECNOTREADY)
             endif
         endfor
         for i = 0 to (template_ct-1) do
$   |      concat +1001 line to out_buf with stubbed values for
$   |           numRecs (init to two 0s) & result ("      ;" # blanks per max return str sz)
$   |      save positions for future overwrite to +1001 line; c, d, resp.
    |      SQL SELECT INTO :rec_type_id, :scl
```

```
            RECORD_TYPE_ID, SEARCH_EXPRESSION
         FROM TEMPLATE
         WHERE TEMPLATE_ID = :temp_structs[i].template_id
      if (NOT FOUND or TOO_MANY) then
         complete_line_results(out_buf,
                               0,c,
                               TEMPLATERR,d)
         complete_response(VREQ,out_buf,N,request_ptr,TEMPLATERR,template_ct)
         return(TEMPLATERR)
      endif
   endif
   if (request_ptr->recid param specified in request) then // use recid list only...
      dynamically allocate worst case expected_val_buf
      rc = SCL_TO_WHERE(NULLPTR /* indicates to only return expected values
                        stuff */,temp_structs[i].template_id,request_ptr,
                        NULLPTR,&evcount,expected_val_buf)
      if (rc) then // TEMPLATERR an eligible rc...
         complete_line_results(out_buf,
                               0,c,
                               rc,d)
         complete_response(VREQ,out_buf,N,request_ptr,rc,template_ct)
         return(rc)
      endif
      ver2brec_id_list(request_ptr,out_buf,temp_structs,i,brecct,brec_id,evcount,
                       expected_val_buf,c,d,&overallResult)
   else
      dev_id = get_query_switch_id(request_ptr,temp_structs[i].resource_id,
                                   temp_structs[i].device_id)
      if (rc = prep_qry_and_expected_vals(VREQ,out_buf,N,numRecords,dev_id,
                                          temp_struct[i].template_id,
                                          scl,rec_type_id,
                                          &where_clause,request_ptr,&expected_val_buf,&evcount) then
         return(rc)
      endif
      set up SQLDA
      dynamically
         SQL SELECT RECORD_TYPE, RECORD_IMAGE, BILLING_RECORD_ID
             FROM BILLING_RECS_RECEIVED,              // view
                  BILLING_RECS_RECEIVED_KEYS,         // view
                  RECORD_TYPES
             WHERE BILLING_RECS_RECEIVED_VIEW.BILLING_RECORD_ID=
                   BILLING_RECS_RECEIVED_KEYS_VIEW.BILLING_RECORD_ID
                                           AND
                   BILLING_RECS_RECEIVED_KEYS.RECORD_TYPE_ID =
                                           RECORD_TYPES.RECORD_TYPE_ID AND
                   "where clause built at where_clause" USING SQLDA
      free(where_clause)
      if (SQL error) then
         free(expected_val_buf)
         complete_line_results(out_buf,
                               0,c,
                               SQLERROR,d)
         complete_response(VREQ,out_buf,N,request_ptr,SQLERROR,
                           template_ct)
         close dynamic sql cursor
         return(SQLERROR)
      endif
      open cursor for dynamic select
      rec_count        = 0
      greatest_success = RECNOTFOUND // ordered set (same as STATUS table requirement)
                                     //   (RECNOTFOUND,FAIL,PASSWEXCEPTION,PASS)
      loop
         fetch per cursor into :sqlda.record_type_id,
                               :sqlda.billing_rec,
```

```
    |  |  |                          :brecid
    |  |  |  if (eof) then
    |  |  |     free(expected_val_buf)
    |  |  |     close cursor for dynamic select
    |  |  |     break loop
    |  |  |  endif
    |  |  |  if (max_return parameter exceeded by this fetch) then
    |  |  |     free(expected_val_buf)
    |  |  |     close cursor for dynamic select
    |  |  |     overallResult = TOOMANYRECORDS
    |  |  |     break loop // maxreturn is per template for verifications...
    |  |  |  endif
    |  |  |  rec_count++;
    |  |  |  concat +1005 line start to out_buf with stubbed values for
    |  |  |          result and numCompareResults
    |  |  |      // This design outputs info for all records that match
    |  |  |      // the template, however the overallResult reflects an overall
    |  |  |      // FAIL/PASS
    |  |  |  save positions for future overwrite to +1005 line; a, b, resp.
    |  |  |      // leading zeroes for numbers, PASS/FAIL string for result...
    |  |  |  compare_rec2template(request_ptr,out_buf,
    |  |  |                       temp_structs[i].template_id,
    |  |  |                       ev_count,expected_val_buf,
 $  |  |  |                       brecid
    |  |  |                       sqlda.record_type_id,
    |  |  |                       sqlda.billing_rec,
    |  |  |                       &result,
    |  |  |                       &numFlagged)
    |  |  |      // handles +1002, +1003, +1006, and +1007 lines
    |  |  |  complete_line_results(out_buf,
 $  |  |  |                        numFlagged,b,
 $  |  |  |                        result,a)
    |  |  |  if (result > greatest_success) then
    |  |  |     greatest_success = result
    |  |  |  endif
    |  |  endloop
    |  |  if (overallResult == TOOMANYRECORDS) then
    |  |     template_result = TOOMANYRECORDS
 $  |  |  else // template lines get best billing rec match, overall result gets wrst case
    |  |  |  case (greatest_success) of // break each case...
    |  |  |          PASS:           template_result  = PASS
    |  |  |          PASSWEXCEPTION: template_result  = PASSWEXCEPTION
    |  |  |                          if (overallResult != FAIL) then
    |  |  |                             overallResult = PASSWEXCEPTION
    |  |  |                          endif
    |  |  |          FAIL:           template_result  = FAIL
    |  |  |                          overallResult    = FAIL
 $  |  |  |          RECNOTFOUND:    template_result  = RECNOTFOUND
 $  |  |  |                          overallResult    = FAIL
    |  |  |  endcase
    |  |  endif
    |  |  complete_line_results(out_buf,
    |  |                        rec_count,c,
    |  |                        template_result,d)
    |  |  SQL INSERT INTO VREQ_X_BILLING_X_TEMPLATE
    |  |       VALUES (req_id from request,
    |  |               temp_structs[i].template_id,
    |  |               brecid,
    |  |               template_result)
    |  |  if (overallResult == TOOMANYRECORDS) then
    |  |     break for-loop // stop on template which exceeded maxreturn...
    |  |  endif
    |  endif
```

```
      endfor
      if (vrqst param applicable) then
          concat requested +1009 line to out_buf string from request_ptr
      endif
      complete_response(VREQ,out_buf,N,request_ptr,overallResult,
                      template_count)
      return(overallResult)
//
    endcase
endfunction $function ver2brec_id_list(request_ptr,out_buf,temp_structs,i,brecct,brec_id,evcount,
$                          expected_val_buf,c,d,overall_result_addr)
$
    if (brecct > i) then
        brecid = brec_id[i]
    else
        brecid = brec_id[brecct-1] // you know there is at least one from parameter
    endif
$   if (brecid == don't care /* was ^ */) then
        complete_line_results(out_buf,0,c,PASS,d)
    else
    |   SQL SELECT INTO :record_type_id,:billing_rec
    |              RECORD_TYPE_ID,RECORD_IMAGE
    |         FROM BILLING_RECS_RECEIVED_KEYS,BILLING_RECS_RECEIVED
    |         WHERE BILLING_RECORD_ID = :brecid AND
    |              BILLING_RECS_RECEIVED.BILLING_RECORD_ID =
    |              BILLING_RECS_RECEIVED_KEYS.BILLING_RECORD_ID
    |   if (not found) then
    |   |   free(expected_val_buf)
    |   |   template_result = RECNOTFOUND
    |   |   overallResult   = FAIL
    |   |   complete_line_results(out_buf,
    |   |                       0,c,
    |   |                       template_result,d)
    |   |   SQL INSERT INTO VREQ_X_BILLING_X_TEMPLATE
    |   |       VALUES (req_id from request,
    |   |               temp_structs[i].template_id,
    |   |               0,
    |   |               template_result)
    |   else
    |   |   concat +1005 line start to out_buf with stubbed values for
$   |   |           result ("        ;" # blanks per max return str sz) and
$   |   |           numCompareResults (init to two 0s)
    |   |   save positions for future overwrite to +1005 line; a, b, resp.
    |   |       // leading zeroes for numbers, string for result...
    |   |   compare_rec2template(request_ptr,out_buf,
    |   |                       temp_structs[i].template_id,
    |   |                       ev_count,expected_val_buf,
$   |   |                       brecid,
    |   |                       sqlda.record_type_id,
    |   |                       sqlda.billing_rec,
    |   |                       &result,
    |   |                       &numFlagged)
    |   |       // handles +1002, +1003, +1006, and +1007 lines
    |   |   complete_line_results(out_buf,
$   |   |                       numFlagged,b,
$   |   |                       result,a)
    |   |   case (result) of // break each case...
    |   |       PASS:          template_result = PASS
    |   |       PASSWEXCEPTION: template_result = PASSWEXCEPTION
    |   |                       if (overallResult != FAIL) then
    |   |                           overallResult = PASSWEXCEPTION
```

```
| |                    endif
| |    FAIL:           template_result = FAIL
| |                    overallResult   = FAIL
| | endcase
| | complete_line_results(out_buf,
| |                       rec_count,c,
| |                       template_result,d)
| | SQL INSERT INTO VREQ_X_BILLING_X_TEMPLATE
| |      VALUES (req_id from request,
| |              temp_structs[i].template_id,
| |              brecid,
| |              template_result)
| endif
endif
$endfunction function complete_line_results(out_buf,
                               two_digit_num,num_addr,
$                              result_string,str_addr)
   replace positions in out_buf for two_digit_num and
$        result_string...
$ make sure no blanks in result string // left justify with memcpy...
endfunction function compare_rec2template(request_ptr,
                              out_buf,
                              template_id,
                              ev_count,
                              expected_val_buf,
$                             bill_rec_id,
                              record_type_id,
                              raw_billing_rec_addr,
                              result_addr,
                              numF_addr)
   *numF_addr   = 0
   *result_addr = PASS
   for i = 0 to (ev_count-1) do
   | get billing record field value corresponding to expected_value[i]
$  | compare expected value field to billing record field
$  |    // use operator, % = wildcard char, leading 0s insignificant
$  |    // for #s, handle EVAL() fcn, dashes are nulls ...
   | if (billing record field does not match the expected value) then
$  | | get problem code according to the following SQL. Be efficient. Do the subselects
$  | |    in code, only use joins. Open cursor with static SQL and take the first one to
$  | |    work with if exists:::
$  | |
$  | |    // TSERVE can use the following statement to
$  | |    // return an applicable problem code if one exists.
$  | |
$  | | select problem_code_name, problem_code_id
$  | |   from problem_code PC,
$  | |        problem_code_x_field PCX,
$  | |        problem_code_x_template_value PCXT,
$  | |        problem_code_x_software_load PCXS
$  | |
$  | | where PCX.field_id    = :sought_field_name_id              AND
$  | |       PCXT.value      = :sought_billing_rec_val            AND
$  | |       PCXT.template_id = :sought_template_id               AND
$  | |       PCXT.problem_code_field_id = PCX.problem_code_field_id AND
$  | |       PCX.problem_code_id = PC.problem_code_id             AND
$  | |       PCX.problem_code_id = PCXS.problem_code_id           AND
$  | |       PC.problem_code_id  = PCXS.problem_code_id           AND
$  | |
```

```
EXISTS
(
  (select SLR2.ranking
   from software_load_ranking SLR2
   where SLR2.software_load_id = :sought_software_load_id)

BETWEEN ((Select SLR3.ranking
    from   sotftware_load_ranking SLR3
    where  SLR3.software_load_id = PCXS.start_load_id AND
           SLR3.Ranking > 0)

AND (Select SLR4.ranking
    from   sotftware_load_ranking SLR4
    where  SLR4.software_load_id = PCXS.end_load_id_load
           SLR4.Ranking > 0)
  ) // BETWEEN
  ) // first Select
  OR
  ((select SLR5.ranking
    from software_load_ranking SLR5
    where SLR5.software_load_id = :sought_software_load_id)

>=

(Select SLR6.ranking
    from   sotftware_load_ranking SLR6
    where  SLR6.software_load_id = PCXS.start_load_id AND
           SLR6.Ranking > 0 AND
           ((Select SLR7.ranking
             from   sotftware_load_ranking SLR7
             where  SLR7.software_load_id = PCXS.end_load_id_load) < 0))
  ) // second Select
) // EXISTS if (a problem code was found /* applies */) then
   if ((*result_addr) != FAIL) then
      // keep worst matching field result for billing record line
      (*result_addr) = PASSWEXCEPTION
   endif
   concat +1003 line to out_buf string
else
   (*result_addr) = FAIL
   // keep worst matching field result for billing record line
   concat +1002 line to out_buf string
endif
(*numF_addr)++
else
   if (response param in request == FIELDS) then
      concat +1006 line to out_buf string
   endif
endif
SQL INSERT INTO VERIFICATION_DATA
    VALUES (req_id from request,
            field_name_id,
            field_value,
            failure_id,
            problem_code_id,
            template_id,
            bill_rec_id)
```

```
      endfor
      if (response param in request == RAW) then
          concat +1007 line to out_buf string
              // use common code from RAW2OUTPUT function...
      endif
  endfunction $function prep_qry_and_expected_vals(caller,out_buf,N,numItems,dev_id,
  $                                    template_id,temp_scl,rec_type,where_clause_ptr,
  $                                    request_ptr,expected_val_buf_ptr,count_ptr)
  $    dynamically allocate worst case *where_clause_ptr
  $    if (dev_id != NULL_DEVICE_ID /* -1 */) then
  $       adjust_any_times(request_ptr,dev_id,&start_dt,&end_dt)
  $    endif
  $    build dynamic query where clause from
  $          dev_id if not -1 // to ' DEVICE_ID = dev_id val AND' and
  $          rec_type /* 'RECORD_TYPE_ID = rec_type val AND */
  $    if (request_ptr->start_dt specified && request_ptr->end_dt specified) then
  $       if (rec_type == BDR /* #define BDR_REC_TYPE = 41 */) then
  $          append where clause with '(request_ptr->start_dt-(reg var)
  $                                                        <= DEVICE_TIME_A AND
  $                                    request_ptr->end_dt+(reg var)
  $                                                        >= DEVICE_TIME_A)'
  $       else // all other record types
  $          append where clause with '(request_ptr->start_dt-(reg var) <=
  $                                                        DEVICE_TIME_A) AND
  $                                    request_ptr->end_dt+(reg var) >= DEVICE_TIME_B)'
  $       endif
  $    endif
  $    if (request_ptr->start_dt specified || request_ptr->end_dt specified) then
  $       if (rec_type == BDR /* #define BDR_REC_TYPE = 41 */) then
  $          append where clause with applicable param
  $                                    '(request_ptr->start_dt-(reg var)
  $                                                        <= DEVICE_TIME_A)' or
  $                                    '(request_ptr->end_dt+(reg var)
  $                                                        >= DEVICE_TIME_A)'
  $       else // all other record types
  $          append where clause with applicable param
  $                                    '(request_ptr->start_dt-(reg var) <=
  $                                                        DEVICE_TIME_A)' or
  $                                    '(request_ptr->end_dt-(reg var) >= DEVICE_TIME_B)'
  $       endif
  $    endif
  $    apply APPSCL/REPLSCL parameter to temp_scl for new_scl if applicable // with AND(s)
  $    dynamically allocate worst case *expected_val_buf_ptr
  $    rc = SCL_TO_WHERE(&((*where_clause_ptr)[SOFAR]),template_id,request_ptr,
  $                     new_scl,*count_ptr,*expected_val_buf)
  $    if (caller == GETREC) then
  $       free(*expected_val_buf_ptr)
  $    endif
  $    // INVALIDSCL eligible rc for invalid scl OR
  $    // if occurrence of "name = _name" produces no expected value
  $    // for replacement or if invalid "name". if "name = _name" produces
  $    // a null column for name then no "name = ''", use "name is
  $    // null"
  $    if (rc) then
  $       complete_response(caller,out_buf,N,request_ptr,
  $                         rc,numItems)
  $       free(everything dynamically allocated in this function...)
  $       return(rc)
  $    endif
  $    return(0 /* = ok */)
  $endfunction
```

```
$function get_query_switch_id(request_ptr,resource_id,device_id)
?    case resource_id of // break each case...
$       #define ORIG_SWITCH      /* = 1 */: dev_id = request_ptr->orig_switch_id
$       #define TERM_SWITCH      /* = 2 */: dev_id = request_ptr->term_switch_id
$       #define BRIDGNG_SWITCH   /* = 3 */: dev_id = request_ptr->resource_id
$       #define LITERAL_SWITCH   /* = 5 */: dev_id = device_id
$       otherwise                         : dev_id = request_ptr->orig_switch_id
$   endcase
$   return(dev_id)
$endfunction
```

Template Retrieval Algorithm (from TEAMS doc)

Retrieving the correct template version involves four processes — retrieving required data, ranking platforms, ranking software loads and selecting the best template. Each process is explained below.

*Retrieving Required Data*

Step 1

Select the distinct testcase template values and corresponding resource type for a given testcase. For an example, refer to query 1 below.

> QUERY 1
>
> Select distinct testcase_template, resource_type
>
> From testcase_x_template txt, resource_types rt
>
> Where testcase_section = '815520' and
>
> > testcase_number = 145 and
> >
> > txt.resource_type_id = rt.resource_type_id
>
> Result: 1, ORIG_SWITCH    /testcase_template = 1
>
> > /resource_type = ORIG_SWITCH
>
> (A) = testcase_template

Step 2

Using a template retrieved in step 1, perform steps 3 through 9. Repeat these steps for each additional template.

Step 3

Retrieve the device_id for the selected template. Note that the resource_type_id field is populated for every template, whereas the device_id is populated for only non-vlab templates — those with a "LITERAL" resource type value. If the template is non-vlab, then the device_id is pulled directly from the testcase template. For an example, refer to query two below.

> QUERY 2
>
> Select device_id

From testcase_x_template

Where testcase_section = '815520' and testcase_number = 145 and testcase_template = 1 (A)

If the resource type is populated with a value other than LITERAL, then the device_id is derived from data submitted by the client and the resource type. The client may be on the ITP or AOSM platform.

(C) = device_id     /device_id = 4 is RES6 (retrieved from template or derived from resource type)

*Note:*     *Table Change*

- *Remove vlab_format field from testcase table.*
- *Add the LITERAL value to the resource_types table.*
- *Modify TDMA to support the mandatory population of the device_id field for templates with a LITERAL resource type value.*

Step 4

Retrieve the platform_id for the device in step three. For an example, refer to query 3 below.

QUERY 3

Select platform_id

From devices

Where device_id = 4 (C)

Result: 3     /platform_id = 3 is DMS (D) = platform_id

Step 5

Determine the switch load running on the device in step three. The values for the effective_time and not_effective_time parameters are determined by the start_dt and end_dt parameters sent by the execution client. One software load should be returned. For an example, refer to query 4 below.

QUERY 4

Select software_load_id

From load_x_device

Where device_id = 4 (C) and effective_time <= to_date('1997/11/12 09:45:40','YYYY/MM/DD HH24:MI:SS') and not_effective_time >= to_date('1997/11/12 09:45:40','YYYY/MM/DD HH24:MI:SS')

Result: 6     /software_load_id = 6 is MCI14

(E) = software_load_id

Step 6

Retrieve the ranking and the spec_id for the software load derived in step 5. For an example, refer to query 5 below.

QUERY 5

Select ranking, spec_id

From software_load_ranking

Where software_load_id = 6 (E)

Result: 8, 99   /ranking = 8
               /spec_id = 99

(F) = ranking (H) = spec_id

*Note: Table Change*

*A table change is required to run query 5. The spec_id field must be removed from the specid_x_load table and added to the software_load_ranking table as a not null field, after which the specid_x_load table may be deleted. These changes should not present any data problems, since the data in the software_load_ranking and the specid_x_load tables have a one-to-one relationship. If a software load is tied to multiple specs, then it must contain multiple entries in the software load table with the corresponding spec appended to its name. Refer to the example below.*

| Example: | Software Load | Spec |
|---|---|---|
| | MCI07_Spec_99 | 99 |
| | MCI07_Spec_98 | 98 |

*Ranking Platforms*
Step 7

Derive the platform ranking order to determine which software load to use when selecting the best template version. For example, if the billing record being verified is cut on a DMS, then a DMS is the best software load to use. If a template doesn't exist for any of the selected software loads, the next platform is used. For an example, refer to query 6 below.

QUERY 6

Select template_platform_id

From platform_ranking

Where platform_id = 3 (D)

Order By ranking desc

Result: 3       /template_platform_id = 3 is DMS
        9999    /template_platform_id = 9999 is ANY_SWITCH
        5       /template_platform_id = 5 is DEX (G) = template_platform_id

*Ranking Software Load*

*Step 8*

Create a list of software loads based on the best platform determined in step seven. The software load ranking list is used to derive the best template version in step eight. If template versions are not found using the software load list in step eight, then use the next available platform to generate a new software load list.

The first platform on the ranking platform list should be the same as in query three. If the platforms are the same, then query 7A is used to derive the ranking software load list.

QUERY 7A

Select software_load_id

From software_load_ranking

Where platform_id = 3 (G) and ranking <= 8 (F) and ranking >= 0 and

Order By ranking desc,

| Result: | 6 | /software_load_id = 6 is MCI14 |
|---|---|---|
| | 5 | /software_load_id = 5 is MCI13 |
| | 3 | /software_load_id = 3 is MCI09 |
| | 2 | /software_load_id = 2 is MCI08 |
| | 1 | /software_load_id = 1 is MCI07 |

Note that the ranking number for each software load must be less than or equal to the ranking number determined in query 5 and greater than or equal to zero. If the platform used from the ranking platform list is different from the platform derived in query 3, then query 7B is used to derive the software load list.

QUERY 7B

Select software_load_id, spec_id

From software_load_ranking

Where platform_id = 9999 (G) and ranking >= 0 and spec_id <= 99 (H)

Order By spec_id, ranking desc

| Result: | 9999, 99 | /software_load_id = 9999 is Any_9.9, spec_id = 99 is 9.9 |
|---|---|---|
| | 9998, 98 | /software_load_id = 9998 is Any_9.8, spec_id = 98 is 9.8 |
| | 9996, 96 | /software_load_id = 9996 is Any_9.6, spec_id = 96 is 9.6 |

(I) = software_load_id

Software loads are filtered and ranked by their spec_id where the spec_id is the ranking value. The spec_id for each software load must be less than or equal to the spec_id in query 5, and the software load ranking value must be greater than or equal to zero. When the ranking value is greater than or equal to zero, the user is able to input insignificant loads in the database by assigning them a negative ranking number. This negative number ensures that the software load is considered in the retrieval process.

*Selecting the Best Template*
Step 9

Locate the best template version within the software load ranking list. When multiple versions exist, use the highest template version. If none exist, use the next best platform to generate a new software load ranking list. For an example, refer to query 8 below.

> QUERY EIGHT
>
> Select template_version
>
> From testcase_x_template txt
>
> Where txt.testcase_section = '815520' and
>
> > txt.testcase_number = 145 and
> >
> > txt.testcase_template = 1 (A) and
> >
> > txt.software_load_id = 9999 (I)
>
> Order By template_version desc Result: 1  /template_version = 1

Time Server (TS)

Requirements
- No Roguewave
- Provide means for isolating test of TS as a single stand-alone component
- Interface to Time I/F DLL for populating times (when shared memory complete)
-

Registry Variables
Old/Existing:
```
/TS/CONNECTRETRIES,ITEM,ASCII,3
/TS/LogLevel,ITEM,ASCII,0
/TS/MMIIP,ITEM,ASCII,166.34.96.188
/TS/MMIPort,ITEM,ASCII,7
/TS/TIMEOFFSET,,,10
/TS/TimeToCheck,ITEM,ASCII,900
```

Design
```
loop
    retrieve device_time_change_history table time mappings from MMI server for all
        devices in devices table
    appropriately populate device_time_change_history table
    sleep according to registry variable
endloop
```

Queue Refresh Futures (QRF)

Requirements
- No Roguewave
- Provide means for isolating test of QRF as a single stand-alone component
- Assure status change and date/time change for next future try in queue element is made by code rather than I/O
- Registry variable for poll time (e.g. 2 minutes)
-

Registry Variables

Design
```
open cursor for static SQL select all rows from request_queue table that have a
      status of initial/pending, also order by highest priority and date/time within
      priority (older rows processed first) // TServ may have been shut-down with
      unprocessed requests...
loop
   fetch a row
   if (eof) then
      close cursor
      break loop
   endif
   format row into struct
   deposit struct onto VER queue
endloop
loop
   open cursor for static SQL select all rows from request_queue table that have a
       status of requeued and start_search_dt less than the current date/time, also order
       by highest priority and date/time within priority (older rows processed first)
   loop
      fetch a row
      if (eof) then
         close cursor
         break loop
      endif
      format row into struct
      deposit struct onto VER queue
      update row in db to pending
   endloop
   sleep according to registry variable
endloop
```

Shared Memory Refresh (SMR)

Requirements
- No Roguewave
- Provide means for isolating test of SMR as a single stand-alone component
- Allow convenient invocation from command line while optimizing fork by a process
- Design memory array of appropriately sorted structs and perform refresh from following tables:
  DB_LOAD_DIRECTOR, RECORD_TYPES, BILLING_SPEC_X_RECORD_TYPES, FIELD_TYPES, BILLING_SPECIFICATION, FIELDS, RECORD_TYPE_FIELD_NAME, FILTER, FILTER_SPECIFICATION, BRR_TABLE_DETAILS, DEVICE_TIME_CHANGE_HISTORY, FAILURES, JOBS, DEVICES, PLATFORM, LOAD_X_DEVICE, SOFTWARE_LOAD_RANKING, RESOURCES, RESOURCE_TYPES, PRIORITY, SPECID_X_LOAD, PLATFORM_RANKING, EQUIPMENT_TYPES, REGISTRY, STATUS; Also, implement reentrant DLL (semaphore lock for clients) for appropriate binary search requirements
- Provide set of binary search interfaces given all process requirements
- Utility to dump SHM subsets
- Signals to processes for updating their read-only local copies (signals are LIFO preempted contexts on stack)...; each process signal handler will use an atomic assembly instruction to update a flag that will be atomically/appropriately consulted at the best opportune moment by the main process thread of execution for performing an appropriate update in a timely manner
-

Registry Variables

Design

```
Obvious per requirements.
```

Janitor (JAN)

Requirements
- No Roguewave
- Scheduled cleanup of obsolete DB rows
- Scheduled archive
-

Registry Variables

Old/Existing:
```
/JAN/FILE_LOC,ITEM,ASCII,/tserv/log
/JAN/FILE_NAME,ITEM,ASCII,janitor.log
/JAN/RETAIN_DAYS_BRRK,ITEM,ASCII,240
/JAN/RETAIN_DAYS_VRQ,ITEM,ASCII,168
```

Design

// RECORD_TYPE_ID and FIELD_NAME_ID can't change!!!
// DP already has DB and disk space validation so JAN will not do...
//
```
$ Chron job wakes up according to schedule // e.g. every two days
  clean up ../tserv/log directory
$ clean up Loader bulk files archived
  shrink no-hup.out
  archive/copy request queue and related rows (to all Verification Archives tables...)
  delete obsolete rows from DEVICE_TIME_CHANGE_HISTORY, REQUEST_QUEUE, and GETREC_FIELDS
```

Time Interface DLL

Requirements
- No Roguewave
- Provide means for isolating test as a single stand-alone component
- Isolate semaphore locking in reentrant DLL interface for clients
-

Design
Forthcoming...

Service Manager, IPC, Shared Memory, Semaphores, and Queues

Requirements
- No Roguewave
- Provide means for isolating test as a single stand-alone system
- Provisionable priorities of requests
- Shared memory will contain the tables described above in SMR section
- Pool of CLMs feed to queue; Pool of VERs feed from queue; can multithread when get to DEC UNIX 4.0d
- System design for semaphore protected partitions of shared memory depending on who accesses what, and assure team members implement appropriately in isolated reentrant DLL interfaces
- SVC spawns configurable pool of VERs, LOGs, COLs
- Queue size

Registry Variables

Design
```
// The following table supports process startup for the various clients of
// the service manager.  There are 7 columns that dictate the startup of
// clients.  The first two columns are pointers to the process load and
// process unload routines respectively.  The third column is the pathname
// of the process to start up.  The fourth column is the command line for
// the process.  The fifth column is a count that designates the number of
// processes to start.  The sixth column dictates whether or not a message
// queue should be created and the size of the queue.  If the value is 0
// no queue is created.  If the value is between 1 and the default queue
// size (16384) a quee of the default size is created.  If the value is
// greater than the defult message queue size (16384) a queue with size
// rounded to the next igher segment size (segments are 8192 bytes) is
// created.  The seventh and final, column specifies whether or not a
// shared memory segmnt should be created and if so (non-0) specifies
// the size of the segment
SVCPROCLOAD         svcProcLoad[] =
    {{ svcStartLOG, svcStopLOG, "log_Main", "CmdLine1", 1, 32768,      0 }
     { svcStartVER, svcStopVER, "ver_Main", "CmdLine2", 4, 32768, 32768 }};

SVC main routine
        create shared memory regions
        create message queues (in/outbound)
        set handler to catch exiting child processes
        start all TServ processes
        start main process loop
            wait for message on inbound queue
            process inbound message or interrupt
                *(for current iteration -- first step --
                *only messages will be processed)
                *The following messages are currentlydefined:
                *    #define SVC_MSQ_TEST_MSG    "Test message......"
                *       SVC prints out test message.  Implemented.
                *    #define SVC_MSQ_STOP_MGR    "STOP_SVC_MANAGER"
                *       SVC stops itself -- all clients stopped.
                *       Partly implemented.  Does a kill instead of a
                *       stop.
                *    #define SVC_MSQ_STOP_ALL    "STOP_ALL_PROCESSES"
```

```
      *       SVC stops all processes cleanly, does not
      *       terminate itself.  Not yet implemented.
      *    #define SVC_MSQ_KILL_ALL     "KILL_ALL_PROCESSES"
      *       SVC kills all client processes, does not
      *       terminate itself.  Unclean exit -- implemented.
      *    #define SVC_MSQ_STOP_PRC     "STOP_PROCESS:%d"
      *       Stop a specified process.  Not implemented.
      *    #define SVC_MSQ_KILL_PRC     "KILL_PROCESS:%d"
      *       Kill a specified process.  Not implemented.
      *    #define SVC_MSQ_START_ALL    "START_ALL_PROCESSES"
      *       Starts all processes in the start list.
      *       Implemented.
    if terminate_all request received
        exit main process loop
    stop all TServ processes
        Stop all processes waiting on message queues
            *Will send an "SVC_CLIENT_STOP_PROCESS" to the
            *target process.
        Stop all processes checking shared memory
            *Will set a flag in the processes shared memory
            *area.
        exit when all processes have reported exit status SVC child exit handler
        check to see if the exiting child is the one expected
        if not report an error
        otherwise send a message to the main routine to
            process request Following is the structure controlling the startup parameters:

This has been updated typedef struct   svcProcLoad
    {
    int          (*svcStartCld)(SVCGLOBAL *psvcGlobal, svcProcLoad *psvcPLoad);
    int          (*svcStopxCld)(SVCGLOBAL *psvcGlobal);
    int          iClassIID;       // Class internal id (hi order byte).
    char *       pszPathName;     // Pointer to path name.
    char *       pszCmdLine;      // Pointer to command line (can be NULL).
    int          nProcCnt;        // How many should we start?
    int          iQueSize;        // Allocate this large a queue, pass to child.
    } SVCPROCLOAD;
```

Client Manager (CLM)

Requirements

- No Roguewave
- Commands are to be parsed according to client interface spec (see Parameter Matrix)
- Meet CERTS requirements and carry certification ID
- Provide means for isolating test of CLM as a single stand-alone component
- Helpful errors on invalid requests and verification errors
- Responding to client with req_id implies entry exists in database (successfully deposited to SQL and queue...)
- Support old QUE VREQ for easy removal later while incorporating new interfaces
- Use registry variable for defining whether to drop entry to message queue after insertion to DB
- Enforce a max for MAXRETURN from client
- Syntactically validate parameters
- Make sure START_DT before END_DT

- Provide unique error codes per parameter error
-

Registry Variables

Old/Existing:
```
/CLM/CLMHOST,ITEM,ASCII,166.34.94.155
/CLM/CLMHOST_BACK,ITEM,ASCII,166.34.94.154
/CLM/CLMPORT,ITEM,ASCII,11012
/CLM/CSISLOGLEVEL,ITEM,ASCII,0
/CLM/DB/LOGLEVEL,ITEM,ASCII,0
/CLM/LOGLEVEL,ITEM,ASCII,0
/CLM/RESPONSE/LOGLEVEL,ITEM,ASCII,1
/CLM/TIMEOUT,ITEM,ASCII,43200
```

Design

Design is contained in Client Interface Specification chapter 2.

Logger (LOG)

Requirements

- No Roguewave
- Provide means for isolating test of LOG as a single stand-alone component
- Support writing a message to any file (both are parameters); open a log file only at first message, close the log file as an optional argument in the queue entry, as well as process termination
- Registry variables to all processes for which file to write to... allows intermingling to same file, writing to distinct files, etc.
-

Registry Variables

Old/Existing:
```
/LOG/LOG_DIR,ITEM,ASCII,/tserv/log
/LOG/LOG_FILE_NAME,ITEM,ASCII,teams.log
```

Design

```
Logger main loop
    Get message off queue
    Check for termination message
    If yes
        perform cleanup and exit
    Check in internal file list to see if the target file is open.
    If not
        Attempt to open file access semaphore.
        If open fails
            Create semaphore with lock
            Create/open file for output
            Free file access semaphore
        If succeeds
            Open file for output
        Store file and semaphore information in file list.
    Lock file access semaphore
    Check file size
    If larger than maximum allowed size
        Make date-time stamped copy
        Shrink file to 0 bytes
    Write message to output file as follows:
```

```
        LogFileName|Time|pid|SourceFilename|LineNumber|ErrorLevel|ErrorCode|MessageBody
        Free file access semaphore
        Loop to top New logger design:

Due to the change in design to use one log file (TEAMS.LOG), rather than many individual
log files, the logger has been redesigned to eliminate bottlenecks.  The new design
improves performance in three ways:

1 - Each individual logger writes to a single file -- this allows the
    removal of all code needed to determine the target file.

2 - Each logger writes to a separate file -- this allows the logger to
    write to the file without testing or waiting on a semaphore.  A
    second advantage is that with multiple actuators files can be writeen
    concurrently.

3 - Finally, the new design no longer requires a copy be performed to
    back up the file when the size limit is reached.  This can now
    be performed with a close, rename, open sequence which is much faster.

Get instance number from command line parameter
Using instance number build a file name of teamsx.log
   where x is the instance number.
Open teamsx.log while queue message from queue is not exit request
   test file size against file size limit
   if the file size is larger than the limit
      close file
      rename file to: teamsx.log.yymmddhhmmss
      open new teamsx.log file
   write log message to teamsx.log file
repeat close file
exit
```

IMPORT

Requirements

- Import testcases, templates, problem codes, filters from TAMS until TDMA full use
- Preserve leading and embedded nulls
- Populate timepoint information
-

Scheduling (see MS Project Plan)

Incremental Step Working List

- Complete new CLM interfaces (status = 6 on insertion), keep old with easy removal; 6/24/98
- Incorporate new field type for BDR MISC2
- SER handling
- CERTS info...
- Expandable wildcards
- NMOC 98.2 support

- Multiple CSIS design ( per clm)???
- COL problem on populating LAST_UPDATE when switches change time... trigger...
- Select from distinct billing
- Binary srch sorted ptr list to field names in parser (done this week)
- SHM lower priority; how low given most are read-only anyway...
- Remove RW dbtools from COL ..
- Could have RECORD_TYPE_ID column in BILLING_RECS_RECEIVED tables to speed up some queries... see VER
- MT to reuse code for compare_rec2template, handle_expected_values, adjust_any_times, problem code appin
- COL/LDR design to be complete for next team meeting; will have hands around time issues, no FMS, binary srch, 4 byte RECORD_TYPE_ID in leader...
- CLM complete eow
- Hat symbol is don't care char populated by CLM for RECID list don't care positions
- Define views for GETREC calls (live and archived...)
- Not loading into billing table by times... probably ought to modify the union per 24 hr period...
- Need shared memory for (minimally) registry, failures (repopulate), parse trules:FIELDS,RECORD_TYPE_FIELD_NAME,RECORD_TYPES
- Enforce MAXRETURN of max=10
- AM 2 interfaces by end of next week
-

Task System Tasks

See Automation:TServ in Task System

Issues

- I/O controller upgrades
- CERTS backend requirements (archiving); storage CERTS data storage req = 7 mo., non-CERTS = 1 mo.
- Need date to commit for changing VER output to new format...
-

Future Enhancements

- TruCluster Failover
- ADF, MOSR, AMA, and Post Save Toll Ticket support
- NIC 98.2 support
- NIC, SAVE, and TServ service alarm/monitor tools
- Multi-threading on DEC UNIX 4.0d (once we replace Roguewave with STL and static SQL!)
- CLM security interface, session history
- JG's TCID change
- Applications provide time offset around search window
- WIN/NT tools for provisioning, configuring, etc
- Statistical collection/reporting
- Separate tables for separate COL threads with rollover by sets of tables; coordinate in VER selecting only from appropriate table(s)
- Each process registers vital sign status to shared memory at appropriate times (facilitates service monitor tool(s) and statistics)
- Asynchronous status changes to clients
- Tag billing from a NIC; allow client to specify which NIC to search...
- See MS Project Plan...
-

Build

TServ Directories

TServ Source Files

Tserv Make

Project Environment

Production
> TEAMS4 and TEAMS5 (DEC Alpha 8200s)
> - TEAMS4 used for development while systems moved from CS
> - TEAMS5 used for test until TServ stability/performance Test
> TEAMS1 and TEAMS2 (DEC Alpha 4100s)
> - Systems used for TEAMS production until production on TEAMS4/TEAMS5

Development
> TEAMS6 and TEAMS7 (DEC Alpha 4100s)
> - Formerly called Foghorn and Leghorn in CS
> - Configured in Richardson like TEAMS4/TEAMS5
> - Moved 5/15/98

Coding Standards

File Names
TServ source files shall use the UNIX convention of .H, .HXX, and .CXX extensions.

Headers
The following headers are to be cloned from a single source and used as a template. Source files that contain classes or functions should further contain the mini-header shown below. Code will be reviewed in code walk-throughs.

.H,.HXX Files
```
//*********************************************************************************
//*********************************************************************************
//
//                        MCI CONFIDENTIAL
//           PROPRIETARY INFORMATION OF MCI TELECOMMUNICATIONS
//                         Copyright (c) 1998
//                         All Rights Reserved
//
//
// FILE:           FileName.h
//
// VERSION:        V1.0
//
// AUTHOR:         Joe A. Developer
//
// CREATION DATE:  May 4, 1998
//
// DESCRIPTION:    This file ...
//
// MODIFICATION HISTORY:
//
// Ref      Date         Name                      Description
// ---      -----------  ------------------------  ----------------------------------
//
//
//*********************************************************************************
//*********************************************************************************
// ifndef FILENAME_H
   .
   .
   .
#endif
```

.CXX Files
```
//*******************************************************************************
//*******************************************************************************
//
//                        MCI CONFIDENTIAL
//             PROPRIETARY INFORMATION OF MCI TELECOMMUNICATIONS
//                          Copyright (c) 1998
//                          All Rights Reserved
//
//
// FILE:           FileName.cxx
//
// VERSION:        V1.0
//
// AUTHOR:         Joe A. Developer
//
// CREATION DATE:  May 4, 1998
//
// DESCRIPTION:    This file ...
//
// MODIFICATION HISTORY:
//
// Ref      Date          Name                       Description
// ---      -----------   ------------------------   ----------------------------
//
//
//*******************************************************************************
//*******************************************************************************
// include "stdafx.h"
```
.
.
.

Mini-header for member functions/classes in source file
```
//*******************************************************************************
//
// FUNCTION/CLASS: Name
//
// AUTHOR:         Joe A. Developer
//
// CREATION DATE:  May 4, 1998
//
// DESCRIPTION:    This function/class...
//
// INPUT(S):       Arguments are ...
//
// OUTPUT(S):      Parameters are ...
//
// RETURN CODE:    Return code is ...
//
//*******************************************************************************
//
```
.
.
.

Coding Style
- No hard-coding
- #ifndef…#endif around includes
- Meaningful variable names
- Well commented data used (public/protected/private, static, global, local, any kind)
-

Process

Requirements
- Accepted (by team) design before coding
- Prototyping ok before design, provided prototype not throw-away code
- Code walk-throughs
- Thoroughly test pieces before building complexities on top of them (thoroughly test one logical step at a time)
- Provide component test means for isolated process testing
- Unit Test, followed by Component Test, followed by System Test, followed by System Integration Test
-

Test
- System test with single VER, single CLM, single COL before testing with multiples thereof
- Test to assure errors flagged
- The working set of "10 test cases"…
- Suites of small sets of working testcases for stress, incrementally increasing in suite size
- GBMs
-

Addendum

For convenience, please see the larger one page diagrams for all figures contained herein (NEW*.PPT).

TSERV CLIENT INTERFACE

Overview

TServ provides an ascii text string interface for clients. UNIX system configuration of /etc/inetd.conf and /etc/services enables automatic spawning of a TServ CLM process when a client telnets to the well known port of a CLM. When a tservClm process is launched, it reads the /tserv/bin/reqformat.conf file which lists the supported commands and corresponding parameters.

UNIX configuration for CLM spawn

E.G.

/etc/services

TservClm 12333/tcp # startup tserv clm

/etc/inetd.conf

TservClm stream tcp nowait tserv /tserv/bin/tservClm /tserv/bin/tservClm tmprod2 tserv tservrch /tserv/log

Protocol by example

A client submits a string request that contains a command prefix with individual parameters, for example:

"VREQTC TCSECTION=800654 TCNUMBER=33 START_DT=19980512125603
END_DT=19980512125603 OSW*_NAME=RES1 TSW_NAME=RES1 RES_NAME=RES1
NRETRY=0 MAXRETURN=5 TMPOVR=@=5;[=3;]=1;{=3;}=1 PRI=HIGH"

The parameters need not be in a particular order, however the first portion of the request string must be the requested command. The <CR><LF> indicates the end of the request to Tserv. Tserv responds with a string that may consist of comments, errors and results. Individual logical lines in the response are delimited by <CR><LF>. An NVT (Network Virtual Terminal) protocol indicates to the client how to parse the response. The ASCII string interface between the client and TServ facilitates debug. Comments begin with the '#' character. Comment lines should be ignored when parsing for returned parameters. Comments may be present when TServ debug is activated. Errors begin with the '-' character, followed by an error code and description. A full list of error codes can be found in the file tserv_globals.hxx. Results begin with the '+' character, followed by one or more result codes and descriptions. The MTV protocol provides a client with:

- <CR><LF> delimited response whenever a '-' prefix begins the response,
- <CR><LF> delimited comment whenever a '#' prefix begins the comment,
- +XXXX prefixed tree structure to facilitate parsing whenever a '+' prefix begins the response. Specific XXXX enumerations indicate whether there is additional data to follow,
- +XXXXX prefixed atomic response.

Example error response

"-10000 error: invalid tc section/number section:4 number:4"

Example atomic result response

"+10014 queued req: 20039"

Example compound result response

"+1000 Result:requestID=17476;templatesFound=1;overallResult=PASS;
+1001 Template:tempID=2497;numRecords=1;result=PASSWEXCEPTION;

+1005 Brec:recID=33718898;recType=CDR;numCompareResults=2;result=PASSWEXCEPTION;
+1003 CompareResult:fieldName=PD;expectedValue=2;operator===;reportedValue=5;failDescrip=Passed with Problem Code;problemCode=237:With Global Prefix Digits on the DMS, the switch in some cases does not match MCI's billing Spec.;
+1003 CompareResult:fieldName=CN;expectedValue=9595;operator===;reportedValue=0595;failDescrip=Passed with Problem Code;problemCode=276:When MCI05 is loaded with 3 digit CIC (as opposed to 4 dig CIC), the leading bit in the CN is now 0, not TBCD NULL;
+1010 Result:requestID=17476;sessionID=16876;"

Client Interfaces

Verification Requests

"<VREQTCID | VREQTC | VREQTEMP> <required_params> <optional_params>"

Description

Perform billing verification by specified template(s) (implicit or explicit), billing record(s) time window, and call device(s).

Required Parameters For Specific Commands use form PARAM=VALUE with one or more blanks surrounding it. The PARAMs are described below with example VALUEs.

TCID - testcase id in database (e.g. TCID=45654); will override presence of TCSECTION and TCNUMBER, as well as TEMPLATE, if they're present. This parameter is required for the VREQTCID command.

TCSECTION - testcase section; matches testcase_section in the testcase table (e.g. TCSECTION=800654). TCNUMBER must be present when this specified.

TCNUMBER - testcase number; matches testcase_number in the testcase table (e.g. TCNUMBER=23). TCSECTION must be present when this specified. TCSECTION and TCNUMBER are required for the VREQTC command.

TEMPLATE - template id list for performing verifications (e.g. TEMPLATE=56086). Maximum permitted is 5. The overall result is PASS if all templates verify with PASS. The overall result is FAIL if any template results in a FAIL. This parameter is required for the VREQTEMP command.

Required Parameters For All Verification Requests

Each parameter of required_params and optional_params is in the form PARAM=VALUE with one or more blanks surrounding it. The PARAMs are described below with example VALUEs.

START_DT - search start date/time in teams time format (e.g. START_DT=yyyymmddhhmmss).
END_DT - search end date/time in teams time format (e.g. END_DT=yyyymmddhhmmss).
OSW_NAME - originating switch name of call (e.g. OSW_NAME=RES1).
TSW_NAME - terminating switch name of call (e.g. TSW_NAME=RES1).

Optional Parameters For Verification Requests

VRQST - indicates to return verification request information as part of the response (e.g. VRQST=ALL).

Valid values are ALL or TC. ALL indicates to return the entire verification request queue fields. TC indicates to return only the testcase section and number. Default is to return no request parameters. VRQST=TC is ignored for "VREQTEMP=...".

ALL
indicates to return a line of all request parameters as interpreted (defaults too) from the client. Returns a +1009 line immediately preceding the +1010 line, for example:

"+1009 VerRequest:verAll=TCSECTION=800654 TCNUMBER=33 START_DT=19980512125603 END_DT=19980512125603 OSW_NAME=RES1 TSW_NAME=RES1 ... and all other parameter settings as interpreted by TServ... shows what defaults are;".

TC
indicates to return a line of the testcase section and number for the client request.
Returns a +1009 line immediately preceding the +1010 line, for example:

"+1009 VerRequest:verTC=TCSECTION=800654 TCNUMBER=33;".

| | |
|---|---|
| RES_NAME | - resource name for call ; for ISN calls only (e.g. RES_NAME=RES1). Default is no resource. |
| NRETRY | - number of times verification will be retried if a billing record is not loaded yet (e.g. NRETRY=10). NRETRY=-1 indicates use up 12 hours of retries, N indicates the number of retries. See priority discussion below for registry variables associated with retries. Default is -1. |
| MAXRETURN | - maximum # of billing records tolerated on any particular template SCL. (e.g. MAXRETURN=1). Default is 5. |
| TMPOVR | - template override variables (e.g. TMPOVR=@=5;[=3;]=1;{=3;}=1). Default is no overrides. The override variables are designed to be a simple string substitution for the template expected values. Prior to a compare of a billing field with the corresponding template expected value field, the expected values field will be scanned for strings which match the left hand side (e.g. @) of assignments in the override string. Any matches will be replaced with the right hand side of the override variable (e.g. 5) up through, and not including, the first ';' character.

Format
<old string>=<new string>;<old string>=<new string>;...

Example
@=5;[=3;]=1;{=3;}=1;%=5;##=3;@@=hello;TP3=3,1;

Wildcards
The wildcard character is the % character. It will allow any value in that template expected value position. For example: 5335 is equal to 53%5. 5335 is not equal to 5%5. The % character can be overridden in the override variable with a replacement string. |
| PRI | - priority of request (e.g. PRI=HIGH). Uppercase is required for valid values of LOW, BATCH, MEDIUM, and HIGH. Default is UNKNOWN (the lowest priority). See priority discussion below. |
| RECID | - billing record id list for comparing to templates associated with the request. The billing record order in the list corresponds to templates encountered for verification. If there are less billing records specified than templates encountered for the request, the last billing record in the list is used for the remaining templates. If there are more billing records specified than templates encountered for the request, the remaining billing records specified are unused (e.g. RECID=67895432). More than one billing record id (an ordered list), for example corresponding to TESTCASE_TEMPLATE verification order for a testcase, can be specified for forcing a verify on a billing record for each template resulting from the testcase (e.g. RECID=67895432,76589444,44445555). Default is to find the billing. Maximum permitted is 5. Very useful for verifying specific rec(s) per TEMPLATE. Number of record ids in this param overrides the MAXRETURN parameter. A don't care position Is requested with a null position (e.g. ,,,,67895312). |
| APPSCL | - selection criteria language used to append to all SCL in all templates for a request |

(e.g. APPSCL=((OTG==953) &&D==3062031975) && DEVICE_TIME_A>=
19980422101948&&DEVICE_TIME_B<=19980422102435). Default is use SCL of template(s).
APPSCL and REPLSCL are mutually exclusive.

REPLSCL - selection criteria language used to replace all SCL in all templates for a request
(e.g. REPLSCL=((OTG==953) &&D==3062031975) && DEVICE_TIME_A>=
19980422101948&&DEVICE_TIME_B<=19980422102435). Default is use SCL of template(s).
APPSCL and REPLSCL are mutually exclusive.

SCL Format
<keyword> <operator> <matching criteria>

SCL Keywords
Any valid field for a given record type will be a valid keyword. These are defined in the database
definition of the record type. This implies that a client may search on any field for a record type. To
eliminate database wide scans, each portion of the SCL which is 'anded' must contain a keyword.

Valid Operators
- `==` - equality
- `>` - greater than
- `<` - less than
- `<=` - less than or equal
- `>=` - greater than or equal
- `&&` - and
- `||` - inclusive or
- `\` - take following character as a literal to handle override of originating switch id. {0} would be \{0\}. Overrides can be applied to the SCL prior to searching (e.g. {,}).
- `(,)` - parenthesis are used for expression grouping.

E.G. OTG=={501,203} && TTG==403 && DEVICE_TIME_B>19970722010101 &&
DEVICE_TIME_B < 19970722011501

Note 1 - If the right hand side of an expression begins with the '_' character, then the remainder of
the right operand is a field name. In this case the right operand is replaced with field value of the
field in the template. For example, the following scl would be modified before it is used for
searching...D=_D to the actual value of D in the corresponding template's expected value field.

| | |
|---|---|
| OSW_LD | - originating switch load used for locating template(s) (e.g. OSW_LD=99). Default is to use the switch load by the OSW_NAME device. |
| TSW_LD | - terminating switch load used for locating template(s) (e.g. TSW_LD=99). Default is to use the switch load by the TSW_NAME device. |
| RES_LD | - resource switch load used for locating template(s) (e.g. RES_LD=99). Default is to use the switch load by the RES_NAME device. Ignored is RES_NAME not present. |
| CID | - list of one or more CERTS ids (CID=10,78,45). Indicates to Tserv to apply the verification to the certifications (CID list). Default is no CERTS ids. |
| RESPONSE | - type of response desired for the request (e.g. RESPONSE=FIELDS). Valid values are STD (standard), FIELDS, or RAW. Default is STD. |

STD
indicates to return as described in section 2.4.1.1.5.3.

FIELDS
indicates to return STD plus individual lines for every field actually compared to expected
value fields for the particular template(s). FIELDS returns a +1006 intermingled among the +1002
and +1003 lines.

"+1006 CompareResult:fieldName=%s;expectedValue=%s;operator=%s;reportedValue=%s;".

RAW
indicates to return STD+FIELDS plus the raw billing rec(s) hex dump of the raw billing record compared to the template. RAW returns a +1007 line after all field reporting (+1002, +1003, and +1006 lines) that contains the hexadecimal dump of the billing record for the particular template.

"+1007 BillRec:rawRec=%s;".

e.g.
+1007 BillRec:rawRec=03045567982349...;

such that each nibble is a hexadecimal character from leftmost byte of record to rightmost byte of record, left to right, respectively.

Responses

*Output*

For each verification, the following string is output:

"+1000 Result:requestID=%d;templatesFound=%d;overallResult=%s;\n",

For each template within each verification, the following is output:

"+1001 Template:tempID=%d;numRecords=%d;result=%s;\n",

For each billing record within each template, the following is output:

"+1005 BRec:recID=%d;recType=%s;numCompareResults=%d;result=%s;\n",

The strings in the results/overallResults are defined in the TServ database Failures table.

For each field compare result of a template comparison to a billing record, one of the following is output:

A. if a problem code is found for the mismatch:

"+1003 CompareResult:fieldName=%s;expectedValue=%s;
    operator=%s;reportedValue=%s;failDescrip=%s;problemCode=%s;\n", B. if no problem code is found for the mismatch:

"+1002 CompareResult:fieldName=%s;expectedValue=%s;
    operator=%s;reportedValue=%s;failDescrip=%s;\n", C. if a RESPONSE parameter specifies FIELDS or RAW, then A. and B. shall appear among all other fields compared which will be output with:

"+1006 CompareResult:fieldName=%s;expectedValue=%s;
    operator=%s;reportedValue=%s;\n", For requests containing a RESPONSE=RAW specification, the following is output (after fields lines) for each billing record:

"+1007 BillRec:rawRec=%s;\n",

For requests containing a valid VRQST parameter, one of the following is output:

A. ALL

"+1009 VerRequest:verAll=%s;\n"

B. TC

"+1009 VerRequest:verTC=%s;\n"

Verification responses are concluded with the following:

"+1010 Result:requestID=%d;SessionID=%d;\n\n"

*Verify Request Example(s)*

"VREQTCID TCID=44322189 START_DT=19980512125603 END_DT=19980512125603 OSW_NAME=RES1
 TSW_NAME=RES1 RES_NAME=RES1 NRETRY=0 MAXRETURN=5 TMPOVR=@=5;[=3;]=1;{=3;}=1
 PRI=HIGH RESPONSE=RAW"

"VREQTC TCSECTION=800654 TCNUMBER=33 CID=45,32 START_DT=19980512125603
 END_DT=19980512125603 OSW_NAME=RES1 TSW_NAME=RES1 RES_NAME=RES1
 NRETRY=0 MAXRETURN=5 TMPOVR=@=5;[=3;]=1;{=3;}=1 PRI=HIGH"

"VREQTEMP TEMPLATE=56708,56709,34562 START_DT=19980512125603 END_DT=19980512125603
 OSW_NAME=RES1 TSW_NAME=RES1 RES_NAME=RES1
 NRETRY=0 MAXRETURN=5 TMPOVR=@=5;[=3;]=1;{=3;}=1 PRI=HIGH"

*Example Scenario*

Prior to the actual verification results, the CLM provides a request ID in response to the request, for tracking purposes:

E.G. "+10014 queued req: 20039"

A verification request deposited into the REQUEST_QUEUE table contains a status according to TServ processing (STATUS column). There are two interim status types (1 = initial/pending, 2 = requeued). Others are a final result status for the request. The status number of a completed request corresponds to the overallResult string provided on the response in the +1000 line.

| STATUS | | | |
|---|---|---|---|
| 1 | = | INITIAL/PENDING | - CLM inserted into REQUEST_QUEUE, VER not complete |
| 2 | = | REQUEUED | - VER will retry in future |
| 1100 | = | "PASS" | - billing record was found and matched the template |
| 1090 | = | "PASSWEXCEPTION" | - billing record found, did not match, but problem code(s) existed |
| 1080 | = | "FAIL" | - billing rec found, did not match template; no problem code(s) |
| 1060 | = | "RECNOTREADY" | - billing rec not loaded from the device into database yet |
| 1050 | = | "TOOMANYRECORDS" | - records exceeded MAXRETURN parameter |
| 1025 | = | "TEMPLNOTFOUND" | - template was not found |
| 1024 | = | "INVALIDSCL" | - invalid template scl |
| 1023 | = | "SQLERROR" | - internal sql error |
| 1022 | = | "TEMPLATERR " | - internal template error |
| 1021 | = | "SYSERR" | - generic system error (see TEAMS.LOG) |
| 500 | = | "CMDNOTSUPPORTED" | - internal error for cmd not supported |
| 400 | = | "INVALIDCMD" | - internal error for invalid TServ command |

+1000 output line

The first portion of a verification result is "+1000" followed by the request verification id, the number of templates corresponding to the request (i.e. test case), and the overall result:

"+1000 Result:requestID=20039;templatesFound=1;overallResult=PASS

The overallResult field in the +1000 string indicates the status string as described above. The numeric STATUS column for a completed request always corresponds to what was passed back in the response overallResult. The overallResult is the worst result of all verification templates. The templatesFound value contains the number of all templates found for the request, not the number of template (+1001) lines that follow.

+1001 output line

The template result(s) follow the overall result (+1000) in the "+1001" portion(s) and the appropriate result status is also indicated for the particular template. For example:

+1001 Template:tempID=5278;numRecords=1;result=PASS;

tempID is the internal TServ template identifier. numRecords indicates how many billing record +1005 lines follow for this template that verification was performed. The result is the best result of all billing records tried. Test cases involving multiple templates, such as reorigination, network tests, or calls routed to the ISN, will have multiple templates in the verification result, so there may be multiple +1001 lines, each with subordinate +1005 line(s). Candidate result values for +1001 lines include:

```
PASS
FAIL
PASSWEXCEPTION
RECNOTFOUND    - billing rec should have been in database and was not found (maps to overallResult = FAIL)
INVALIDSCL     - overallResult will correspond
SQLERROR       - overallResult will correspond
TOOMANYRECORDS - overallResult will correspond; billing recs up to max returned despite the result
SYSERR         - generic system error (see TEAMS.LOG); overallResult will correspond
```

+1005 output line

The billling record result(s) follow the template result (+1001) in the "+1005" portion(s) and the appropriate result status is also indicated for the particular billing record. For example:

+1005 Brec:recID=345654378;recType=CDR;numCompareResults=2;result=PASSWEXCEPTION recID is the internal TServ billing record identifier. recType is the type of call record. The result is the result of comparing template expected values to the corresponding call record fields. numCompareResults is the sum (number) of +1002 and +1003 lines that follow. The result field for a +1005 line can only contain a status of "PASS", "PASSWEXCEPTION", or "FAIL".

+1002 / +1003 output line(s)

Field comparisons, which result in a mismatch, fail, or pass with a problem code. If any of the comparisons fail, the result for that billing record is FAIL. The billing record +1005 result is the worst case status of a field comparison for all fields compared in the billing record. The numCompareResults field indicates how many mismatches occurred. Detailed descriptions of these mismatches are preceded by the following codes:

+1002 indicates a field mismatch resulting in Failure. +1003 indicates a mismatch which is permitted to pass with a problem code; for example:

+1002 CompareResult:fieldName=CLI;expectedValue=---3080886;operator===;reportedValue=---3080886; failDescrip=Fields did not match;

or

+1003 CompareResult:fieldName=PD;expectedValue=3;operator===;reportedValue=4;
failDescrip=Passed with Problem Code;problemCode=237:With Global Prefix Digits
on the DMS, the switch in some cases does not match MCI's billing Spec.;

Note that the actual problem code id is prefix to its description....

+1010 output line

The Verification Result is concluded with a +1010 string, for example:

+1010 Result:requestID=20039;sessionID=5798;

Optional output line(s)

+1006 and +1007 lines may appear subordinate to +1005 lines as described above. A +1009 line may appear preceding the final +1010 line as described above.

Mapping parameters to REQUEST_QUEUE

Currently, the REQUEST_QUEUE table is named VERIFICATION_REQUEST_QUEUE. While the mapping from parameters is made to the existing columns and some newly defined columns, the long term goal is to rename the table and some of the columns. Parameter mappings are:

*All Verification Requests (\* indicates change to VERIFICATION_REQUEST_QUEUE)*

| Current Table Column Name | Populated By |
|---|---|
| status | maintained by TServ |
| *req_id (was vreq_id) | CLM generated request handle |
| execution_start_dt | required parameter START_DT |
| execution_end_dt | required parameter END_DT |
| orig_switch_id | id corresponding to OSW_NAME |
| term_switch_id | id corresponding to TSW_NAME |
| *vrqst (new CHAR(1)) | VRQST = oneof[A,T] |
| $ num_retries | maintained by TSERV |
| *maxreturn (was maxbrftoreturn) | MAXRETURN |
| override_vars | TMPOVR |
| request_priority | PRI |
| *recid (new VARCHAR(N)) | RECID (^ in don't care positions...) |
| selection_criteria | APPSCL xor REPLSCL (+SCL =app, -SCL = repl) |
| requestor_id | requestor's id (future use) |
| request_recvd_dt | d/t request received |
| request_compl_dt | d/t request completed |
| session_id | CLM session id |
| job_id (to be removed) | *** COLUMN TO BE EXPIRED *** |
| search_start_dt | maintained by TServ |
| $ max_retries | NRETRY |
| $ *resp_type (new CHAR(1)) | RESPONSE = oneof[S,F,R] |

\* new CERTIFICATION_REQUESTS table (1 row per CID specification)
| vreq_id | req_id from above |
| certs_id | CID list entry |

*VREQ TCID=...*

| *req_type (was brfonly) | request type = VREQTCID |
|---|---|
| testcase_section | not used |
| testcase_number | TCID |
| orig_switch_load_id | OSW_LD |

| | |
|---|---|
| term_switch_load_id | TSW_LD |
| resource_id | id corresponding to RES_NAME |
| resource_load_id | RES_LD |

*VREQ TCSECTION=... TCNUMBER=...*

| | |
|---|---|
| *req_type (was brfonly) | request type = VREQTC |
| testcase_section | TCSECTION |
| testcase_number | TCNUMBER |
| orig_switch_load_id | OSW_LD |
| term_switch_load_id | TSW_LD |
| resource_id | id corresponding to RES_NAME |
| resource_load_id | RES_LD |

*VREQ TEMPLATE=...*

| | |
|---|---|
| *req_type (was brfonly) | request type = VREQTEMP |
| testcase_section | not used |
| testcase_number | TEMPLATE 1 of 5 |
| orig_switch_load_id | TEMPLATE 2 of 5 |
| term_switch_load_id | TEMPLATE 3 of 5 |
| resource_id | TEMPLATE 4 of 5 |
| resource_load_id | TEMPLATE 5 of 5 (= -1 if position not used) |

Billing Record Search Requests

"<GETRECVID | GETRECTEMP | GETRECID | GETRECSCL> <optional_params>"

Description

Get (retrieve) one or more billing records according to parameters.

Required Parameters For Specific Commands use form PARAM=VALUE with one or more blanks surrounding it. The PARAMs are described below with example VALUEs.

VID - verification request id to return applicable billing recs for (e.g. VID=56718). Presence of this parameter causes TServ to ignore all parameters except MAXRETURN, NRETRY, FIELDS, PRI, VRQST, and RESPONSE. The Verification request entry information as well as appropriate leg enumerations are returned with the requested information. This parameter is required for the GETRECVID command.

TEMPLATE - template id list for finding billing records (e.g. TEMPLATE=56086). Maximum permitted is 5. This parameter parameter is required for the GETRECTEMP command.

RECID - billing record id to return (e.g. RECID=67895432). More than one billing record id (an ordered list) can be specified (e.g. RECID=67895432,76589444,44445555). Maximum permitted is 5. Presence of RECID causes TServ to ignore all params except MAXRETURN, NRETRY, FIELDS, PRI, and RESPONSE. This parameter parameter is required for the GETRECID command.

SCL - selection criteria language used to find billing record(s)
(e.g. SCL=((OTG==953) &&D==3062031975) && DEVICE_TIME_A>= 19980422101948&&DEVICE_TIME_B<=19980422102435). APPSCL and REPLSCL parameters are ignored when this SCL command variety is specified. This parameter parameter is required for the GETRECSCL command.

Optional Parameters For Get Record Requests

Each parameter of optional_params is in the form PARAM=VALUE with one or more blanks surrounding it. The PARAMs are described below with example VALUEs.

NRETRY - number of times search will be retried if a billing record is not loaded yet (e.g. NRETRY=10). NRETRY=-1 indicates use up 12 hours of retries, N indicates the number of retries. See priority discussion below for registry variables associated with retries. Default is -1.

MAXRETURN - maximum number of billing records of information willing to accept (e.g. MAXRETURN=1). Default is 5.

VRQST - indicates to return verification request information as part of the response (e.g. VRQST=ALL). Valid values are ALL or TC. ALL indicates to return the entire verification request queue fields. TC indicates to return only the testcase section and number. Default is to return no request parameters. VRQST is only valid for the VID command variety.

ALL
indicates to return a line of all request parameters as interpreted (defaults too) from the client. Returns a +1009 line immediately preceding the +1010 line, for example:

"+1009 VerRequest:verAll=TCSECTION=800654 TCNUMBER=33 START_DT=19980512125603 END_DT=19980512125603 OSW_NAME=RES1 TSW_NAME=RES1 ... and all other parameter settings as interpreted by TServ... shows what defaults are;".

TC
indicates to return a line of the testcase section and number for the client request.
Returns a +1009 line immediately preceding the +1010 line, for example:

"+1009 VerRequest:verTC=TCSECTION=800654 TCNUMBER=33;".

START_DT - search start date/time in teams time format (e.g. START_DT=yyyymmddhhmmss).
END_DT - search end date/time in teams time format (e.g. END_DT=yyyymmddhhmmss).
DEV_NAME - device_name that generated the call record (e.g. DEV_NAME=RES1). START_DT and END_DT are absolute literal device times if this param is absent.
APPSCL - selection criteria language used to append to all SCL in all templates for a "GETREC TEMPLATE=... request (e.g. APPSCL=((OTG==953) &&D==3062031975) && DEVICE_TIME_A>=19980422101948&&DEVICE_TIME_B<=19980422102435). Default is use SCL of template(s). APPSCL and REPLSCL are mutually exclusive.
REPLSCL - selection criteria language used to replace all SCL in all templates for a "GETREC TEMPLATE=... request (e.g. REPLSCL=((OTG==953) &&D==3062031975) && DEVICE_TIME_A>= 19980422101948&&DEVICE_TIME_B<=19980422102435). Default is use SCL of template(s). APPSCL and REPLSCL are mutually exclusive.
PRI - priority of request (e.g. PRI=HIGH). Uppercase is required for valid values of LOW, BATCH, MEDIUM, and HIGH. Default is UNKNOWN (the lowest priority). See priority discussion below.
FIELDS - list of fields to return values for (FIELDS=CDID,CN). Default is to return all fields of the record(s). Field names correspond to fields as defined in the TServ FIELDS table. Valid values are list of specific list of sought fields, or all (lowercase) returns all the billing record fields.
RESPONSE - type of response desired for the request (e.g. RESPONSE=RAW). Valid values are FIELDS (i.e. decoded), HEX or RAW. Default is FIELDS.
TMPOVR - template override variables (e.g. TMPOVR=@=5;[=3;]=1;{=3;}=1). Default is no overrides.

The override variables are designed to be a simple string substitution for the template expected values. Prior to a compare of a billing field with the corresponding template expected value field, the expected values field will be scanned for strings which match the left hand side (e.g. @) of assignments in the override string. Any matches will be replaced with the right hand side of the override variable (e.g. 5) up through, and not including, the first ';' character. This parameter apples to GETRECTEMP requests.

Format
<old string>=<new string>;<old string>=<new string>;...

Example
@=5;[=3;]=1;{=3;}=1;%=5;##=3;@@=hello;TP3=3,1;

Wildcards
The wildcard character is the % character. It will allow any value in that template expected value position. For example: 5335 is equal to 53%5. 5335 is not equal to 5%5. The % character can be overridden in the override variable with a replacement string.

Responses

*Output*
For each billing record search request the following string is output:

"+2000 Result:requestID=%d;numRecords=%d;overallResult=%s;\n",

If the getrec call is a getrectemp call, then each template results output will be preceded with:

"+2004 TempID=%d;\n",

For each billing record found, the following is output:

"+2001 BillRec:recID=%d;recType=%s;\n",

For all fields requested, one of the following is output:

A. if RESPONSE = FIELDS (i.e. decoded):

"+2003 Field:name=%s;reportedValue=%s;\n",

B. if RESPONSE = HEX (hexadecimal):

"+2002 Field:name=%s;reportedValue=%iX\n";

If RESPONSE = RAW, then all fields are additionally output as a single hexadecimal dump:

"+2007 BillRec:rawRec=%s;\n"

For requests containing a valid VRQST parameter, the following is output:

C. ALL

"+2009 VerRequest:verAll=%s;\n"

D. REQD

"+2009 VerRequest:verRequired=%s;\n"

Billing Record Search responses are concluded with the following:

"+2010 Result:requestID=%d;sessionID=%d;\n\n"

*Billing Search Request Example(s)*

"GETREQVID VID=16543 VRQST=ALL START_DT=19980512125603 END_DT=19980512125903
 DEV_NAME=RES1S1 NRETRY=-1 MAXRETURN=5 PRI=HIGH RESPONSE=HEX"

"GETREQID RECID=876904532,655744483 NRETRY=0 MAXRETURN=2 PRI=HIGH"

"GETREQSCL SCL==((OTG==953) &&D==3062031975) START_DT=19980512125603
 END_DT=19980512125903 DEV_NAME=RES1 MAXRETURN=50 PRI=LOW"

*Example Scenario*

Prior to the actual search results, the CLM provides a request ID in response to the request, for tracking purposes:

E.G. "+10014 queued req: 20039"

A search request deposited into the REQUEST_QUEUE table contains a status according to TServ processing (STATUS column). There are two interim status types (1 = initial/pending, 2 = requeued). Others are a final result status for the request. The status number of a completed request corresponds to the overallResult string provided on the response in the +2000 line.

STATUS
| | | | |
|---|---|---|---|
| 1 | = | INITIAL/PENDING | - CLM inserted into REQUEST_QUEUE, VER not complete |
| 2 | = | REQUEUED | - VER will retry in future |
| 1070 | = | "RECNOTFOUND" | - billing rec not found |
| 1060 | = | "RECNOTREADY" | - billing rec not loaded from the device into database yet |
| 1025 | = | "TEMPLNOTFOUND" | - template was not found |
| 1024 | = | "INVALIDSCL" | - invalid template scl |
| 1023 | = | "SQLERROR" | - internal sql error |
| 1021 | = | "SYSERR" | - generic system error (see TEAMS.LOG) |
| 500 | = | "CMDNOTSUPPORTED" | - internal error for cmd not supported |
| 400 | = | "INVALIDCMD" | - internal error for invalid TServ command |

Note that RECNOTREADY, CMDNOTSUPPORTED, and INVALIDCMD are returned to the client as +1000/+1010 output lines because the GETRECORD variety of the request is not identified.

+2000 output line

The first portion of a search result is "+2000" followed by the request id, the number of records found for the request, and the overall result:

"+2000 Result:requestID=20039;numRecords=2;overallResult=FOUND;

The overallResult field in the +2000 string indicates the status string as described above. The numeric STATUS column for a completed request always corresponds to what was passed back in the response overallResult. The numRecords value contains the number of call records returned for the request (i.e. # of +2001 lines that follow).

+2001 output line

The billing record(s) follow the overall result (+2000) in the "+2001" portion(s). For example:

+2001 BillRec:recID=52567878;recType=CDR;

recID is the internal TServ call record identifier. recType is the type of call record.

+2002 / +2003 output line(s)
Billing record lines are followed with field lines describing the billing record fields.

+2002 indicates a RESPONSE=FIELDS in the request. +1003 indicates a RESPONSE=HEX in the request; for example:

+2002 Field:name=OTG;reportedValue=1225;

+2003 Field:name=OTG;reportedValue=4C9;

All the fields for a billing record will be described by either +2002 lines xor +2003 lines. +2002 lines are the default.

+2010 output line
The Search Result is concluded with a +2010 string, for example:

+2010 Result:requestID=20039;sessionID=5798;

Optional output line(s)
+2007 lines may additionally appear subordinate to +2001 lines (last line for a +2001 block of lines) as described above (RESPONSE=RAW). A +2009 line may appear preceding the final +2010 line as described above.

Mapping parameters to REQUEST_QUEUE

Currently, the REQUEST_QUEUE table is named VERIFICATION_REQUEST_QUEUE. While the mapping from parameters is made to the existing columns and some newly defined columns, the long term goal is to rename the table and some of the columns. Parameter mappings are:

*All Search Requests*

| Current Table Column Name | Populated By |
| --- | --- |
| status | maintained by TServ |
| *req_id (was vreq_id) | CLM generated request handle |
| $ execution_start_dt | START_DT // CLM assures START_DT <= END_DT |
| $ execution_end_dt | END_DT // CLM assures START_DT <= END_DT |
| orig_switch_id | id corresponding to DEV_NAME |
| term_switch_id | not used |
| num_retries | NRETRY |
| *maxreturn (was maxbrftoreturn) | MAXRETURN |
| override_vars | FIELDS ("A" or "T" set by CLM; A => all, T => look in GETREC_FIELDS table) |
| request_priority | PRI |
| requestor_id | requestor's id (future use) |
| request_recvd_dt | d/t request received |
| request_compl_dt | d/t request completed |
| session_id | CLM session id |
| job_id (to be removed) | *** COLUMN TO BE EXPIRED *** |
| search_start_dt | maintained by TServ |
| max_retries | maintained by TServ |
| *resp_type (new CHAR(1)) | RESPONSE (onoeof [R,H,F]) |

* new GETREC_FIELDS table (1 rows per each FIELDS subparameter)
req_id $ field_name

*GETREC VID=...*

| | |
|---|---|
| *req_type (was brfonly) | request type = GETRECVID |
| testcase_section | not used |
| testcase_number | VID |
| *vrqst (new CHAR(1)) | VRQST |
| *recid (new VARCHAR(N)) | not used |
| selection_criteria | not used |
| orig_switch_load_id | not used |
| term_switch_load_id | not used |
| resource_id | not used |
| resource_load_id | not used |

*GETREC TEMPLATE=...*

| | |
|---|---|
| *req_type (was brfonly) | request type = GETRECTEMP |
| testcase_section | not used |
| testcase_number | TEMPLATE 1 of 5 |
| *vrqst (new CHAR(1)) | not used |
| *recid (new VARCHAR(N)) | not used |
| selection_criteria | APPSCL xor REPLSCL (+SCL =app, -SCL = repl) |
| orig_switch_load_id | TEMPLATE 2 of 5 |
| term_switch_load_id | TEMPLATE 3 of 5 |
| resource_id | TEMPLATE 4 of 5 |
| resource_load_id | TEMPLATE 5 of 5 (= -1 if position not used) |

*GETREC RECID=...*

| | |
|---|---|
| *req_type (was brfonly) | request type = GETRECID |
| testcase_section | not used |
| testcase_number | not used |
| *vrqst (new CHAR(1)) | not used |
| *recid (new VARCHAR(N)) | RECID |
| selection_criteria | not used |
| orig_switch_load_id | not used |
| term_switch_load_id | not used |
| resource_id | not used |
| resource_load_id | not used |

*GETREC SCL=...*

| | |
|---|---|
| *req_type (was brfonly) | request type = GETRECSCL |
| testcase_section | not used |
| testcase_number | not used |
| *vrqst (new CHAR(1)) | not used |
| *recid (new VARCHAR(N)) | not used |
| selection_criteria | SCL |
| orig_switch_load_id | not used |
| term_switch_load_id | not used |
| resource_id | not used |
| resource_load_id | not used |

Other Requests

"EXIT"

Description
Exit CLM session gracefully. CLM is terminated.

"HELP | HELPVREQ | HELPGETREC"

Description
Request Help, general or specific.

Commands

HELP - generalized help message is returned with a reference to this document.

HELPVREQ - specific help is returned for VREQ command varieties, along with a reference to this document.

HELPGETREC - specific help is returned for GETREC command varieties, along with a reference to this document.

Responses

*Output*
Each help response is returned in string form:

E.G. "+10030 help: %s"

Such that the string is a free-form flat file dump of configured ASCII text for help (e.g. /tserv/tserv.hlp).

"GETSTAT ID=..."

Description
Get (retrieve) status for a previously submitted request. REQUEST_QUEUE status column is returned.

Does SELECT DESCRIPTION
       FROM STATUS_TYPES,REQUEST_QUEUE
       WHERE    REQUEST_QUEUE.REQ_ID = parameter AND
                     REQUEST_QUEUE.STATUS = STATUS_TYPES.STATUS Required Parameter
use form PARAM=VALUE with one or more blanks surrounding it. The PARAM is described below with an example VALUE.

ID - id of verification request or search request (e.g. ID=56718).

Responses

*Output*
Each get status response is returned in string form:

E.G. "+10031 status: %s"

%s = a status string = one of the overallResult status strings described for VREQ and GETREC interfaces above.

"CERTIFY VID=... CID=..."

Description
Certify verification request id to CERTS ID list.

Required Parameters
use form PARAM=VALUE with one or more blanks surrounding it. The PARAM is described below with an example VALUE.

| | |
|---|---|
| VID | - verification request id to certify (e.g. VID=56718). |
| CID | - list of one or more CERTS ids (CID=10,78,45). Indicates to Tserv to apply the verification to the certifications (CID list). |

Responses

*Output*
The CERTIFICATION_REQUESTS table is populated appropriately, and then a status as to the result is returned.

E.G. "+10031 status: %s"

Such that a status string, for example one of : "Error" or "Complete".

Future Commands

"SETPRIORITY ID=... PRI=..."

Description
Set priority of previously submitted request. REQUEST_QUEUE priority column is updated upon authentication.

Required Parameters
use form PARAM=VALUE with one or more blanks surrounding it. The PARAMs are described below with an example VALUE.

ID            - id of verification request or search request (e.g. ID=56718).

PRI             - priority of request (e.g. PRI=HIGH). Uppercase is required for valid values of LOW, BATCH, MEDIUM, and HIGH. Default is UNKNOWN (the lowest priority). See priority discussion below.

"GETQUE <optional_params>"

Description

Get (retrieve) request queue entries for client.

Optional Parameters For Get Queue Requests

Each parameter of optional_params is in the form PARAM=VALUE with one or more blanks surrounding it. The PARAMs are described below with example VALUEs.

SEEK_STAT       - list of conditions for sought status (e.g. SEEK_STAT=<4,>5). Conditions include "=N", "!N", ">N", "<N", "[N" (i.e. >= N), and "]N" (i.e. <= N). Default is seek all.
SEEK_PRI        - list of sought priorities (e.g. SEEK_PRI=MEDUM,HIGH). Uppercase is required for valid values of LOW, BATCH, MEDIUM, and HIGH. Default is seek all.
MAXRETURN       - maximum number of REQUEST_QUEUE entries willing to accept (e.g. MAXRETURN=5). Default is return single most recent request.
START_DT        - search start date/time in teams time format (e.g. START_DT=yyyymmddhhmmss) of requests previously submitted.
END_DT          - search end date/time in teams time format (e.g. END_DT=yyyymmddhhmmss) of requests previously submitted.
PRI             - priority of this request (e.g. PRI=HIGH). Uppercase is required for valid values of LOW, BATCH, MEDIUM, and HIGH. Default is UNKNOWN (the lowest priority). See priority discussion below.
FIELDS          - list of fields to return values for (FIELDS=REQ_ID,EXECUTION_START_DT). Default is to return all REQUEST_QUEUE fields. Field names correspond to fields as defined in the TServ REQUEST_QUEUE table. Default is all fields.

Parameter Matrices

VREQ* Commands

|  | VREQTCID | VREQTC | VREQTEMP |
| --- | --- | --- | --- |
| TCID | required | ignored if present | ignored if present |
| TCSECTION | ignored if present | required | ignored if present |
| TCNUMBER | ignored if present | required | ignored if present |
| TEMPLATE | ignored if present | ignored if present | required |
| START_DT | required | required | required |
| END_DT | required | required | required |
| OSW_NAME | required | required | required |
| TSW_NAME | required | required | required |
| VRQST | optional | optional | optional |
| RES_NAME | optional | optional | ignored if present |
| NRETRY | optional | optional | optional |
| MAXRETURN | optional | optional | optional |
| TMPOVR | optional | optional | optional |
| PRI | optional | optional | optional |
| RECID | optional | optional | optional |
| APPSCL | optional (xor) | optional (xor) | optional (xor) |
| REPLSCL | optional (xor) | optional (xor) | optional (xor) |
| OSW_LD | optional | optional | ignored if present |

| | | | | |
|---|---|---|---|---|
| TSW_LD | optional | optional | ignored if present | |
| RES_LD | optional | optional | ignored if present | |
| CID | optional | optional | ignored if present | |
| RESPONSE | optional | optional | optional | |

GETREC* Commands

| | GETRECVID | GETRECTEMP | GETRECID | GETRECSCL |
|---|---|---|---|---|
| VID | required | ignored if present | ignored if present | ignored if present |
| TEMPLATE | ignored if present | required | ignored if present | ignored if present |
| RECID | ignored if present | ignored if present | required | ignored if present |
| SCL | ignored if present | ignored if present | ignored if present | required |
| NRETRY | ignored if present | optional | optional | optional |
| MAXRETURN | optional | optional | optional | optional |
| VRQST | optional | ignored if present | ignored if present | ignored if present |
| START_DT | ignored if present | optional | ignored if present | optional |
| END_DT | ignored if present | optional | ignored if present | optional |
| DEV_NAME | ignored if present | optional | ignored if present | optional |
| APPSCL | ignored if present | optional (xor) | ignored if present | ignored if present |
| REPLSCL | ignored if present | optional (xor) | ignored if present | ignored if present |
| PRI | optional | optional | optional | optional |
| FIELDS | optional | optional | optional | optional |
| RESPONSE | optional | optional | optional | optional |
| TMPOVR | ignored | optional | ignored | ignored |

Current TSERV_GLOBALS.HXX

An asterisk (*) prefix indicates a new constant.

```
// Result codes starting at 1000
#define RES_OVR                         1000
#define RES_SEG                         1001
#define RES_COMP_RES                    1002
#define RES_COMP_PC                     1003
* #define RES_BREC                      1005
* #define RES_FIELD_OK                  1006
* #define RES_RAW                       1007
* #define RES_ECHO                      1009
#define RES_COMPLETE                    1010

// Result codes starting at 2000
* #define SRCH_OVR                      2000
* #define SRCH_SEG                      2001
* #define SRCH_FIELD_DEC                2002
* #define SRCH_FIELD_HEX                2003
* #define SRCH_TEMPLATE                 2004
* #define SRCH_RAW                      2007
* #define SRCH_ECHO                     2009
* #define SRCH_COMPLETE                 2010

// Result codes starting at 3000
* #define GETSTAT_OVR                   4000
* #define GETSTAT_SEG                   4001

// Error codes starting at 10000
// CLM 10000 - 10099
#define CLM_INV_TC_SEC                  10000
#define CLM_REC_NOT_FOUND               10001
#define CLM_UNDEFINED_CMD               10002
```

```
#define CLM_OUT_RANGE              10003
#define CLM_INV_CMD                10004
#define CLM_INV_INDEX              10005
#define CLM_INV_VLEN               10006
#define CLM_SOCK_ASGN_FAIL         10007
#define CLM_SOCK_CON_FAIL          10008
#define CLM_NO_SESS_ID             10009
#define CLM_SELECT_ERR             10010
#define CLM_BUF_OVERRUN            10011
#define CLM_NO_LF                  10012
#define CLM_CONN_OK                10013
#define CLM_QUED_VREQ              10014
#define CLM_REG_ERR                10015
#define CLM_SOCKET_FAIL            10016
#define CLM_BIND_FAIL              10017
#define CLM_LISTEN_FAIL            10018
#define CLM_VREQ_PRIO_FAIL         10019
#define CLM_NULL_VREQ_FLD          10020
#define CLM_INV_SW_ID              10021
#define CLM_MEM_ERR                10022
#define CLM_ACCEPT_ERR             10023
#define CLM_SEND_ERR               10024
#define CLM_RECV_ERR               10025
#define CLMCORBAERR                10026
#define CLMNOINFO                  10027
#define CLMNOMEM                   10028
#define CLMTIMEOUT                 10029
*#define CLMHELP                   10030
*#define GETSTATUS                 10031

// VER  10100 - 10199
#define VER_REC_NOT_FOUND          10100
#define VER_TEMPLATE_NOT_FOUND     10101
#define VER_TOO_LARGE_SEARCH       10102
#define VER_INVALID_SELECT_CRIT    10103
#define VER_TOO_MANY_MATCHES       10104
#define VER_BRF_TIMEOUT            10105
#define VER_INF                    10106
#define VER_OK                     10107
#define VERREGERR                  10108
#define VERREGREQERR               10109
#define VERCLMWRTERR               10110
#define VERCORBAERR                10111
#define VERCORBAOPENERR            10114
#define VERCORBASYSERR             10115
#define VERCORBAINVPTRERR          10116
#define VERCORBASTROBJERR          10117
#define VERSYSERR                  10118
#define VERTIMEADJERR              10119

// BRF  10200 - 10299
#define BRFNOTFOUND                10200
#define BRFINVALIDSELECTION        10201
#define BRFSELECTALLINVALID        10202
#define BRFTOOMANYRECS             10203
#define BRFNOTSOBJREF              10204
#define BRFTSERR                   10206
#define BRFDBERR                   10207
#define BRFFLTRERR                 10208
#define BRFNOTREADY                10209
#define BRFREGREQERR               10210
#define BRFREGERR                  10211
#define BRFNOMEM                   10212
#define BRFCORBAERR                10213
#define BRFCORBAOPENERR            10214
#define BRFCORBASYSERR             10215
#define BRFCORBAINVPTRERR          10216
```

```
#define BRFCORBASTROBJERR              10217
// TS    10300 - 10399
#define TSDEVICENOTFND                 10300
#define TSNOQUERY                      10301
#define TSDEVIDFAIL                    10302
#define TSADDFAIL                      10303
#define TSSOCERR                       10304
#define TSNOCONNECT                    10305
#define TSNORESP                       10306
#define TSCORBAERR                     10307
#define TSDBERR                        10308
#define TSNOMEM                        10309
#define TSREGREQERR                    10310
#define TSREGERR                       10311
#define TSTIMEOUT                      10312
#define TSDEVUNK                       10313
#define TSNOSCRIPT                     10314
#define TSSELECTFAIL                   10315
#define TSPIPEERR                      10316
#define TSINVDATE                      10317
#define TSCORBAOPENERR                 10316
#define TSCORBASYSERR                  10317
#define TSCORBAINVPTRERR               10318
#define TSCORBASTROBJERR               10319

// FILTER  10400 - 10499
#define FLT_SCL_STATEMENT_INVALID      10410
#define FLT_FILTER_KEYS_INVALID        10420
#define FLT_NON_KEY_FIELD_OR           10430
#define FLT_INVALID_FIELD              10440

// JAN  10500 - 10599
#define JANNODBACCESS                  10500
#define JANNOTBLACCESS                 10501
#define JANDELROWERR                   10502

// RECOBJ 10600 - 10699
#define RECOBJSYNTAX_ERR               10610
#define RECOBJREC_TYP_NF               10620
#define RECOBJFLD_TYPE_NF              10630

// PM  10700 - 10799
#define PMSYSSTATERR                   10700
#define PMPROGNOTFND                   10701
#define PMREGISTRYUNAVAIL              10702
#define PMLOGERROR                     10703
#define PMNOVAR                        10704
#define PMCORBAERR                     10705

// REG  10800 - 10899
#define REGNOTFND                      10800   // "Entry not found"
#define REGCANTCONN                    10801   // "Couldn't connect to reg db"
#define REGCANTDEL                     10802   // "Couldn't delete entry"
#define REGCANTADD                     10803   // "Couldn't insert entry"
#define REGCANTMOD                     10804   // "Couldn't modify entry"
#define REGCANTREPL                    10805   // "Couldn't overwrite entry"
#define REGBLANKPATH                   10806   // "Path given was blank"

// LOG  10900 - 10999
#define LOGFILENOTFND                  10900
#define LOGDISKFULL                    10905
#define LOGREGERR                      10910
#define LOGERR                         10911

// SAP  11000 - 11099
#define SAP_INVALID_FORMAT             11010
#define SAPSOCERR                      11011
```

```
#define SAPCONNECTERR                  11012
#define SAPSOCSENDERR                  11013
#define SAPSELECTERR                   11014
#define SAPSRVERR                      11015

// PRS (Parser)  11100 - 11199
#define PRSINVARG                      11100
#define PRSTOOMANY                     11101
#define PRSFMTERR                      11102
#define PRSARRBND                      11103
#define PRSNOTFND                      11104
#define PRSTOOBIG                      11105
#define PRSRTNINVTYP                   11106
#define PRSINVDATAVAL                  11107
#define PRSPASTEND                     11108
#define PRSTSTERRHDL                   11109
#define PRSTRACE                       11110
#define PRSNOTIMPL                     11111
#define PRSRWTOOL                      11112
#define PRSDBTOOL                      11113
#define PRSBUFTOOSML                   11114
#define PRSCONFIGNOTFND                11115
#define PRSSECBEGNOTFND                11116
#define PRSSECENDNOTFND                11117
#define PRSALRDYINST                   11118
#define PRSNOTINST                     11119
#define PRSNOTCURRBLD                  11120
#define PRSOBJUNID                     11121
#define PRSCMPLMISMATCH                11122
#define PRSRECCNSTRCTR                 11123
#define PRSINVLAY                      11124
#define PRSINVFLDNUM                   11125
#define PRSDATAGT32                    11126
#define PRSORGMERR                     11127

// COL  11200 - 11299
#define COLNICNOTFND                   11200
#define COLUNKWNREC                    11201
#define COLBADFILTER                   11202
#define COLBADPARSE                    11203
#define COLNOCONNECT                   11204
#define COLNORESP                      11205
#define COLNODISCONN                   11206
#define COLREQDENIED                   11207
#define COLSOCERR                      11208
#define COLCORBAERR                    11209
#define COLELAPSEWARN                  11210
#define COLSTFERR                      11211
#define COLNICREADERR                  11212
#define COLREGREQERR                   11213
#define COLREGERR                      11214
#define COLSCLERR                      11215
#define COLMEMERR                      11216
#define COLDBERR                       11217
#define COLNOTFOUND                    11218
#define COLNICDECREADERR               11219
#define COLOVRERR                      11220

// STF  11300 - 11399
#define STFSTOREERROR                  11300
#define STFGETRECERROR                 11305

// LDR  11400 - 11499
#define LDRLOADERR                     11400
#define LDRCORBAERR                    11405
#define LDRREADSTFERR                  11410
#define LDRNOBRECSEQNUM                11415
```

```
#define LDRDIRDBSETUPERR              11416
#define LDRDIRTABSETUPERR             11417
#define LDRDIRSELSETUPERR             11418
#define LDRDIRARRAYDIMERR             11419
#define LDRDIRARRAYALLERR             11420
#define LDRDIRARRAYPOPERR             11421
#define LDRDIRREQCOLSERR              11422
#define LDRDIRTYPEBOUNDS              11423
#define LDRDIRFIELDBOUNDS             11424
#define LDRALLOCERR                   11425
#define LDRSTFSETUPERR                11426
#define LDRDBSETUPERR                 11427
#define LDRTABSETUPERR                11428
#define LDRSETUPDEVICESERR            11429
#define LDRDEVICESELECTORERR          11430
#define LDRDEVICEREADERERR            11431
#define LDRDBCONERR                   11432
#define LDRBADSEROBJ                  11433
#define LDRBADDEVICE                  11434
#define LDRBADRECINFO                 11435
#define LDRPARSERTYPEERR              11436
#define LDRNULLFIELD                  11437
#define LDRGETREQFIELDSERR            11438
#define LDRBADCOL                     11439
#define LDRMISSINGFIELD               11440
#define LDRSTARTTRANSERR              11441
#define LDRSTRANGEDURATION            11442
#define LDRORAERR                     11443
#define LDRTRUNCATEDFIELD             11444
#define LDRINTERNALERR                11445
#define LDRREGREQERR                  11446
#define LDRREGERR                     11447
#define LDRDIRCONSTRUCTORERR          11448
#define LDRINITERR                    11449
#define LDRDEVNOTFND                  11450
#define LDRARREXCD                    11451
#define LDRUPDDEVERR                  11452
#define LDRINSDEVERR                  11453
#define LDRNODEVRECS                  11454

// TMC  11500 - 11599
#define TMCMEMORY                     11501
#define TMCFILE                       11502
#define TMCPRINTER                    11503
#define TMCORBACCESS                  11504
#define TMCDBACCESS                   11505
#define TMCOBJECTACCESS               11506
#define TMCGENERAL                    11507

// LDS  11600 - 11699
#define LDSLOGNOTFND                  11600
#define LDSLOGTOOMANY                 11601
#define LDSLOGRETRIEVEERR             11602

// VRL  11700 - 11799
#define VRL_INCOMPLETE_REQUEST        11700

// DBAccess 11800 - 11899
#define DBORACLEDOWN                  11800
#define DBUSRNOTFND                   11801
#define DBTBLNOTFND                   11803
#define DBCOLNOTFND                   11804
#define DBDUPEROW                     11805
#define DBROWLOCK                     11806
#define DBNORECFOUND                  11807
#define DBNOCONNECT                   11808
#define DBINSFAIL                     11809
```

```
#define DBSQLFAIL                   11810
#define DBSELFAIL                   11811
#define DBDELFAIL                   11812
#define DBUPDFAIL                   11813
#define DBNORECUPD                  11814
#define DBNORECDEL                  11815
#define DBCNTXTERR                  11816
#define DBNOMEM                     11817
#define DBARREXCD                   11818
#define DBERR                       11819

// Time Class 11900 - 11999
#define CTDBADDATE                  11900

// SEC  12000 - 12099

// SCL  12100 - 12199
#define SCLINVALIDSTMT              12100
#define SCLGENSQLERR                12101
#define SCL_INVALID_OPERATOR        12110
#define SCL_PARENTHESES_MISMATCH    12120
#define SCL_QUOTE_MISMATCH          12130
#define SCL_NO_OPERATOR             12140
#define SCL_FIELD_NOT_FOUND         12150

// CORBA      12200 - 12299
#define ORBEXCEPT                   12200

// GENERAL  12300 -12399
#define GEN_OPEN_FAIL               12300

// NICDECODER 12400-12499
//#define  invalid_common_hdr       12400
//#define  invalid_data_len         12401
//#define  invalid_client_hdr       12402
//#define  invalid_crid             12403
//#define  invalid_layout           12404
//#define  invalid_dtype            12405
//#define  invalid_reccnt           12406
//#define  memory_error             12407
```

Priority TServ Development

1) VREQTC
2) GETRECVID, GETRECID, GETRECSCL, GETRECTEMP
3) GETSTAT
4) CERTIFY

TSERV CLIENT REQUEST PRIORITY

Overview

- The PRI parameter shall specify a case sensitive uppercase priority (e.g. PRI=HIGH). The lack of a PRI parameter, or an error in its content, will result in the lowest priority (i.e. UNKNOWN).
- TServ shall control the scheduled execution appropriately relative to pending requests. The priority of the request shall be FIFO relative to pending requests of the same priority. The priority of the request shall be ordered, lowest to highest, as UNKOWN, BATCH (e.g. ITP Batch Requests), LOW (e.g. ITP Interactive, Manual Verification Client), MEDIUM (e.g. ITP Interactive, Manual Verification Client), and HIGH (e.g. ITP Interactive, Manual Verification Client, AOSM), respectively.

Recommended Uses

- Unknown:  Priority value is invalid or priority parameter is missing.
- Batch:    Priority of all batch submissions of testcases.
- Low:      Priority of interactive submissions greater than 30 testcases.
- Medium:   Priority of interactive submissions between 2 and 30 testcases.
- High:     Priority of interactive submission of one testcase.

Implementation Notes

A new table shall be created in TServ. An asterisk (*) indicates the base table is an administrator provisioned table and there are four additional columns in the table (created_by, creation_date, modified_by, modified_date).

```
* REQUEST_PRIORITY
    priority (literals defined)
    queue_value
```

The REQUEST_PRIORITY table rows shall be maintained in shared memory and used by the CLM for populating the priority value in the VERIFICATION_REQUEST_QUEUE and verification message queue element.

The VER process always retrieves the next highest priority request from the message queue. If billing is not yet loaded in the database as determined from a shared memory query to the DEVICES table (LAST_UPDATE column), then the request is updated in the VERIFICATION_REQUEST_QUEUE table with a date/time stamp in the future for an additional future retry.

```
* DEVICES
    device_id
    device_name
    platform_id
    description
    engineering_id
    finance_id
    last_update (most recent date/time stamp of loaded billing record)
```

The MAXRETRIES parameter from the CLM indicates to the VER how many retries to find billing in the future for the request. The NUM_RETRIES column is maintained by TServ relative to the MAXRETRIES value. Lack of a MAXRETRIES parameter from a client causes default to a 0 which indicates to TServ to do no retries. The requeue delay is variable and will time out the request in 12 hours if no billing has been loaded into the database for the sought time from the particular device.

Registry variable descriptions

Initial requeue delay period between verification retries in seconds
/VER/INITRETRYDELAY => 180 # of times current retry interval is used before the retry interval is doubled
/VER/RETRIESBEFOREDOUBLE => 10

Maximum requeue delay in seconds
/VER/MAXRETRYDELAY => 1920

Use date/time stamps of ver request to timeout request
/VER/MAXNUMRETRIES => 63

Requeue Functionality

If the verification should timeout after 12 hours, the number of retries (VERIFICATION_REQUEST_QUEUE table column NUM_RETRIES) should be set to MAXNUMRETRIES or -1.

<u>Variable retry period lasts for 50 retries</u>
For an initial retry delay of 1 minute, /VER/INITRETRYDELAY.

Each variable period is used for 10 times, /VER/RETRIESBEFOREDOUBLE.

The variable retry delays lasts for 1, 2, 4, 8, and 16 minutes since
these retry delays are less than 32 minutes, /VER/MAXRETRYDELAY.

```
10 retries @ 1 minute     => 10 minutes
10 retries @ 2 minutes    => 20 minutes
10 retries @ 4 minutes    => 40 minutes
10 retries @ 8 minutes    => 80 minutes
10 retries @ 16 minutes   => 160 minutes
-----------------------------------------------
variable period           => 310 minutes
``` total requeue time (12 hours) => 720 minutes

The SEARCH_START_DT column is used to achieve the retry logic. Requests are queried from the VERIFICATION_REQUEST_QUEUE periodically to seek SEARCH_START_DT values less than the current system date/time. Entries fetched are placed into the message queue for reprocessing. Status is appropriately maintained in the VERIFICATION_REQUEST_QUEUE table entry throughout processing.

Since those skilled in the art can modify the specific embodiment described above, we intend that the claims be interpreted to cover such modifications and equivalents.

What is claimed is:

1. A computer software system for receiving, analyzing and storing multiple data streams, and for retrieving data records from the data streams, comprising at least one processor executing a sequence of instructions embodied in a computer-readable medium; the system further comprising:
   a service manager process executing asynchronously for starting and stopping all system processes;
   at least one collector process executing asynchronously for collecting data records from the data streams and placing the data records in a record queue;
   a store of one or more first pre-determined templates; the first templates containing rules for filtering and parsing the data records;
   at least one decoder process executing asychronously for parsing data records in the record queue according to the first pre-determined templates and storing such parsed records;
   at least one loader process executing asychronously for loading stored parsed data records into a database;
   at least one client manager process executing asynchronously for accepting verification requests for data records from a client, acknowledging such requests, and placing such requests in a request queue;
   a store of one or more second pre-determined templates; the second templates containing rules for verifying data records;
   at least one verification request processing process executing asynchronously; the verification request processing process reading requests from the request queue, reading requested data records from the database according to the second pre-determined templates, storing the requested data records, and storing requests for which no data records are then available; and,
   a query refresh futures process executing asynchronously for reading the stored requests for which no data records are available and placing on the request queue those requests for data records which require a retry.

2. The computer software system of claim 1 further comprising a time server process executing asynchronously for computing and maintaining time correlations between the computer software system and one or more external devices generating the multiple data streams.

3. The computer software system of claim 1 where the service manager process starts a collector process for each data stream.

4. The computer software system of claim 1 where the verification request processing process stays blocked until a request is available from the request queue.

5. The computer software system of claim 1 where the multiple data streams comprise call records generated by a plurality of switches in one or more telecommunications networks.

6. The computer software system of claim 5 further comprising a time server process executing asynchronously for computing and maintaining time correlations between the computer software system and the switches generating the call records.

7. The computer software system of claim 5 where the service manager process starts a collector process for each set of call records from one network record collection point.

8. The computer software system of claim 5 where the verification request processing process stays blocked until a request is available from the request queue.

9. A method of using a computer software system for receiving, analyzing and storing multiple data streams, and for retrieving data records from the data streams; the system comprising at least one processor executing a sequence of instructions embodied in a computer-readable medium and stores of first and second pre-determined templates containing rules for filtering and parsing data records, and for verifying data records, respectively; the method comprising the steps of:
   starting a service manager process which executes asynchronously and starts or stops all other system processes;
   asynchronously collecting data records for the data streams and placing the data records into a record queue;
   asynchronously parsing data records in the record queue according to the first pre-determined templates and storing such parsed records;
   asynchronously loading the stored parsed data records into a database;
   accepting requests for data records from one or more clients, acknowledging such requests and placing such requests in a request queue;
   asynchronously reading the request queue, obtaining requested data records from the database, and returning such requested records; or, if no requested data records are then available, storing requests for which no data records are then available; and,
   asynchronously reading the stored requests and placing on the request queue those requests for data records which require a retry.

10. The method of claim 9 further comprising the step of asynchronously computing and maintaining time correlations between the computer software system and one or more external devices generating the multiple data streams.

11. The method of claim 9 where the multiple data streams comprise call records generated by a plurality of switches in one or more telecommunications networks, the method comprising the steps of:
   starting a service manager process which executes asynchronously and starts or stops all other system processes;
   asynchronously collecting call records from the switches and placing the call records into a record queue;
   asynchronously parsing call records in the message queue according to the first pre-determined templates and storing such parsed records;
   asynchronously loading the stored parsed call records into a database;
   accepting requests for call records from one or more clients, acknowledging such requests and placing such requests in a request queue;
   asynchronously reading the request queue, obtaining requested call records from the database, and returning such requested records; or, if no requested call records are then available, storing requests for which no data records are then available; and,
   asynchronously reading the stored requests and placing on the request queue those requests for call records which require a retry.

12. The method of claim 11 further comprising the step of asynchronously computing and maintaining time correlations between the computer software system and one or more external devices generating the call records.

* * * * *